US012051584B2

(12) United States Patent
Badiei et al.

(10) Patent No.: US 12,051,584 B2
(45) Date of Patent: Jul. 30, 2024

(54) ION INTERFACES AND SYSTEMS AND METHODS USING THEM

(71) Applicant: PerkinElmer Scientific Canada ULC, Woodbridge (CA)

(72) Inventors: Hamid Badiei, Woodbridge (CA); William Fisher, Woodbridge (CA); Serguei Savtchenko, Woodbridge (CA); Andrew Icasiano, Brampton (CA)

(73) Assignee: PerkinElmer Scientific Canada ULC, Woodbridge (CA)

(*) Notice: Subject to any disclaimer, the term of this patent is extended or adjusted under 35 U.S.C. 154(b) by 0 days.

(21) Appl. No.: 16/836,708

(22) Filed: Mar. 31, 2020

(65) Prior Publication Data

US 2021/0242006 A1 Aug. 5, 2021

Related U.S. Application Data

(60) Provisional application No. 62/969,924, filed on Feb. 4, 2020.

(51) Int. Cl.
*H01J 49/04* (2006.01)
*H01J 49/06* (2006.01)
(Continued)

(52) U.S. Cl.
CPC ........ *H01J 49/067* (2013.01); *H01J 49/0495* (2013.01); *H01J 49/10* (2013.01); *H01J 49/4225* (2013.01)

(58) Field of Classification Search
CPC ........ H01J 49/067
See application file for complete search history.

(56) References Cited

U.S. PATENT DOCUMENTS 5,049,739 A * 9/1991 Okamoto .............. H01J 49/025 250/281
5,051,584 A * 9/1991 Gray ..................... H01J 49/067 250/288
(Continued)

FOREIGN PATENT DOCUMENTS

CA 2033439 A1 * 7/1991 .......... H01J 49/0468
CA 2476069 A1 * 1/2006 ............... H05H 1/28
(Continued)

OTHER PUBLICATIONS

Savtchenko et al., "Shock wave properties in the interface region of an inductively coupled plasma mass spectrometer (ICP-MS)", 22nd International Symposium on Plasma Chemistry, 2015 (Year: 2015).*
(Continued)

*Primary Examiner* — Michael J Logie
(74) *Attorney, Agent, or Firm* — Banner & Witcoff, Ltd.

(57) ABSTRACT

Certain embodiments of ion interfaces are described that can provide higher sensitivities improved ion transmission and multiple operating modes. In some configurations, the ion interface may comprise a first element and a second element each of which can receive a non-zero voltage. In one configuration, the first element can be a hyperskimmer cone and the second element can be a cylindrical lens. Systems and methods using the interface are also described.

13 Claims, 36 Drawing Sheets

(51) Int. Cl.
*H01J 49/10* (2006.01)
*H01J 49/40* (2006.01)
*H01J 49/42* (2006.01)

(56) References Cited

U.S. PATENT DOCUMENTS

| | | | | |
|---|---|---|---|---|
| 5,068,534 | A * | 11/1991 | Bradshaw | H01J 49/067 250/288 |
| 5,381,008 | A * | 1/1995 | Tanner | H01J 49/044 250/282 |
| 5,432,343 | A * | 7/1995 | Gulcicek | H01J 49/067 250/288 |
| 5,614,711 | A * | 3/1997 | Li | H01J 49/40 250/282 |
| 2004/0262512 | A1* | 12/2004 | Tobita | H01J 49/044 250/288 |
| 2005/0082471 | A1* | 4/2005 | Kalinitchenko | H01J 49/105 250/286 |
| 2005/0151074 | A1* | 7/2005 | Thakur | H01J 49/067 250/281 |
| 2006/0151690 | A1* | 7/2006 | Marriott | H01J 49/105 250/288 |
| 2007/0228268 | A1 | 10/2007 | Marriott | |
| 2008/0116371 | A1* | 5/2008 | Wouters | H01J 49/067 250/288 |
| 2011/0253888 | A1 | 10/2011 | Badiei et al. | |
| 2013/0248701 | A1* | 9/2013 | Kalinitchenko | H01J 49/06 250/282 |
| 2018/0350582 | A1* | 12/2018 | Giles | H01J 49/066 |

FOREIGN PATENT DOCUMENTS

| | | | | |
|---|---|---|---|---|
| JP | H06203791 | A * | 7/1994 | |
| JP | H08287865 | A * | 11/1996 | |
| JP | 2001-185073 | A | 7/2001 | |
| WO | 2011106768 | A1 | 9/2011 | |
| WO | WO-2015181564 | A1 * | 12/2015 | H01J 49/067 |

OTHER PUBLICATIONS

ISR/WO for PCT/IB2021/050868 dated Jun. 5, 2021.

Feb. 8, 2024 (EP) Supplementary Search Report—App. No. 21750577.5.

* cited by examiner

ION INTERFACES AND SYSTEMS AND METHODS USING THEM

PRIORITY APPLICATION

This application is related to and claims priority to and the benefit of U.S. Provisional Application No. 62/969,924 filed on Feb. 4, 2020, the entire disclosure of which is hereby incorporated herein by reference.

TECHNOLOGICAL FIELD

Certain aspects and embodiments described herein are directed to ion interfaces. In some configurations, the ion interface may be configured as a mass spectrometer interface that comprises two or more elements that can sample an ion beam comprising analyte ions and focus the ions prior to providing the focused ions to a downstream component.

BACKGROUND

Ions and ion beams are often produced during elemental analysis of analytical samples. Ions and ion beams can also be used in producing materials and in materials treatment and processing.

SUMMARY

In an aspect, an ion interface is provided. In some configurations, the ion interface can be present in a mass spectrometer and may be referred to as a mass spectrometer interface. In certain embodiments, the ion interface comprises a first element comprising a first orifice configured to receive ions from an ionization source and provide the received ions to a first region downstream of the first orifice. The ion interface may also comprise a second element comprising a second orifice configured to receive the ions in the first region and provide the received ions to a second region downstream of the second orifice. The ion interface may further comprise a third element comprising a third orifice configured to receive the ions in the second region and provide the received ions to a third region downstream of the third orifice, wherein the third element is configured to receive a first non-zero voltage. The ion interface may further comprise a fourth element comprising a first aperture configured to receive ions in the third region and focus the received ions prior to providing the focused, received ions to a downstream component. In some embodiments, the fourth element is configured to receive a second non-zero voltage.

In certain embodiments, each of the first element, the second element and the third element comprises a conically shaped body. In other embodiments, the fourth element is configured as a lens such as, for example, a cylindrical lens, e.g., a ring lens. In some examples, the ring lens can be positioned directly downstream of the third element. In some embodiments, an inner diameter of the first aperture of the lens is equal to or greater than an outer diameter of the third element. In certain examples, the ion interface may comprise a non-conductive holder configured to hold the fourth element, e.g., a lens such as a ring lens, and the third element. In other embodiments, the first non-zero voltage is a positive voltage and the second non-zero voltage is a negative voltage. In some examples, the positive voltage is greater than zero and less than about +30 Volts, and the negative voltage is less than zero and greater than about −300 Volts. In other configurations, the first non-zero voltage is less than zero, the second non-zero voltage is less than zero, and the second non-zero voltage is less than the first non-zero voltage. In additional configurations, the first non-zero voltage is greater than zero, the second non-zero voltage greater than zero, and the first non-zero voltage is less than the second non-zero voltage.

In some embodiments, the third element and the fourth element are each independently controllable to alter the first non-zero voltage and the second non-zero voltage during operation of a system comprising the ion interface.

In certain embodiments, the first element comprises a first cone comprising the first orifice, the second element comprises a second cone comprising the second orifice, and the third element comprises a third cone comprising the third orifice. In some examples, a cone opening angle of the third cone is less than a cone opening angle of the second cone. In other configurations, the fourth element comprises a ring lens, and an inner diameter of ring lens can be greater than or equal to an outer diameter of the third cone.

In some configurations, at least one of the first element and the second element is configured to electrically couple to ground. If desired, each of the first element and the second element is configured to electrically couple to ground.

In other configurations, the first region is configured to comprise a first pressure lower than atmospheric pressure. In additional configurations, the second region is configured to comprise a second pressure lower than the first pressure. In some embodiments, the third region is configured to comprise a third pressure lower than the second pressure.

In certain configurations, the second non-zero voltage provides an electric field comprising an inflection point at a region upstream of the downstream component.

In some embodiments, the ion interface comprises a non-conductive holder configured to receive the third element and the fourth element.

In certain embodiments, each of the first element, the second element and the third element comprises nickel.

In other embodiments, the fourth element comprises an aperture-to-length ratio of less than 2.5.

In additional embodiments, the third element and the fourth element are configured to electrically couple to a single voltage source.

In another aspect, an ion interface comprises a first element, a second element, a third element and a fourth element, wherein the first element, the second element, the third element, and the lens are configured to provide an electric field comprising an inflection point.

In some configurations, the first element comprises a first orifice configured to receive ions from an ionization source and provide the received ions to a first region downstream of the first orifice.

In certain configurations, the second element comprises a second orifice configured to receive the ions in the first region and provide the received ions to a second region downstream of the second orifice.

In other configurations, the third element comprises a third orifice configured to receive the ions in the second region and provide the received ions to a third region downstream of the third orifice.

In certain embodiments, the fourth element comprises a first aperture configured to receive ions in the third region and provide the received ions to a downstream component.

In some configurations, each of the first element, the second element and the third element comprises a conically shaped body.

In certain configurations, wherein the fourth element is configured as a lens such as, for example, a cylindrical lens, e.g., a ring lens. In some examples, ring lens is positioned directly downstream of the third element. In other examples, an inner diameter of the first aperture of the ring lens is equal to or greater than an outer diameter of the third element.

In certain embodiments, the ion interface comprises a non-conductive holder configured to hold the ring lens and the third element.

In some examples, the third element is configured to receive a first non-zero voltage. In other examples, the fourth element is configured to receive a second non-zero voltage. In some configurations, the first non-zero voltage is a positive voltage that is greater than zero to about +30 Volts, and the second voltage is a negative voltage that is less than zero to about −300 Volts. In other examples, the first non-zero voltage is less than zero, the second non-zero voltage is less than zero, and the second non-zero voltage is less than the first non-zero voltage. In some embodiments, the first non-zero voltage is greater than zero, the second non-zero voltage greater than zero, and the first non-zero voltage is less than the second non-zero voltage. In certain examples, the third element and the fourth element are each independently controllable, e.g., using a processor, to alter the first non-zero voltage and the second non-zero voltage during operation of a system comprising the ion interface.

In certain embodiments, the first element comprises a first cone comprising the first orifice. In other embodiments, the second element comprises a second cone comprising the second orifice. In additional embodiments, the third element comprises a third cone comprising the third orifice. In some instances, a cone opening angle of the third cone is less than a cone opening angle of the second cone. In some examples where three cones are present, the fourth element comprises a ring lens, and an inner diameter of the ring lens is greater than or equal to an outer diameter of the third cone.

In certain configurations, at least one of the first element and the second element is configured to electrically couple to ground. If desired, each of the first element and the second element is configured to electrically couple to ground.

In some configurations, the first region is configured to comprise a first pressure lower than atmospheric pressure. In other configurations, the second region is configured to comprise a second pressure lower than the first pressure. In additional configurations, the third region is configured to comprise a third pressure lower than the second pressure. In other configurations, the inflection point is at a region upstream of the downstream component.

In some embodiments, the ion interface comprises a non-conductive holder configured to receive the third element and the fourth element.

In certain configurations, each of the first element, the second element and the third element comprises nickel. In other configurations, the fourth element comprises an aperture-to-length ratio of less than 2.5. In some examples, the third element and the fourth element are configured to electrically couple to a single voltage source.

In an additional aspect, a mass spectrometer comprises an ionization source, an ion interface as described herein that is fluidically coupled to the ionization source, and a mass analyzer fluidically coupled to the mass spectrometer interface.

In certain configurations, the mass spectrometer comprises an ion guide between the mass analyzer and the interface. In some configurations, the ion guide is positioned directly downstream of the fourth element of the interface. In other configurations, the mass spectrometer comprises, a detector fluidically coupled to the mass analyzer. In certain configurations, the mass spectrometer comprises a sample introduction device fluidically coupled to the ionization source.

In some embodiments, the ionization source comprises one or more of an inductively coupled plasma, a discharge plasma, a capacitively coupled plasma, a microwave induced plasma, a glow discharge ionization source, a desorption ionization source, an electrospray ionization source, an atmospheric pressure ionization source, atmospheric pressure chemical ionization source, a photoionization source, an electron ionization source, and a chemical ionization source.

In some configurations, the mass analyzer comprises at least one quadrupole or a time of flight device.

In other configurations, the mass spectrometer comprises at least one of a collision cell, a reaction cell or a reaction/collision cell between the ion interface and the mass analyzer.

In certain embodiments, the mass spectrometer comprises a processor electrically coupled to the third element and the fourth element, wherein the processor is configured to independently alter a voltage provided to each of the third element and the fourth element.

In another aspect, a method of providing ions from an ionization source to a mass spectrometer component through a mass spectrometer interface is disclosed. In certain configurations, the method comprises providing ions from an ionization source into a first vacuum region through a first orifice of an electrically coupled to ground first element of the mass spectrometer interface. In other embodiments, the method comprises providing ions in the first vacuum region to a second vacuum region through a second orifice of an electrically coupled to ground second element of the mass spectrometer interface, wherein a pressure of the second vacuum region is lower than a pressure of the first vacuum region. In some configurations, the method comprises providing ions in the second vacuum region to a third vacuum region through a third orifice of a third element of the mass spectrometer interface, wherein a pressure of the third vacuum region is lower than a pressure of the second vacuum region, and wherein the third element comprises a first non-zero voltage. In some embodiments, the method comprises providing ions in the third vacuum region through a fourth element to the mass spectrometer component, wherein the fourth element comprises a second non-zero voltage and is configured to focus the provided ions prior to providing the focused ions to the mass spectrometer component.

In certain embodiments, the fourth element can be sized and arranged with an inner diameter that is greater than or equal to an outer diameter of the third element.

In some embodiments, the method comprises applying a positive voltage to the third element. In other embodiments, the method comprises applying a negative voltage to the fourth element. In some examples, the method comprises applying a positive voltage to the fourth, wherein the positive voltage applied to the fourth element is more positive than the positive voltage applied to the third element. In other examples, the method comprises providing the ions from fourth element directly to an ion guide. In certain embodiments, the method comprises independently altering the first and second non-zero voltage. In other examples, each of the first element, the second element and the third element comprises a cone. In some embodiments, the fourth element comprises a ring lens, and wherein a cone opening angle of a cone of the third element is less than a cone opening angle of a cone of the second element. In additional embodiments, the method comprises applying the second non a non-zero voltage to the lens to provide an electric field with an inflection point.

In another aspect, an ion interface comprises a terminal cone and a cylindrical lens. In some embodiments, the terminal cone comprises an orifice configured to receive ions from an ionization source and provide ions to a downstream region. In certain configurations, the terminal cone is configured to receive a first non-zero voltage. In some embodiments, the cylindrical lens comprises a first aperture configured to receive ions in the downstream region and focus the received ions prior to providing the focused, received ions to a downstream component, wherein the cylindrical lens is configured to receive a second non-zero voltage.

In certain embodiments, the ion interface comprises an entrance cone configured to receive ions directly from the ionization source, wherein the entrance cone comprises an orifice configured to receive the ions directly from the ionization source. In other examples, the ion interface comprises an intermediate cone between the entrance cone and the terminal cone, wherein the intermediate cone comprises an orifice that can provide ions to the terminal cone. In some embodiments, the entrance cone and the intermediate cone are each configured to electrically couple to ground.

Additional aspects, embodiments, configurations and examples are described in more detail below.

BRIEF DESCRIPTION OF THE SEVERAL VIEWS OF THE DRAWINGS

Certain specific configurations of ion interfaces and systems and methods using them are described below with reference to the accompanying drawings in which.

It will be recognized by the person having ordinary skill in the art, given the benefit of this disclosure, that the sizes, dimensions and positioning of the components in the figures are provided merely for illustration and to provide a more user friendly description of the technology. No particular length, width, height or thickness is intended to be required unless clearly specified in connection with a particular embodiment. The dimensions provided below are provided as exemplary dimensions, and other suitable dimensions, shapes and features can be present on the various elements and in the ion interfaces.

DETAILED DESCRIPTION

Certain illustrative configurations of ion interfaces are described that can be used to sample an incoming ion beam, focus the ions in the ion beam and provide the focused ions to another component. Embodiments of the ion interface may comprise desirable attributes including, but not limited to, enhanced transmission efficiency of ions, reduction in space-charge effects, higher sensitivities and the ability to optimize transmission of different ions in real time by altering voltages applies to different elements of the ion interface. Where the ion interface is present in a mass spectrometer, it can be considered, and is referred to in certain instances, a mass spectrometer interface. When certain embodiments of the ion interface are present in a mass spectrometer, increased sensitivity to ions across the mass range of the mass spectrometer may be observed. Additionally or alternatively, the signal to noise ratio across the mass range of the mass spectrometer may be increased.

In certain instances, in describing some of the illustrations herein, the terms “downstream” and “upstream” may be used for convenience. The position of one component relative to another component may be referenced by way of the direction of the incoming ion beam. For example, if an ion beam from an ionization source first enters the ion interface through a sampler cone and then encounters a skimmer cone, then the skimmer cone is downstream from the sampler cone, and the sampler cone is upstream of the skimmer cone.

Figure 1A:
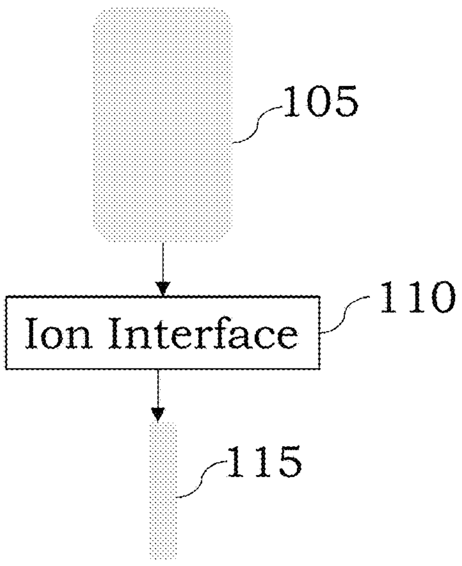
FIG. 1A is a block diagram showing an incoming ion beam, an ion interface and an ion output, in accordance with some examples.
Figure 1B:
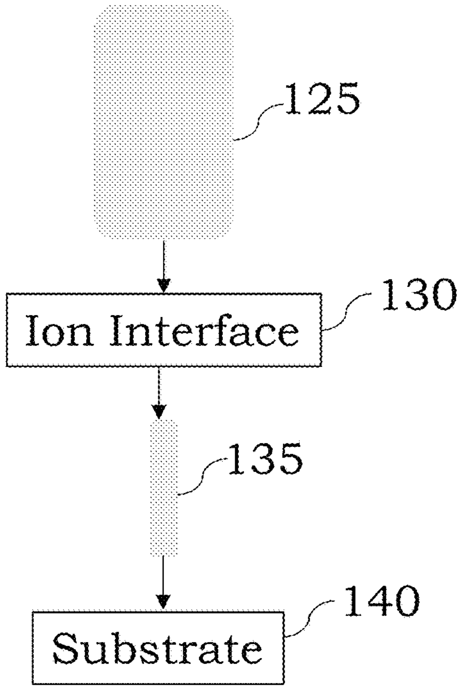
FIG. 1B is a block diagram showing an incoming ion beam, an ion interface, an ion output and a substrate, in accordance with some examples.
Figure 1C:
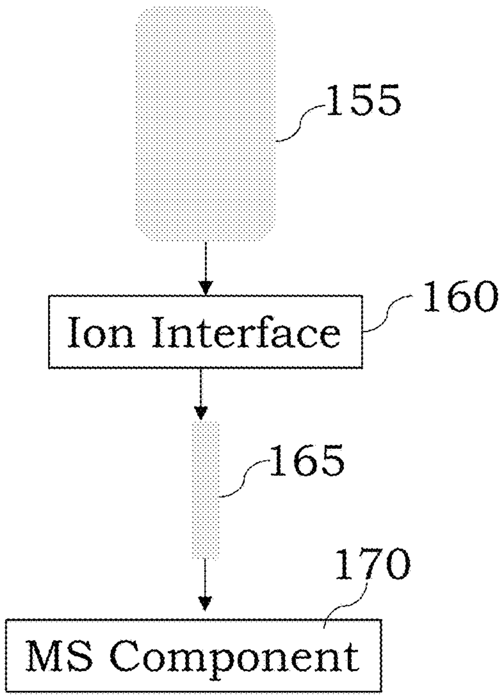
FIG. 1C is a block diagram showing an incoming ion beam, an ion interface, and an ion output to a downstream component of a mass spectrometer, in accordance with certain embodiments.
Figure 1D:
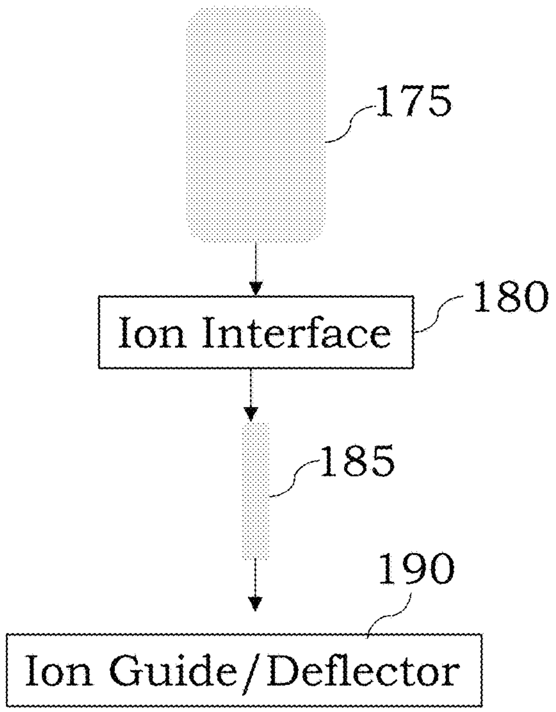
FIG. 1D is a block diagram showing an incoming ion beam, an ion interface and an ion output to an ion guide/deflector, in accordance with certain embodiments.
Figure 2A:
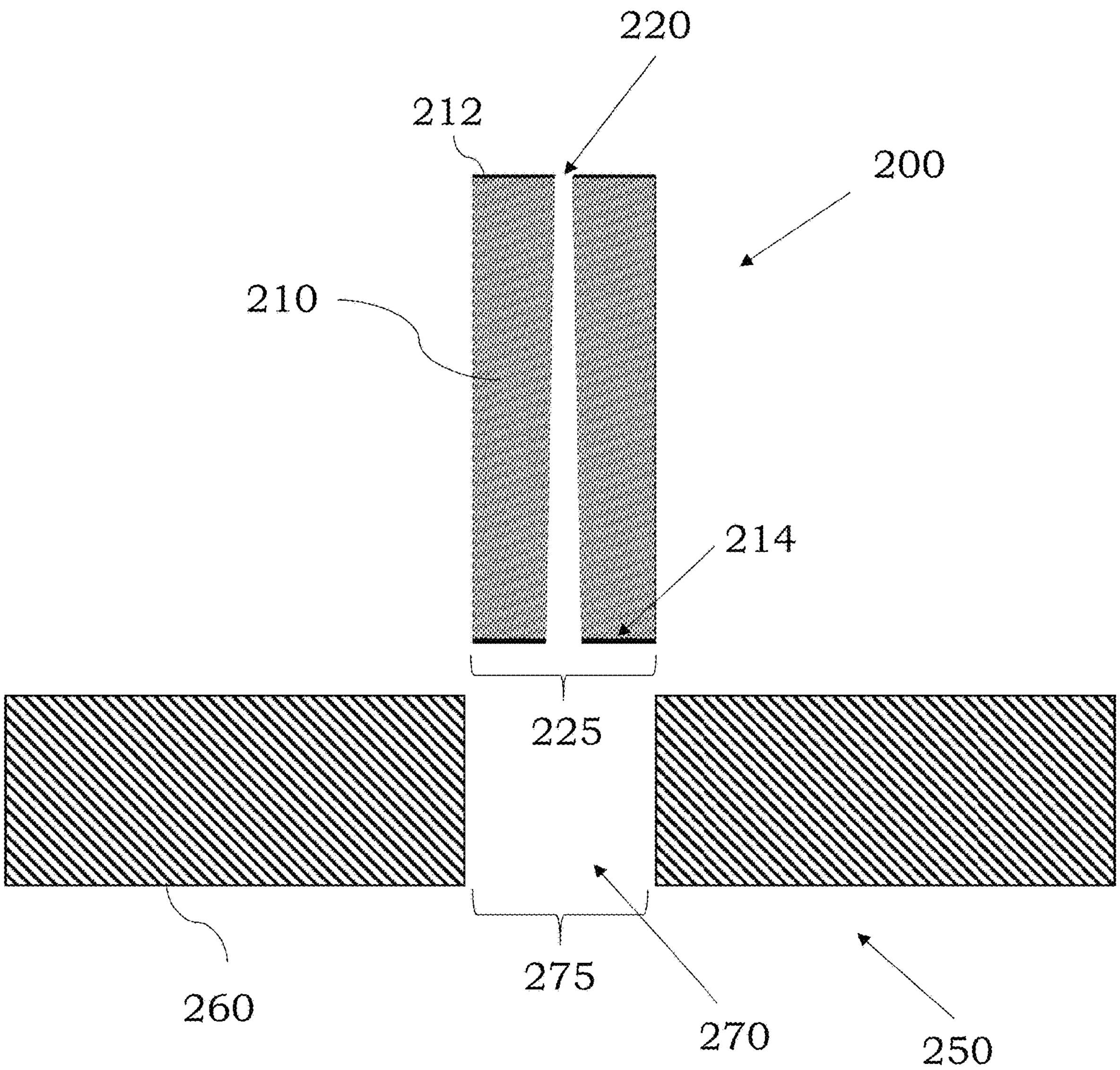
FIG. 2A is an illustration showing an ion interface comprising two elements, in accordance with some examples.

In certain configurations, the ion interfaces described herein can be used in analytical instruments, in ion switches, in ion implantation devices, in ion beam assisted molecular beam epitaxy devices, to select or focus ions or particles from sputtering devices used in physical and chemical vapor deposition and in other devices that use a beam of ions or particles. A generalized block diagram is shown in FIG. 1A where an incoming ion beam 105 impacts or encounters an ion interface 110. The ion interface 110 can be configured to receive or sample a portion of the incoming ion beam 105, e.g., to extract some but not all ions in the incoming ion beam, focus the ions and then provide an ion output 115 to a downstream component (not shown). The exact degree to which the ions are sampled and/or focused may vary, for example, depending on the nature of the ions in the incoming ion beam 105, the exact type and number of components in the ion interface 110 and the desired ion output 115. For example and referring to FIG. 1B, an ion interface 130 can be configured to provide an ion output 135 from an incoming ion beam 125 to a surface of a substrate 140. The ions provided to the substrate 140 can be used to eject electrons or other material from the substrate 140 or may implant ions on or in the surface of the substrate 140. In another configuration and referring to FIG. 1C, an ion interface 160 can be used in a mass spectrometer to provide an ion output 165 from an incoming ion beam 155 to a downstream mass spectrometer (MS) component 170. For example, the ion interface 160 may comprise two or more elements that can be used to sample and/or focus the ions in the incoming beam 155 to provide the ion output 165 to a downstream component present in a mass spectrometer. In another configuration and referring to FIG. 1D, an ion interface 180 can be used in a mass spectrometer to provide an ion output 185 from an incoming ion beam 175 directly to an ion guide/deflector 190. For example, it may be desirable to provide the ion output 185 directly to an ion guide/deflector 190 without using any intervening components, e.g., a collision cell, between the interface 180 and the ion guide/deflector. In some instances, the ion interfaces 110, 130, 160, and 180 may comprise one or more cones and one or more cylindrical lenses as noted in more detail herein. However, the components of ion interfaces of some embodiments are not limited to these particular components. In certain embodiments, an ion interface may comprise two or more elements as illustrated in FIG. 2A. A member or element 200 comprises a body 210 and an orifice 220. Another member or element 250 comprises a body 260 and an orifice 270. While shown as two-dimensional in FIG. 2A, the element 200 and the element 250 are typically three-dimensional and may adopt various shapes and geometries as noted below. In use of the ion interface of FIG. 2A, an incoming ion beam (not shown) can be incident on the surface 212 of the body 210. A portion of the incoming ion beam enters into the orifice 220 and is provided to the downstream element 250 through the orifice 220 at a side or end 214 of the body 210. As noted in more detail below, the element 250 can receive a non-zero voltage to focus the received ions prior to providing them to a downstream component. In certain embodiments, the element 200 may be a terminal element or a terminal cone, e.g., a hyperskimmer cone. Reference to a terminal cone refers to the cone being the last cone present in the interface, e.g., the cone which is furthest downstream from the entrance of the ion interface relative to other cones that may be included in the interface (but not necessarily the furthest downstream component of the interface). The exact configuration of the element 200 may vary, and in some instances, the element 200 may comprise shapes other than conical shapes including, for example, disc shapes, elongated discs, asymmetric discs, spherical shapes, prolate spheroid shapes and other shapes. The element 250 may be a lens such as a cylindrical lens, e.g., a ring lens that can be used to focus received ions from the element 200 prior to providing them to the downstream component. The materials used for the element 200 and element 250 may also vary depending on the nature of the incoming ion beam. Where high temperate ion beams are present, e.g., ion beams from an inductively coupled plasma, the element 200 and/or element 250 may comprise a metal such as, for example, nickel, copper, titanium, platinum, palladium, silver, gold or other metals. In some instances, the element 200 may desirably be electrically conductive. In other examples, the element 200 may be thermally conductive. In additional configurations, the element 200 may be electrically conductive and thermally conductive. Various specific configurations and materials for the elements 200, 250 are discussed in more detail below.

In certain embodiments, an inner diameter 275 of the orifice 270 of the element 250 may be greater than or equal to an outer diameter of the orifice 220. For example, the inner diameter 275 may be larger than the outer diameter 225 or the same as the outer diameter 225 as desired. While the exact dimensions may vary, the outer diameter of the element 200 may vary from about 0.5 cm to about 3 cm or about 1 cm to about 2.5 cm. The inner diameter of the element 200 can vary from about 0.75 cm to about 2.75 cm or about 1 cm to about 2.6 cm, though other dimensions are also possible. In some examples, the element 250 is positioned directly adjacent to the element 200 such that no intervening physical components or structures are present between them. While the exact longitudinal spacing between the element 200 and the element 250 may vary, illustrative spacing is from about 0.5 mm to about 10 mm or about 1 mm to about 5 mm. This spacing can be fixed or may be adjusted as desired.

Figure 2B:
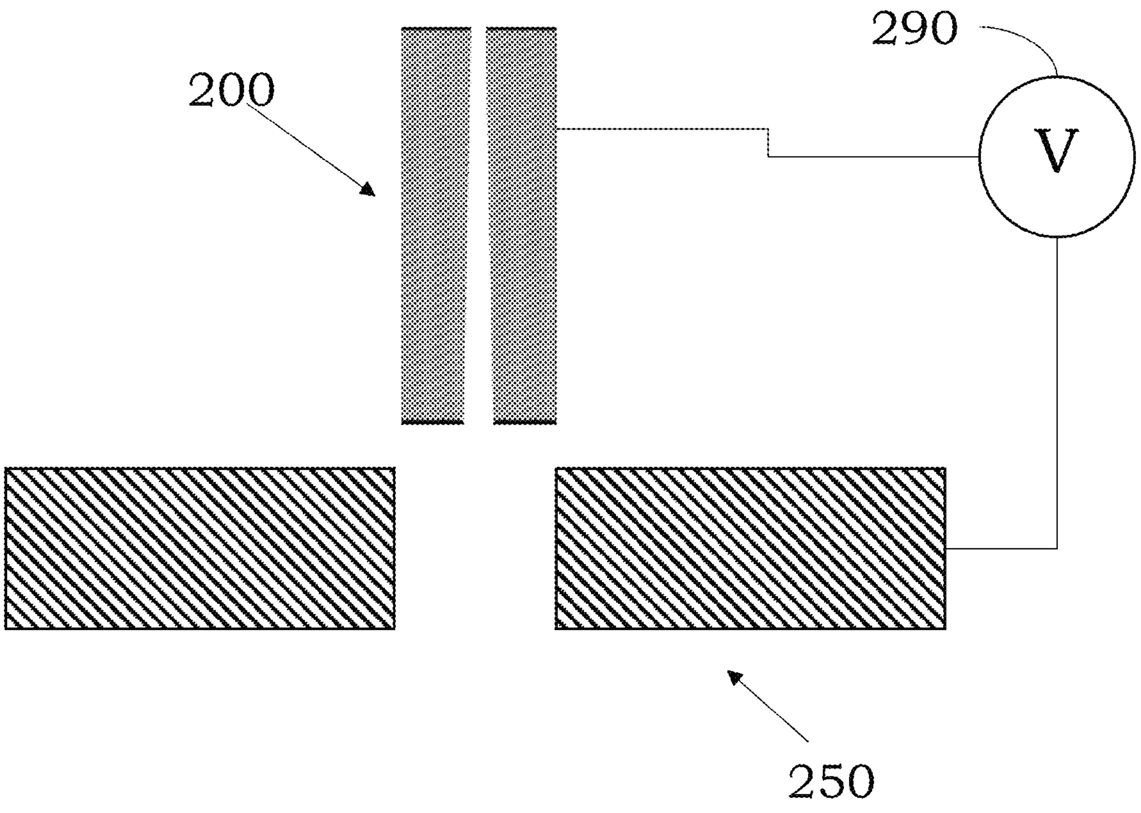
FIG. 2B is an illustration showing a power source electrically coupled to the two elements of FIG. 2A, in accordance with certain configurations.

In certain embodiments, the element 200 can be configured to receive a non-zero voltage from a voltage source as shown in FIG. 2B. For example, the voltage applied to the element 200 from a voltage source 290 may be positive or negative but is generally not zero, e.g., the element 200 is not electrically coupled to ground. Application of the voltage to the element 200 provides a charge on the element 200 that can be used to sample and/or focus ions. Similarly, the element 250 can be configured to receive a non-zero voltage, e.g., a positive or a negative voltage, from the voltage source 290 so a charge is present on the element 250. In some examples, the voltage applied to the element 250 may be from a different voltage source (not shown). The voltage source 290 may be a DC voltage source, an AC voltage source, an RF voltage source or other sources. In some configurations, a DC voltage is provided to each of the first element 200 and the second element 250. If desired, different voltage sources that provide different waveforms can be used to provide a voltage to each of the element 200 and the element 250. The exact voltage provided to the different components can vary. For example, a negative voltage less than zero to about −50 Volts can be applied to the element 200. Alternatively, a positive voltage greater than zero and up to about +30 Volts can be applied to the element 200. A negative voltage less than zero to about −300 Volts can be applied to the element 250. Alternatively, a positive voltage greater than zero and up to about +50 Volts can be applied to the element 250. During use of the ion interface, the voltages provided to the elements 200 and 250 can independently be altered as desired.

Figure 3A:
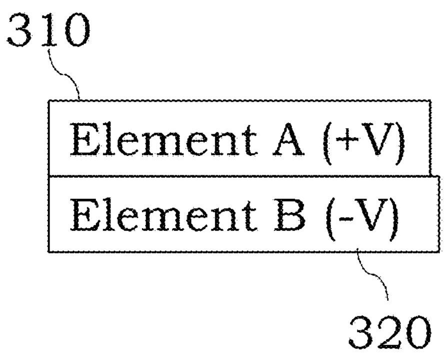
FIGS. 3A, 3B and 3C are block diagrams showing several configurations of an interface that includes two elements, in accordance with some configurations.
Figure 3B:
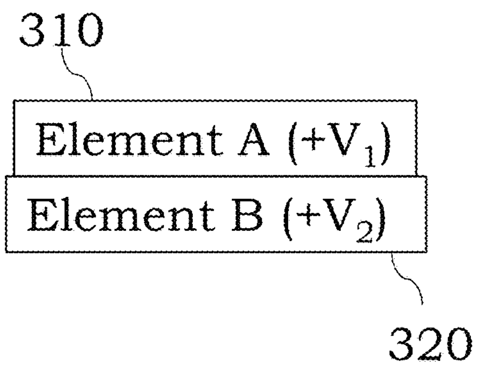
Figure 3C:
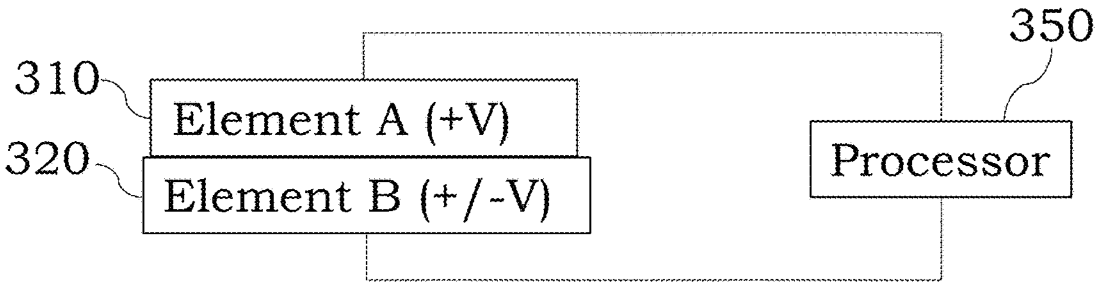

In certain examples, the voltages applied to each of the element 200 and the element 250 may vary. Several possible configurations are shown in FIGS. 3A-3C. An element A 310 may be configured similar to element 200. Element B 320 can be configured similar to element 250. Referring to FIG. 3A, a positive voltage is applied to the element 310, and a negative voltage is applied to the element 320. For example, the positive voltage applied to the element 310 can focus the incoming ions toward the element 310. As ions pass through an orifice of the element 310, they can be quickly accelerated out of the element 310 (which also prevents ion expansion that can result in more lost ions and lower throughput). The negative voltage applied to the element 320 can act to pull ions out of the element 310 before expansion due to the space-charge effects can occur. The exact magnitude of the voltages applied to each of the elements 310, 320 can vary. For example, the positive voltage applied to the element 310 may vary from a positive voltage greater than zero to a positive voltage of about +30 Volts. The negative voltage applied to the element 320 may vary from a negative voltage less than zero to a negative voltage of about −300 Volts.

Referring now to FIG. 3B, the element 310 and the element 320 are each positively charged. In certain embodiments, the voltage applied to the element 320 may be slightly more positive than the voltage applied to the element 310, e.g., $+V_2 > +V_1$. For easy to ionize samples, e.g., potassium, sodium, etc., application of the positive voltages to the elements 310, 320 can act to reduce overall background noise. For example, where analyte ions of interest are present at low amounts, e.g., a few parts per trillion, the configuration shown in FIG. 3B may be desirable to implement to detect these low ion levels. The exact magnitude of the positive voltages applied to each of the elements 310, 320 in FIG. 3B can vary. For example, the positive voltage applied to the element 310 may vary from a positive voltage greater than zero to a positive voltage of about +30 Volts. The positive voltage applied to the element 320 may vary from a positive voltage greater than zero to a positive voltage of about +50 Volts. As noted herein, the element 320 may be held at a slightly more positive voltage, e.g., +2, +3, +4, +5, +6, +7 or +8 Volts more positive, than the voltage applied to the element 310.

In certain examples, the voltages applied to the element 310 and the element 320 can be altered in real time using a processor 350 as shown in FIG. 3C. As noted herein, the processor 350 can be a stand-alone processor or part of a controller or larger system used to control other components. The processor 350, for example, can control the voltage applied to each of the elements 310, 320 to alter the mode of operation of the device or system comprising the elements 310, 320. For example, the processor 350 can be used to apply a positive voltage to the element 310 and a negative voltage to the element 320 in a first mode and then switch the voltage applied to the element 320 to positive voltage in a second mode. This mode switching can be performed by the processor 350 without changing the other operating parameters of the system, if desired, to switch the mode in real time.

Figure 4A:
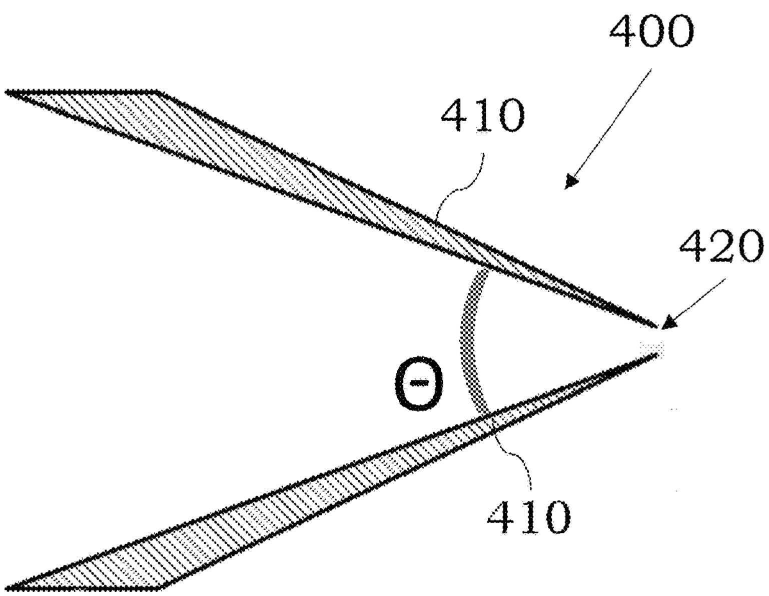
FIGS. 4A and 4B are illustrations of a cone, in accordance with some embodiments.

In some embodiments, the element 200 can be configured as a skimmer cone. Referring to FIG. 4A, a side view of a skimmer cone 400 is shown that comprises a body 410 and an orifice 420. The cone opening angle Θ of the skimmer cone may vary. For example, where the skimmer cone is configured as a hyperskimmer cone that can receive a positive voltage, the opening angle Θ of the hyperskimmer cone may be less than an opening angle of an upstream cone, e.g., an upstream sampler cone or an upstream skimmer cone. In some examples, the cone opening angle may vary from about 35 degrees to about 45 degrees. The exact dimensions of the cone 400 may vary, and illustrative dimensions include a cone height of about 10 mm to about 15 mm and a cone radius of about 6 mm to about 9 mm. Illustrative cone surface areas are about 350 $mm^2$ to about 750 $mm^2$, and illustrative cone volumes may vary from about 350 $mm^3$ to about 1200 $mm^3$. The diameter of the orifice 420 of the cone 400 may vary from about 0.5 mm to about 1.5 mm. The shape of the orifice 420 may vary and may be circular, elliptical or have other geometric shapes. If desired, more than a single opening or orifice may be present in the body 410 of the cone 400. The cone 400 can be produced from various materials. In some examples, the material used to produce the cone 400 is electrically conductive. In other examples, the material used to produce the cone 400 is thermally conductive. In additional examples, the material used to produce the cone 400 is electrically conductive and thermally conductive. In certain configurations, the cone 400 may comprise one or more of nickel, copper, titanium, platinum, palladium, silver, gold or other metals. In certain embodiments, the cone 400 may be a hyperskimmer that can be used as part of a system that can reduce the overall pressure in smaller steps and provide less dispersion of the ion beam. The hyperskimmer is typically used with one or more upstream cones that is positioned closer to an ionization source than the hyperskimmer. Various configurations using two or more cones are discussed further below.

Figure 4B:
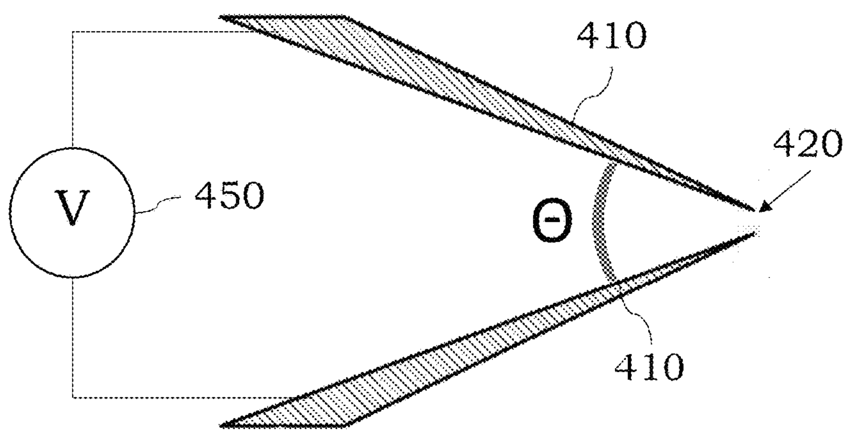

In certain examples and referring to FIG. 4B, the cone 400 can be electrically coupled to a voltage source 450. For example, the voltage source 450 can be used to provide a non-zero voltage to the cone 400. In some examples, the non-zero voltage applied to the cone 400 may be positive. Where a positive voltage is used, the cone 400 can act to focus an ion beam that enters the cone through the orifice 420. The focused ion beam can then be provided to a downstream component. In some embodiments, the voltage applied to the cone 400 may vary from a positive voltage greater than zero to about +30 Volts. In other embodiments, the voltage applied to the cone may be negative, e.g., a negative voltage less than zero to about −50 Volts. The voltage can be applied using a DC voltage source or other voltage source. Where multiple cones are present, the orifice shape of different cones can be the same or can be different.

Figure 5A:
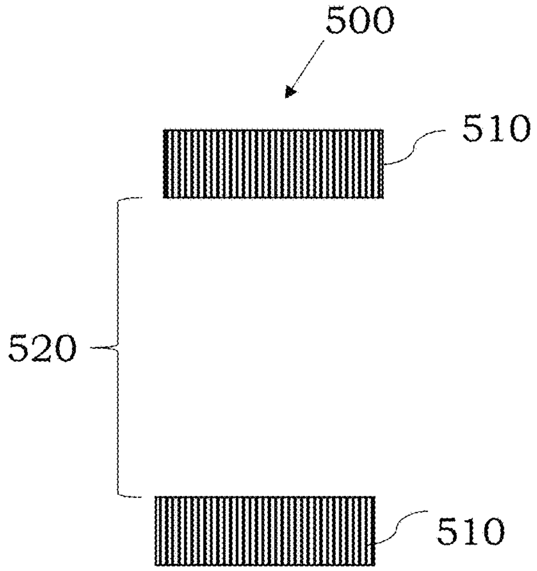
FIGS. 5A and 5B show a cross-section of a cylindrical lens, in accordance with certain embodiments.

In certain configurations, the element 250 can be configured as a cylindrical lens such as, for example, a ring lens. A side view of a cylindrical lens 500 is shown in FIG. 5A. The cylindrical lens 500 comprises a body 510 and an aperture 520. The exact length and width of the body 510 and the diameter of the aperture 520 may vary. In some embodiments, the diameter of the aperture 520 may be greater than a length of the body 510. The diameter of the aperture 520 is typically fixed though adjustable diameter lenses could be used if desired. In some examples, the cylindrical lens comprises a length of about 5 mm to about 7 mm, and an outer diameter of about 16 mm to about 19 mm. In certain configurations, the aperture 520 may comprise a diameter of about 14 mm to about 16 mm. In some embodiments, the aperture-to-length ratio of the cylindrical lens may be 2.5 or less. For example, compared to a flat lens whose length or height is small, the length or height of a cylinder lens is large. In some examples, the aperture-to-length ratio of the cylindrical lens may be less than 2.2, less than 2.0 or even less than 1.5. As the length of the cylinder lens increases at a fixed aperture diameter, the diameter-to-length ratio should decrease.

Figure 5B:
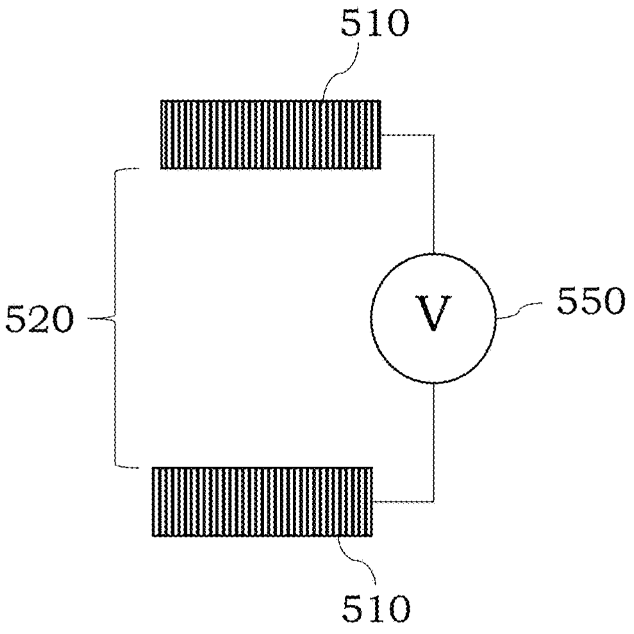

In certain configurations, the cylindrical lens 500 may be electrically coupled to a voltage source 550 as shown in FIG. 5B. For example, the voltage source 550 can be used to provide a non-zero voltage to the lens 500. In some examples, the non-zero voltage applied to the lens 500 may be negative or positive. Where a negative voltage is applied to the lens 500, the lens 500 can act to pull ions into the aperture 520 and focus them before providing the focused ions to a downstream component. The exact negative voltage used may vary from a negative voltage less than zero to a negative voltage of about −300 Volts, e.g., a negative voltage of about −100 Volts to −250 Volts can be used. Where a positive voltage is applied to the lens 500, the lens can be used to focus ions while at the same time reducing background noise. The exact positive voltage applied to the lens 500 may vary from a positive voltage greater than zero to a positive voltage of about +50 Volts. If desired, the voltage provided to the lens 500 may be changed during operation of a system comprising the lens 500. For example, a processor (not shown) can be used to alter the voltage provided to the lens 500 from positive to negative or from negative to positive in real time during operation of the system.

In certain embodiments, the exact materials used to produce the lens may vary, and the lens typically comprises one or more conductive materials such that application of a non-zero voltage to the lens can provide an electric field within the aperture 520 of the lens. In some embodiments, the lens may be produced from the same or similar materials as used to produce the other elements of the ion interface, e.g., the lens materials may comprise nickel, copper, titanium, platinum, palladium, silver, gold or other metals or conductive materials. If desired, the lens may be placed in a holder configured to receive the lens at one side and an upstream element at another side. The holder typically comprises a non-conductive material such that any voltage applied to the lens is not provided to the upstream element through the holder. The non-conductive material may be, for example, a glass, a plastic, a non-metal, a polymer or other materials that are non-conductive. The holder can retain the elements of the ion interface using a friction fit, threads, spring-loaded retainers, one or more external fasteners or other devices or structures.

Figure 6A:
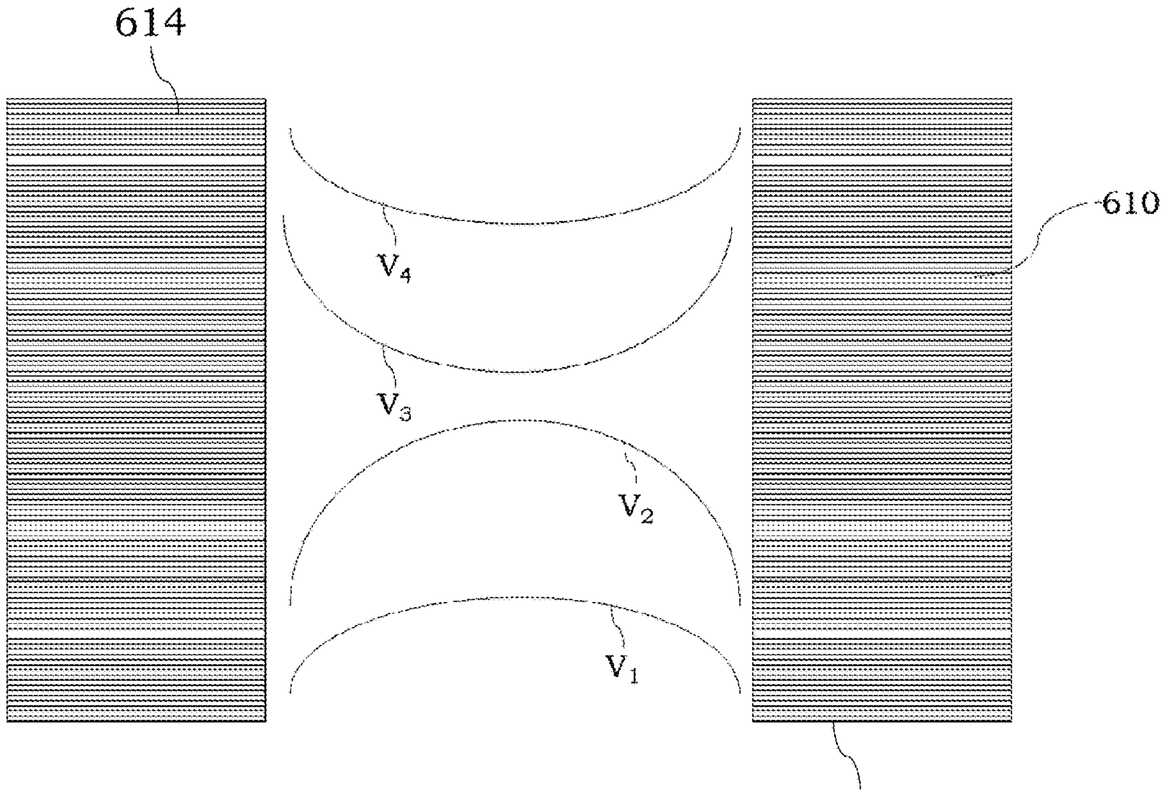
FIGS. 6A and 6B are illustrations showing field lines within a cylindrical lens, in accordance with some examples.
Figure 6B:
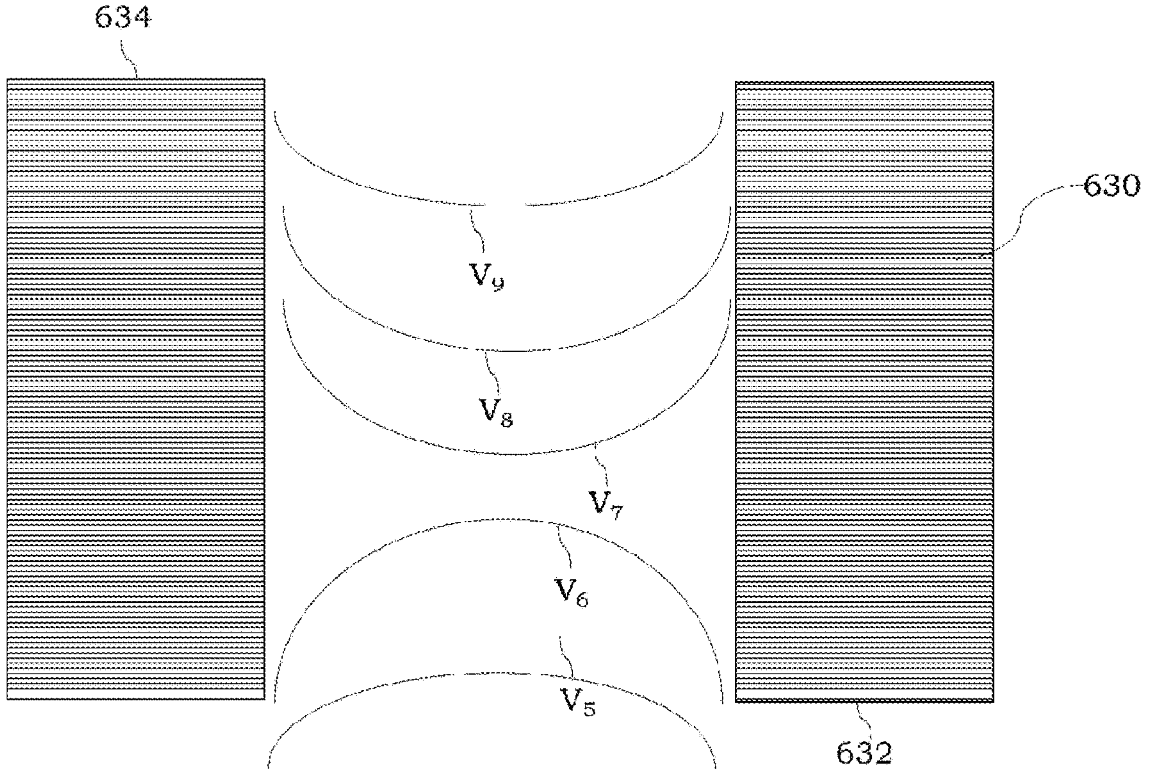

In certain configurations, the voltage received by the lens can be configured to provide an electric field with an inflection point. One illustration is shown in FIG. 6A, where a ring lens 610 is shown. Equipotential lines with voltages $V_1$-$V_4$ are shown. In a typical configuration where a negative potential is applied to the ring lens 610, the potential is more positive toward a front surface 612 of the ring lens 610, e.g., near $V_1$ and then decreases toward a minimum within the lens 610, e.g., $V_2$ is more negative than $V_1$. The voltage then can increase or have a lower magnitude negative potential moving toward the back surface 614 of the lens 610, e.g., $V_4$ is less negative than $V_3$. In instances where a first element is used with the lens 610, the potential can be positive on the first element and then decrease to the negative minimum within or near the lens 610 and the become less positive as the ions exit the lens 610 toward the back surface 614. The absolute voltage difference from the front surface 612 of the lens 610 to the minimum voltage or inflection point may vary, for example, from about 50 Volts to about 150 Volts. In addition, the minimum or inflection point need not be centralized within the aperture of the lens 610 but could instead be positioned closer to the front surface 612, the back surface 614 or even in front of the lens surface 612 or behind the lens surface 614. For example, FIG. 6B shows another configuration where the minimum occurs at $V_6$ closer to the front 632 of the lens 630, e.g., $V_6$ is more negative than $V_5$ and the voltage can increase (become less negative) as the ions move from $V_7$ to $V_8$ and $V_9$ toward the back surface 634 of the lens 630. The exact field shape and pattern can vary as desired. As noted herein, the field can be used to accelerate ions out of an upstream element toward the lens where they can be focused or squeezed before exiting the lens. The voltage applied to the lenses 610, 630 can be a DC voltage or other voltage sources can be used if desired. In addition, the voltage applied to the lenses 610, 630 can ab altered during use of the lenses 610, 630.

Figure 7A:
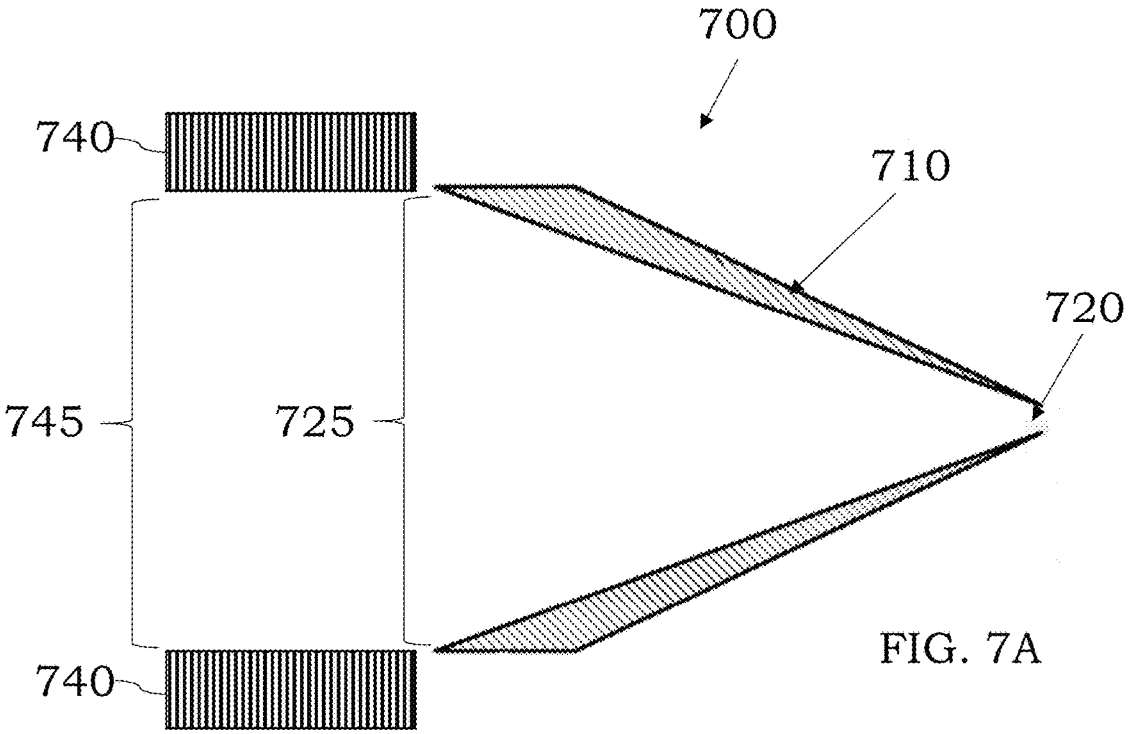
FIGS. 7A, 7B and 7C are illustrations of an ion interface comprising a cone element and a lens element, in accordance with some embodiments.
Figure 7B:
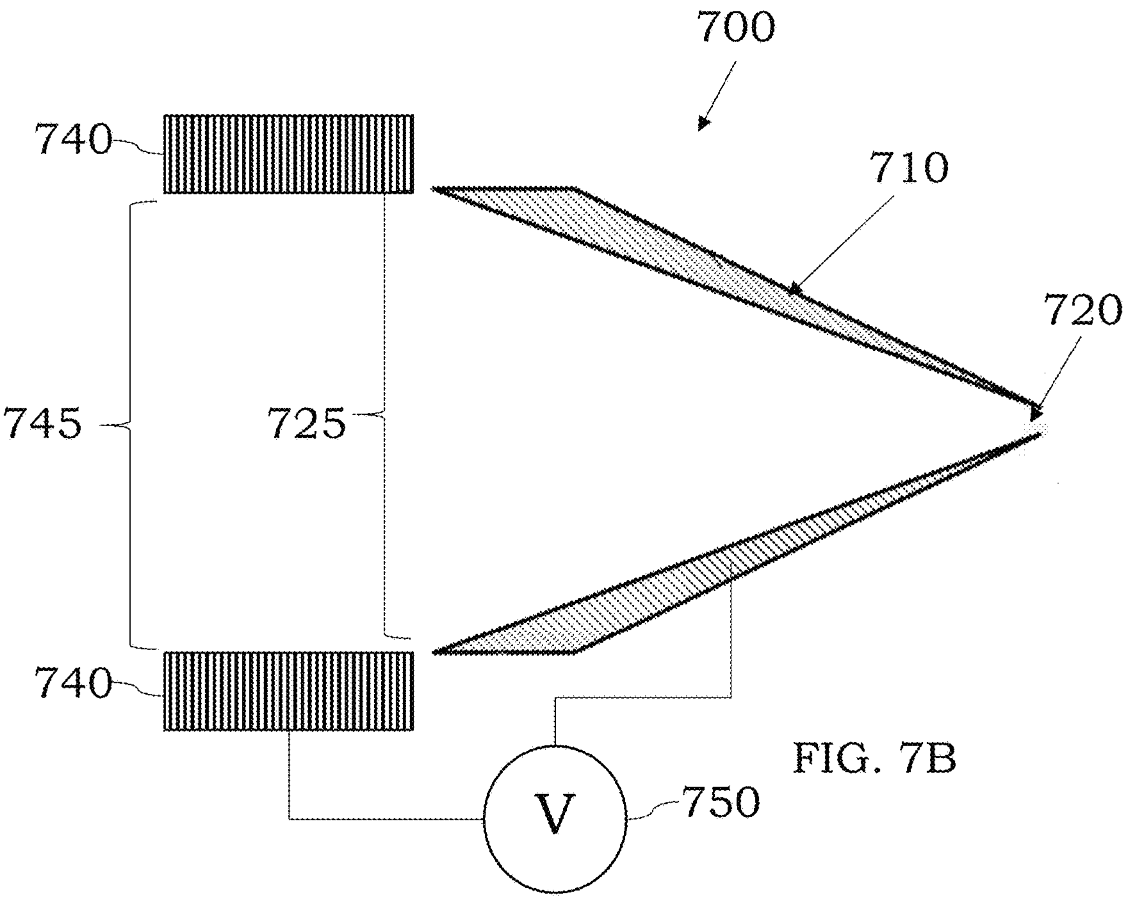
Figure 7C:
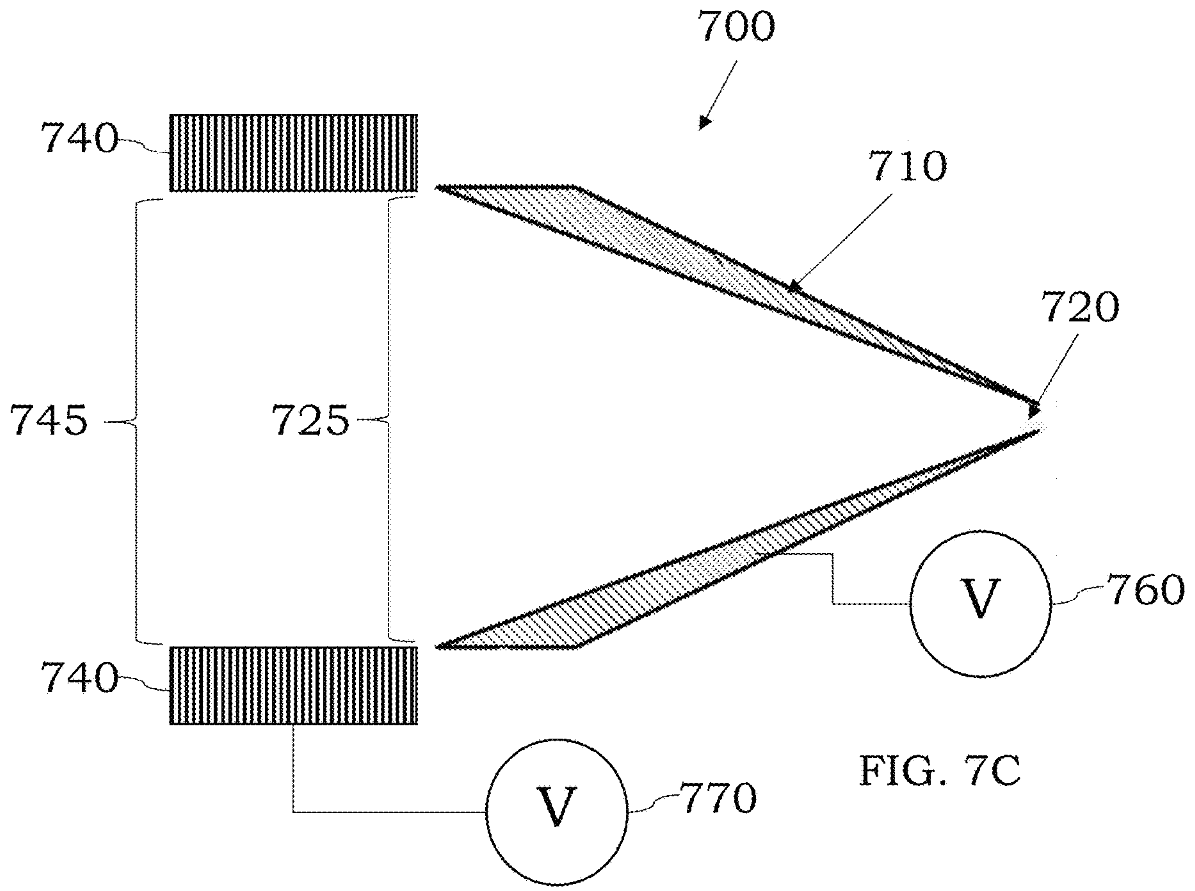

In certain embodiments, an element such as a cone can be used with another element such as a lens, for example, to increase ion transmission efficiency, reduce background noise, reduce space-charge effects, etc. An illustration is shown in FIG. 7A where an ion interface 700 comprises a cone 710 comprising an entrance orifice 720 and an exit orifice 725. The interface 700 also comprises a cylindrical lens 740 comprising an aperture 745. In some instances, a diameter of the aperture 745 of the lens 740 may be greater than or equal to a diameter of the exit orifice 725. Ions in an ion beam are first incident on the cone 710, and certain ions pass through the entrance orifice 720. The cone 710 can act to pull the ions into the cone 710 and can focus the ions and provide them to the lens 740. The lens 740 may also focus the ions before providing them to a downstream component. For example and referring to FIG. 7B, a voltage source 750 can be used to apply a non-zero voltage to each of the cone 710 and the lens 740. For example, a positive voltage greater than zero to a positive voltage of about +30 Volts can be provided to the cone 710 from the voltage source 750. If desired, however, a negative voltage between −50 Volts to 0 Volts can be applied to the cone 710. A negative or a positive voltage can be provided to the lens 740 from the voltage source 750. Where a negative voltage is applied to the lens 740, the negative voltage can vary from a negative voltage less than zero to a negative voltage of about −300 Volts. Where a positive voltage is applied to the lens 740, the positive voltage can be a positive voltage greater than zero to a positive voltage of about +50 Volts. The voltages are typically provided using a DC voltage source though other sources can be used. In another configuration, two separate voltage sources can be used to provide a voltage to the cone 710 and the lens 740. Referring to FIG. 7C, a first voltage source 760 can provide a first non-zero voltage to the cone 710, and a second voltage source 770 can provide a second non-zero voltage to the lens 740. The voltage source 760 can apply a positive voltage to the cone 710, e.g., can provide a positive voltage greater than zero up to about +30 Volts, or can apply a negative voltage to the cone 710. The voltage source 770 can apply a positive voltage or a negative voltage to the lens 740, e.g., a voltage of about −300 Volts up to about +50 Volts. The materials of the cone 710 may be, for example, any of those materials described in reference to FIGS. 4A and 4B.

Figure 8A:
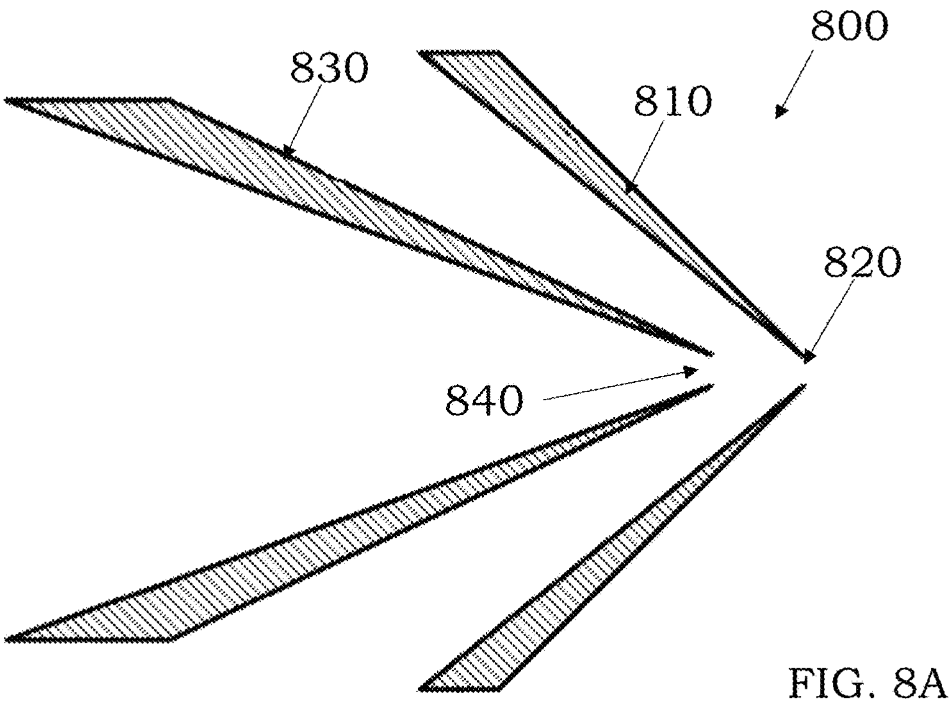
FIGS. 8A and 8B are illustrations of an ion interface comprising two cone elements, in accordance with certain embodiments.
Figure 8B:
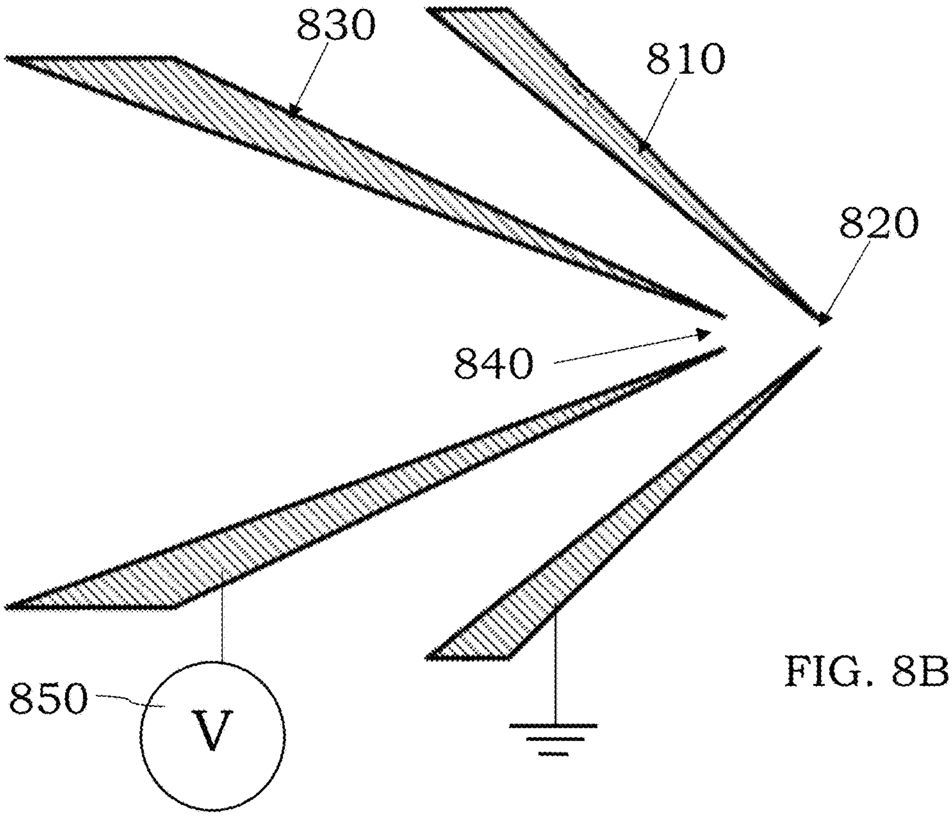

In certain examples, an element such as a cone can be used with an additional element or additional cone to sample and/or focus ions. One illustration is shown in FIG. 8A, where an ion interface 800 comprises a first cone 810 and a second cone 830. In this illustration, the second cone 830 would be considered the terminal cone. The first cone 810 comprises a first orifice 820 that can receive ions. The second cone 830 comprises a second orifice 840 that can receive ions. As shown in FIG. 8B, the first cone 810 can be configured to electrically couple to ground, and the second cone 830 can be configured to receive a non-zero voltage from a voltage source 850. For example, the second cone 830 can be configured to receive a positive voltage from the source 850, e.g., a voltage greater than zero volts up to about +30 Volts, or can receive a negative voltage. The cone opening angle of the cone 830 is typically less than a cone opening angle of the cone 810. The diameter of the first orifice 820 may vary from about 0.9 mm to about 1.3 mm, and the diameter of the second orifice 840 may vary from about 0.5 mm to about 1.1 mm. The orifice shapes of the cones 810, 830 can be the same or can be different, e.g., circular, elliptical, etc. In some examples, a front surface of the cone 810 can be spaced a distance of about 2 mm to about 5 mm from a front surface of the cone 830

In use of the cones 810, 830, ions from an ion source are typically incident first on the cone 810. A portion of the ions can be sampled through the orifice 820 and provided to the downstream cone 830. The charge on the cone 830 can act to pull the ions through the orifice 840. A portion of those ions may pass through the orifice 840 of the cone 830 and can be focused or accelerated out of the cone 830 using a suitable voltage provided to the cone 830. The cones 810, 830 may comprise the same or different materials, e.g., each of the cones 810, 830 may independently comprise nickel, copper, titanium, platinum, palladium, silver, gold or other metals. In some instances, each of the cones 810, 830 comprises nickel. If desired, the cone 810 could be produced from a non-conductive material, so the cone 810 need not be electrically grounded.

Figure 9A:
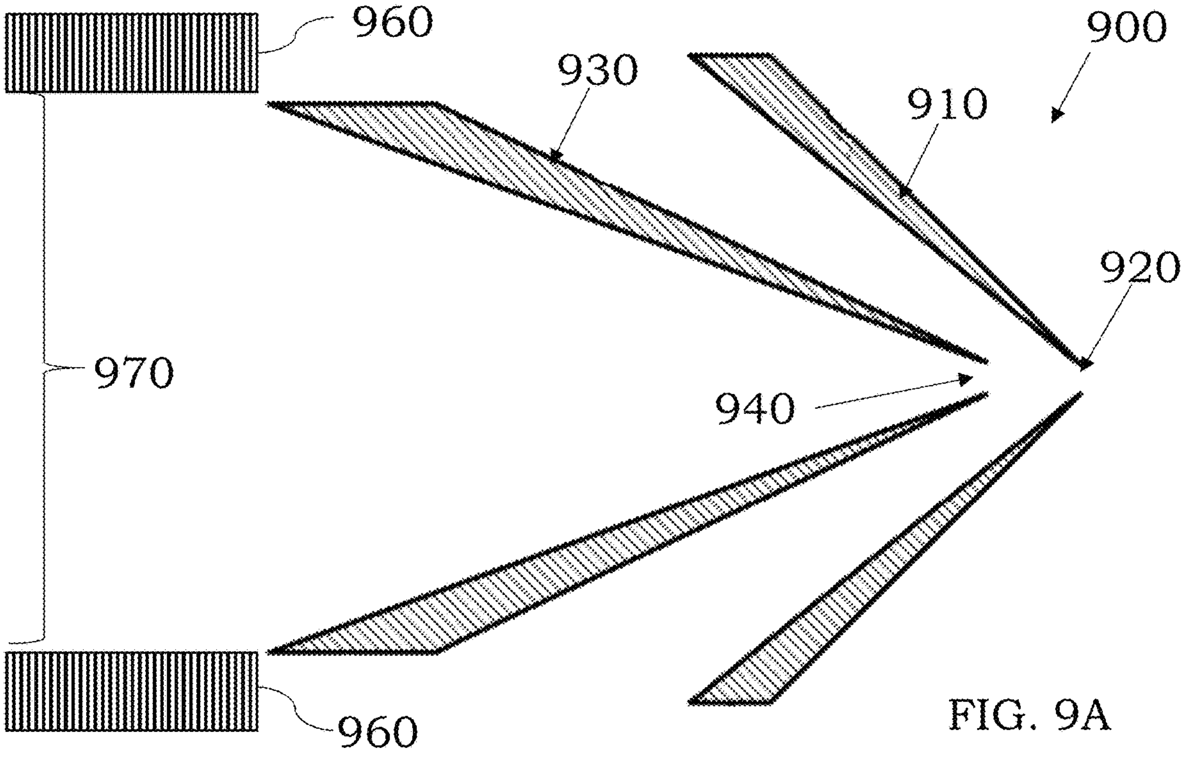
FIGS. 9A, 9B and 9C are illustrations of an ion interface comprising two cone elements and a lens element, in accordance with certain embodiments.
Figure 9B:
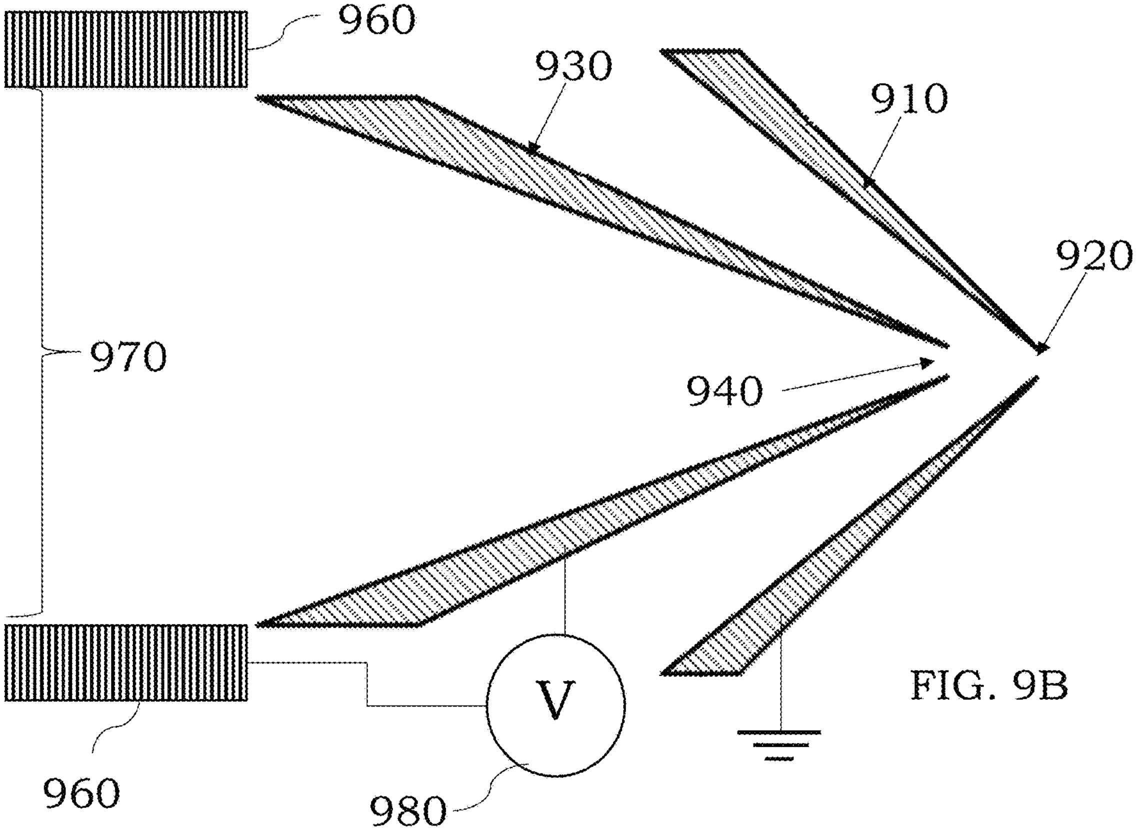
Figure 9C:
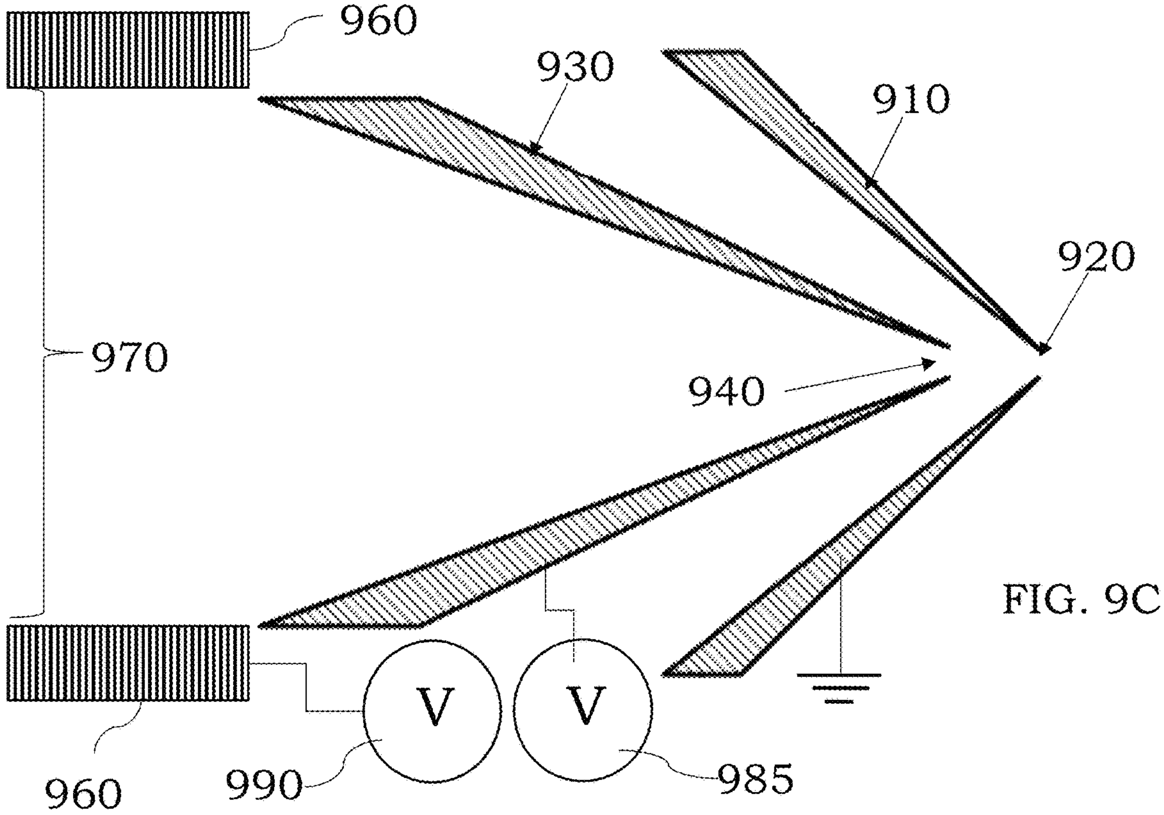

In some configurations, two or more elements, e.g., two or more cones, can be used in combination with a cylindrical lens as shown in FIG. 9A. The ion interface 900 comprises a first cone 910 with a first orifice 920 that can receive ions, a second cone 930 with a second orifice 940 that can receive ions, and a cylindrical lens 960 with an aperture 970 that can receive ions. In this illustration, the cone 930 can be considered a terminal cone. As shown in FIG. 9B, the first cone 910 can be configured to electrically couple to ground, and the second cone 930 can be configured to receive a non-zero voltage from a voltage source 980. For example, the second cone 930 can be configured to receive a positive voltage from the source 980, e.g., a voltage greater than zero volts up to about +30 Volts, or can receive a negative voltage. The lens 960 can be configured to receive a positive or negative voltage from the voltage source 980, e.g., a voltage between about −250 Volts to about +50 Volts. Where the lens 960 receives a positive voltage, the positive voltage is typically more positive than the positive voltage applied to the cone 930, e.g., about +1, +2, +3, +4, +5, +6, +7 or +8 Volts more positive. If desired, two different voltage sources can be used to provide a voltage to the cone 930 and the lens 960. For example and referring to FIG. 9C, a first voltage source 985 is electrically coupled to the cone 930, and a second voltage source 990 is electrically coupled to the lens 960. The cone opening angle of the cone 930 is typically less than a cone opening angle of the cone 910. The diameter of the first orifice 920 may vary from about 0.6 mm to about 1.2 mm, and the diameter of the second orifice 940 may vary from about 0.8 mm to about 1.2 mm. The diameter of the aperture 970 is typically equal to or greater than the outer diameter of the cone opening at the end of the cone 930 that is adjacent to the lens 960. The orifice shapes of the cones 910, 930 can be the same or can be different, e.g., circular, elliptical, etc. If desired, the lens 960 can be placed immediately adjacent to the cone 930 without any intervening components or structures between them. Further, the lens 960 and the cone 930 can be held together using a coupler or connector as desired. In some examples, a front surface of the cone 910 can be spaced a distance of about 2 mm to about 5 mm from a front surface of the cone 930. The front surface of the cone 930 can be spaced about 15 mm to about 25 mm from a front surface of the lens 960.

In use of the cones 910, 930 and the lens 960, ions from an ion source are typically incident first on the cone 910. A portion of the ions can be sampled through the orifice 920 and provided to the downstream cone 930. A portion of those ions may pass through the second orifice 940 of the cone 930 and can be focused or accelerated out of the cone 930 using a suitable voltage provided to the cone 930. A suitable voltage can be provided to the lens 960 to increase acceleration of the ions out of the cone 930. The lens 960 can focus or squeeze the ions as they pass through the aperture 970 of the lens 960. The ions can then exit the lens 960 as a focused beam and can be provided to a downstream component. The cones 910, 930 may comprise the same or different materials, e.g., each of the cones 910, 930 may independently comprise nickel, copper, titanium, platinum, palladium, silver, gold or other metals. In some instances, each of the cones 910, 930 comprises nickel. If desired, the cone 910 could be produced from a non-conductive material so the cone 910 need not be electrically grounded. As noted herein, the lens 960 may comprise an electric field with a minimum or inflection point within the aperture 970, in front of the aperture 970 or behind the aperture 970. The lens 960 can be produced from those materials described in connection, for example, with the lens shown in FIGS. 5A and 5B.

Figure 10A:
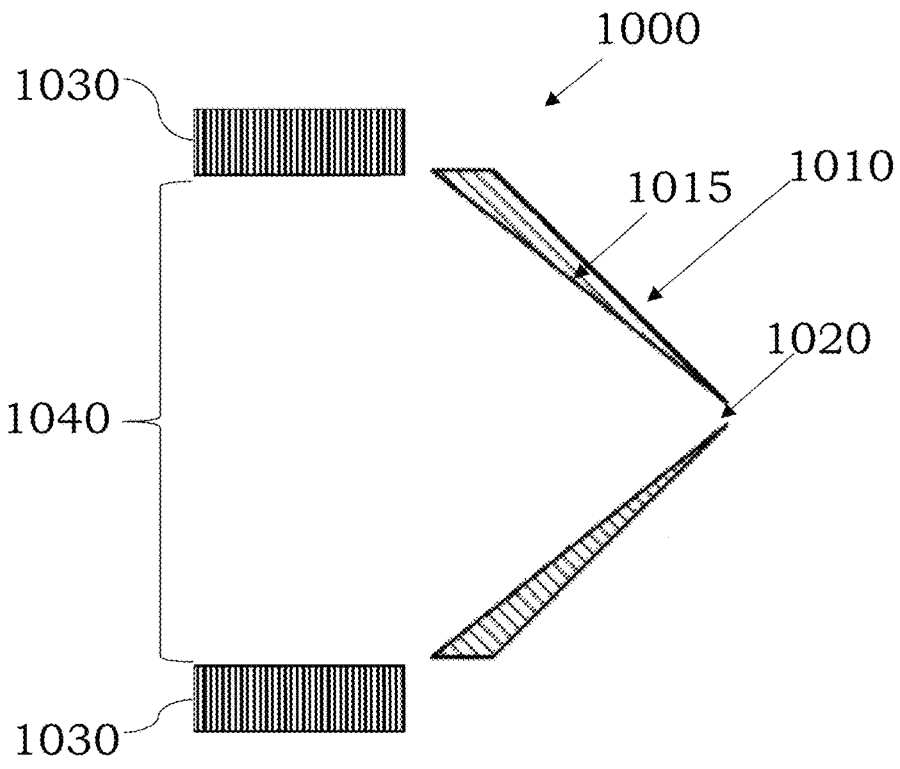
FIGS. 10A and 10B are illustrations of an ion interface comprising a cone element and a lens element, in accordance with some embodiments.
Figure 10B:
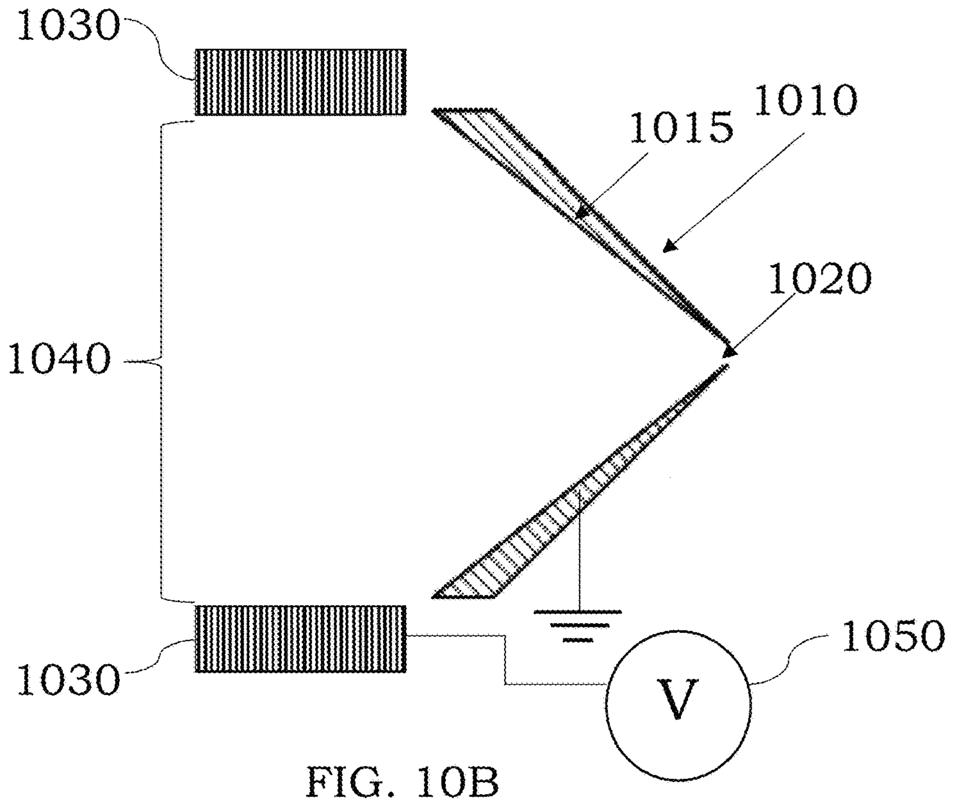

In certain embodiments, an ion interface comprising a cylindrical lens can be used with one or more uncharged elements or cones. Referring to FIG. 10A, an ion interface 1000 comprises a cone 1010 comprising a body 1015 and an orifice 1020. The ion interface 1000 also comprises a cylindrical lens 1030 comprising an aperture 1040. A diameter of the aperture 1040 can be greater than or equal to an outer diameter of the cone 1010. As shown in FIG. 10B, the cone 1010 can be electrically coupled to ground, and the lens 1030 can be electrically coupled to a voltage source 1050 which can provide a non-zero voltage to the lens 1030. For example, the lens 1030 can be configured to receive a positive or negative voltage from the voltage source 1050, e.g., a voltage between about −250 Volts to about +50 Volts. A front surface of the cone 1010 can be spaced about 15 mm to about 25 mm from a front surface of the lens 1030.

In use of the cone 1010 and the lens 1030, ions from an ion source are typically incident first on the cone 1010. A portion of the ions can be sampled through the orifice 1020 and provided to the downstream lens 1030. A suitable voltage can be provided to the lens 1030 to increase acceleration of the ions out of the electrically grounded cone 1010 and can focus or squeeze the ions as they pass through the aperture 1040 of the lens 1030. The ions can then exit the lens 1030 as a focused beam and can be provided to a downstream component. The cone 1010 may comprise nickel, copper, titanium, platinum, palladium, silver, gold or other metals. If desired, the cone 1010 could be produced from a non-conductive material so the cone 1010 need not be electrically grounded. As noted herein, the lens 1030 may comprise an electric field with a minimum or inflection point within the aperture 1040, in front of the aperture 1040 or behind the aperture 1040. The lens 1030 can be produced from those materials described in connection with the lens shown in FIGS. 5A and 5B. The orifice shapes of the cone 1010 can be, for example, circular, elliptical, or other shapes.

Figure 11A:
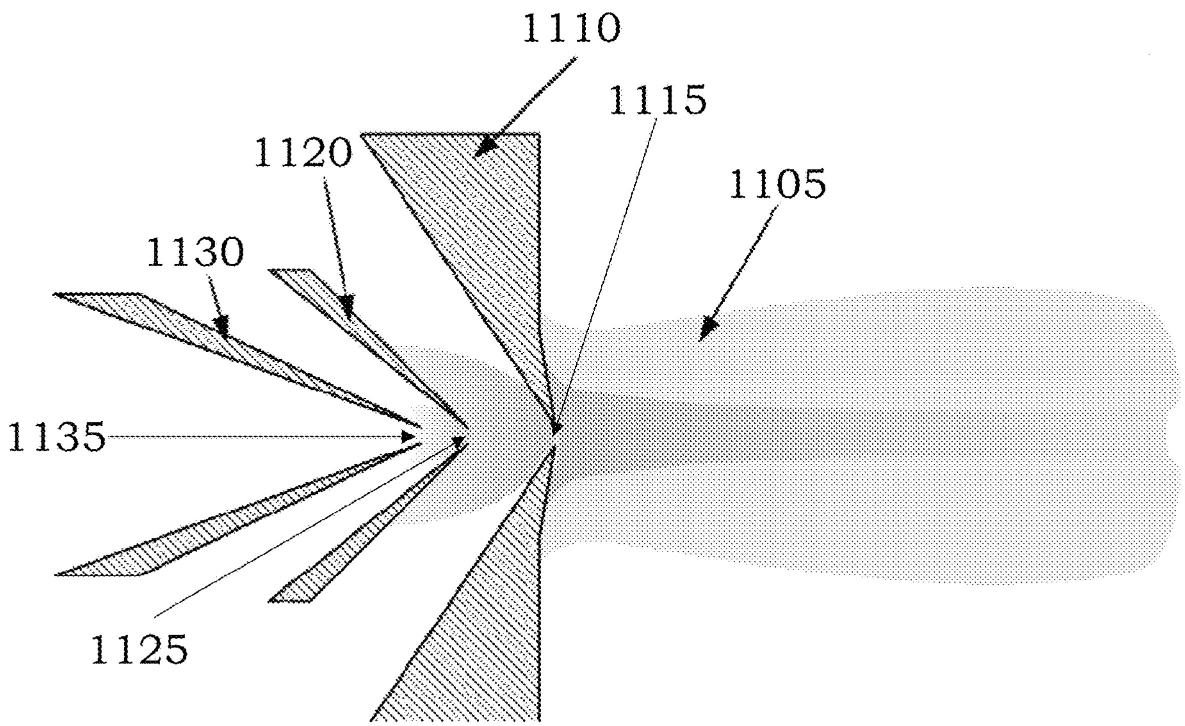
FIGS. 11A, 11B, 11C, 11D and 11E are illustrations of an ion interface comprising three cone elements, in accordance with certain examples.
Figure 11B:
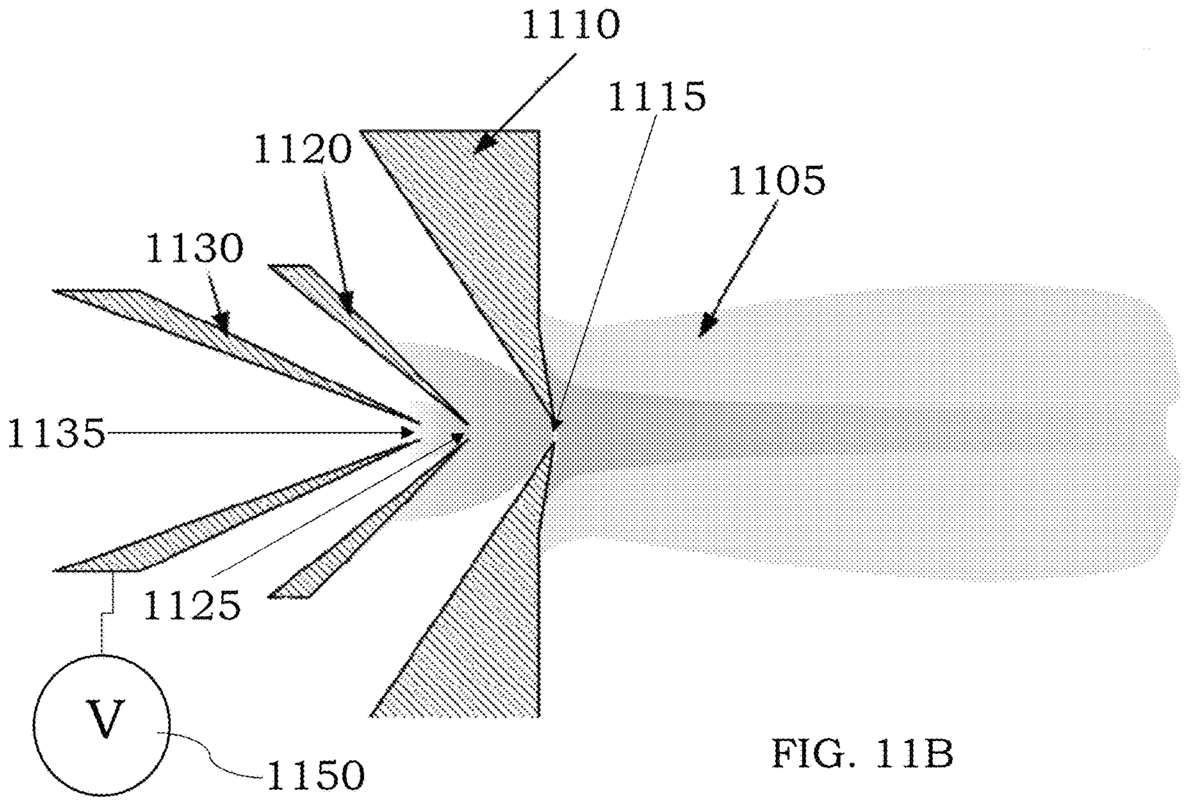
Figure 11C:
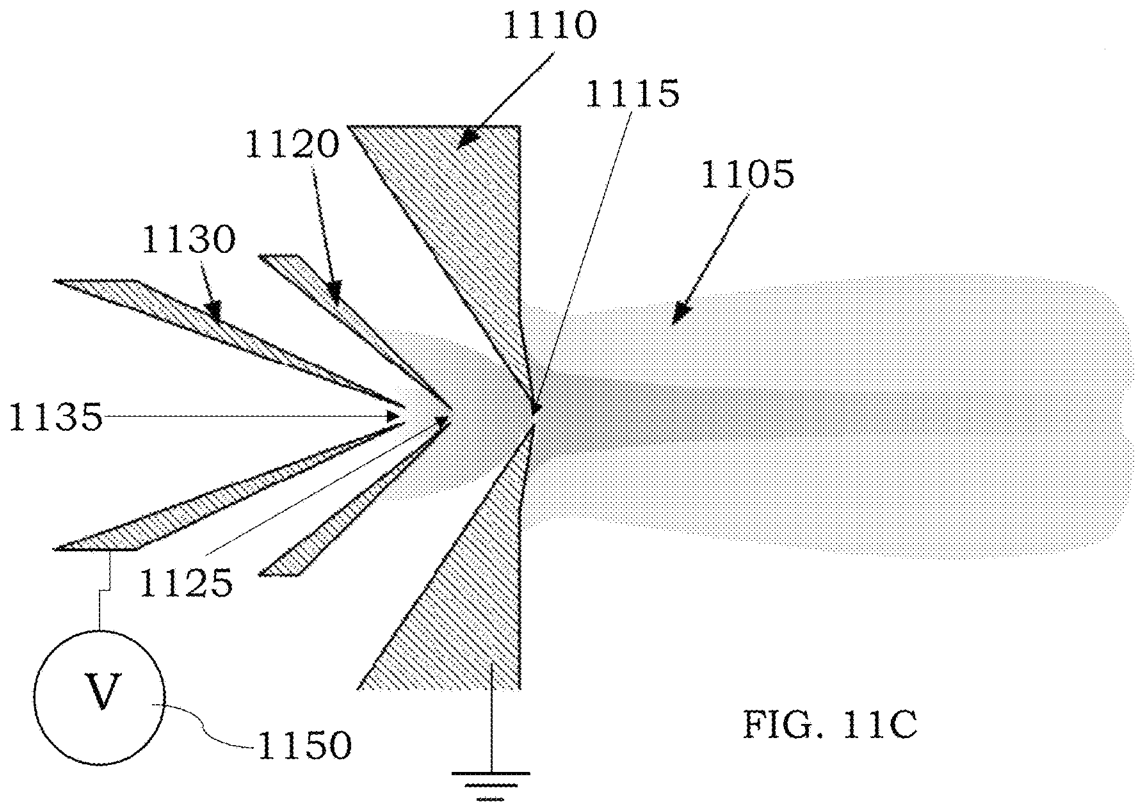
Figure 11D:
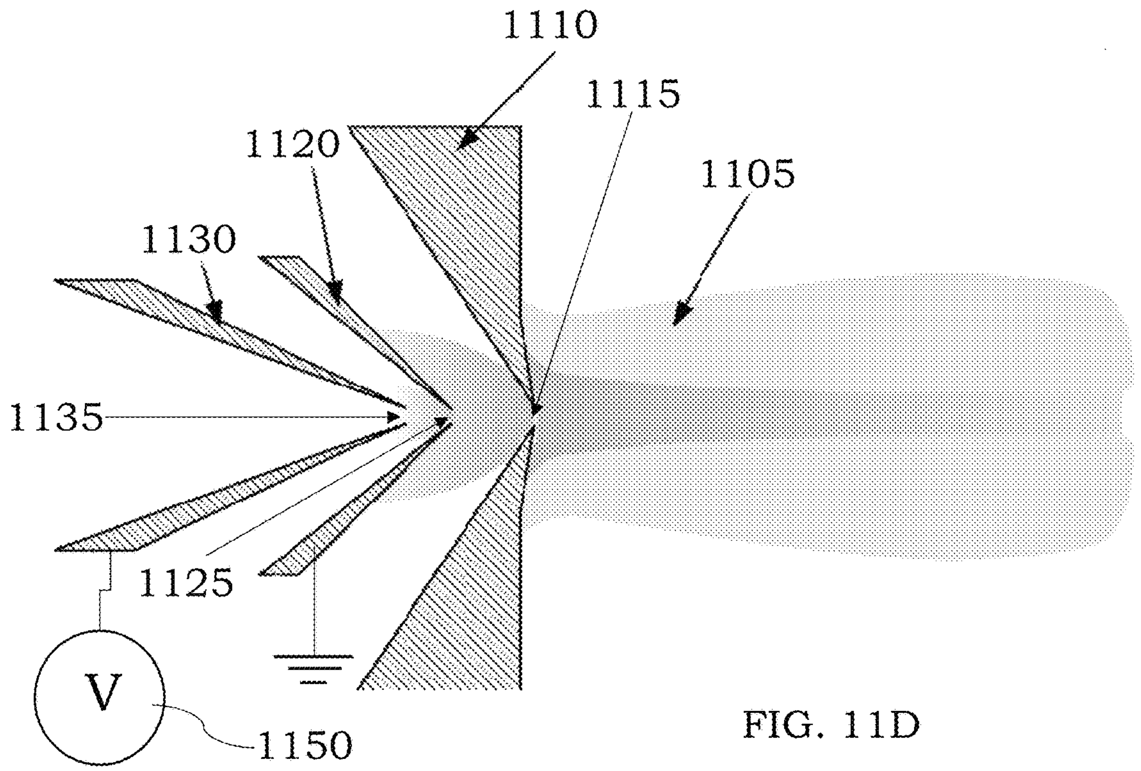
Figure 11E:
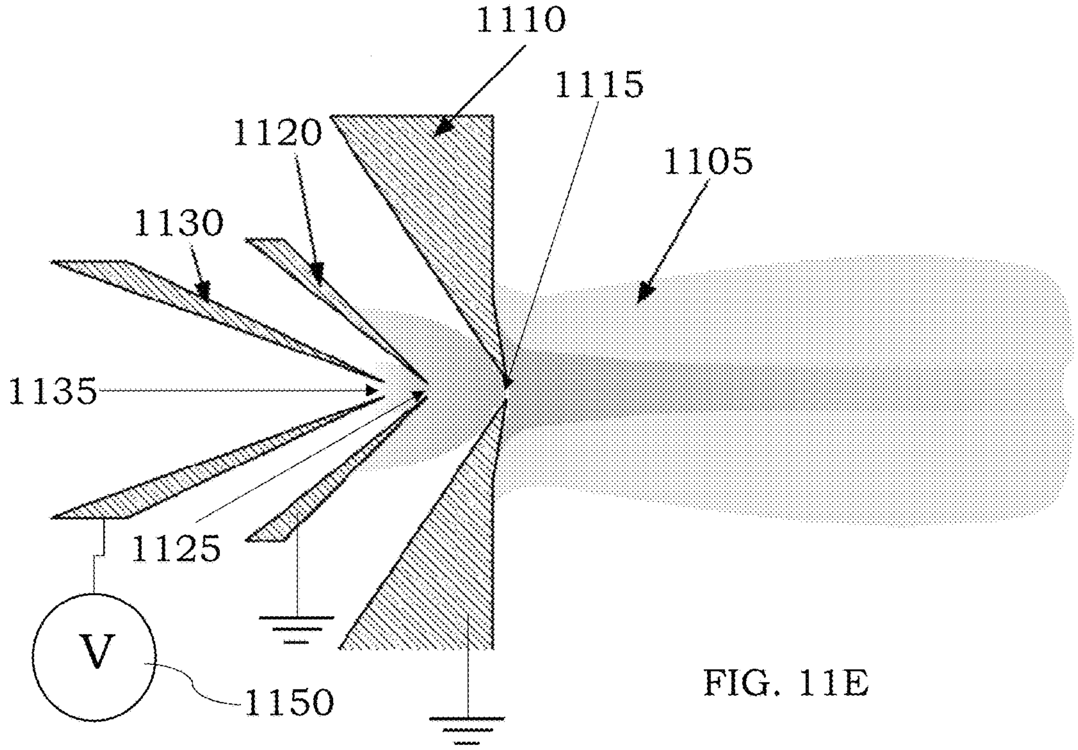

In certain configurations, an ion interface may comprise more than two elements, e.g., more than two cones. For example and referring to FIG. 11A, an ion interface is shown that comprises a first element or cone 1110 with a first orifice 1115, a second element or cone 1120 with a second orifice 1125, and a third element or cone 1130 with a third orifice 1135. An incoming ion beam 1105 is shown for reference. The incoming ion beam 1105 first encounters the first cone 1110. A portion of the incoming ion beam 1105 passes through the first orifice 1115 and is provided to the downstream second element 1120. The second element or cone 1120 samples the ions received from the first element or cone 1110 and provides a certain amount of the ions to the downstream third element 1130 through the second orifice 1125. The third element or cone 1130 receives the ions through the third orifice 1135 and can be used to focus the ions prior to providing them to a downstream component. In some examples as shown in FIG. 11B, the third element or cone 1130 can be electrically coupled to a voltage source 1150 that can provide a positive voltage (or a negative voltage) to the third element or cone 1130. For example, the voltage source 1150 can be used to provide a positive voltage to the third element or cone 1130, e.g., a positive voltage of greater than zero Volts up to about +30 Volts. In some configurations as shown in FIG. 11C, the first element or cone 1110 can be configured to electrically couple to ground. In other configurations as shown in FIG. 11D, the second element or cone 1120 can be configured to electrically couple to ground. In additional configurations as shown in FIG. 11E, both the second element or cone 1120 and the third element or cone 1130 can be configured to electrically couple to ground. If desired, a common ground can be used to electrically couple the second element 1120 and the third element 1130 to ground. A front surface of the cone 1110 can be spaced about 5 mm to about 12 mm from a front surface of the cone 1120. A front surface of the cone 1120 can be spaced about 2 mm to about 5 mm from a front surface of the cone 1130.

In certain embodiments, the cones 1110, 1120, 1130 may comprise the same or different materials, e.g., each of the cones 1110, 1120, 1130 may independently comprise nickel, copper, titanium, platinum, palladium, silver, gold or other metals. In some instances, each of the cones 1110, 1120, 1130 comprises nickel. If desired, the cones 1110 and 1120 each could be produced from a non-conductive material so the cones 1110 and 1120 need not be electrically grounded.

Figure 12A:
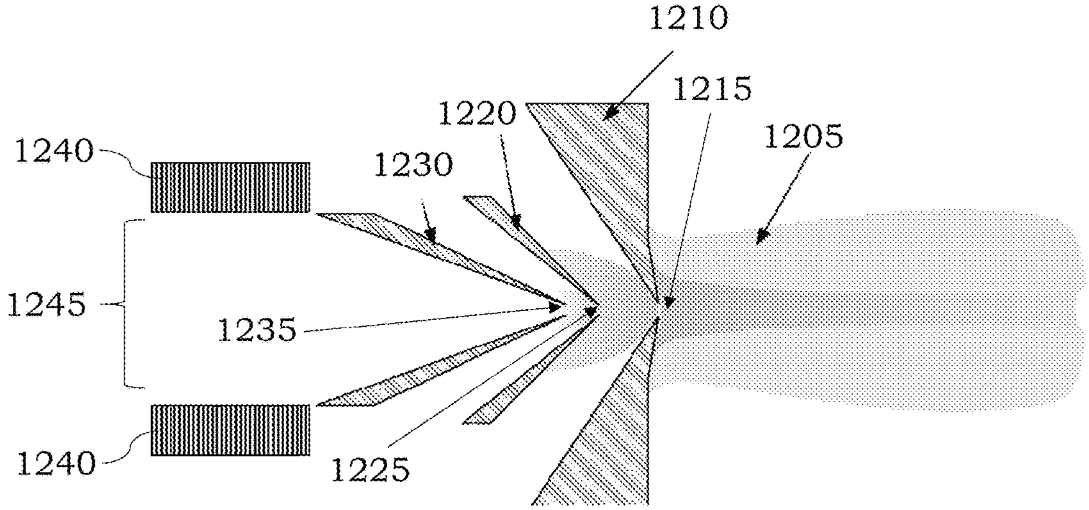
FIGS. 12A, 12B, 12C, 12D, 12E, 12F and 12G are illustrations of an ion interface comprising three cone elements and a lens element, in accordance with certain examples.
Figure 12B:
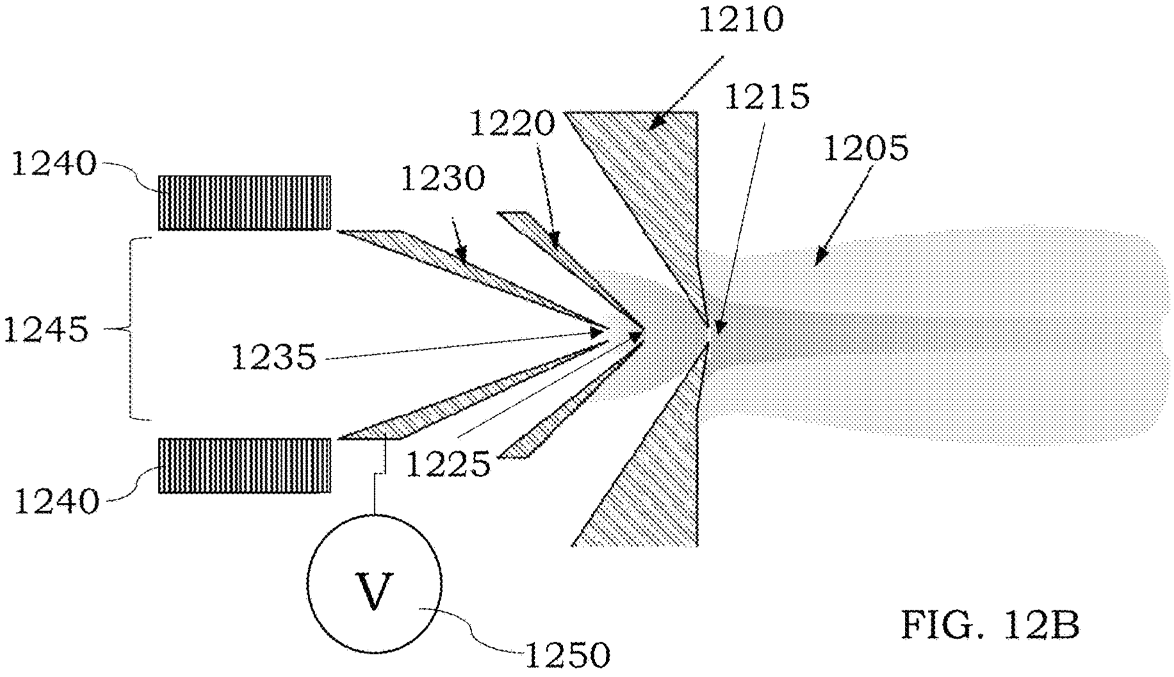
Figure 12C:
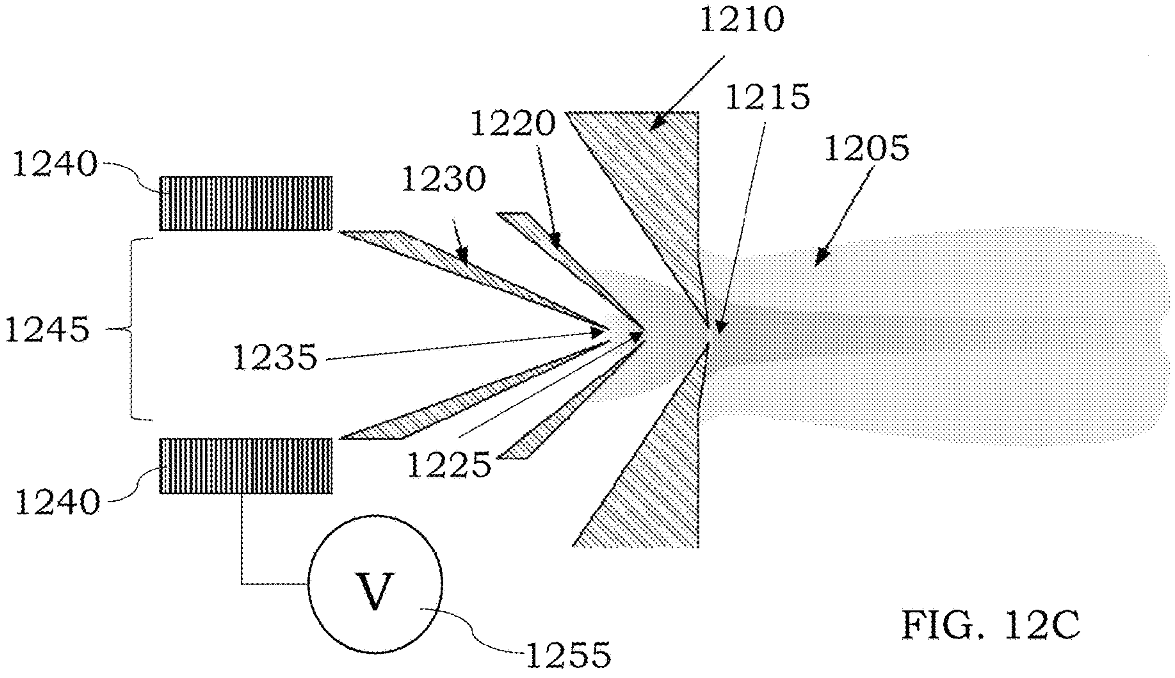
Figure 12D:
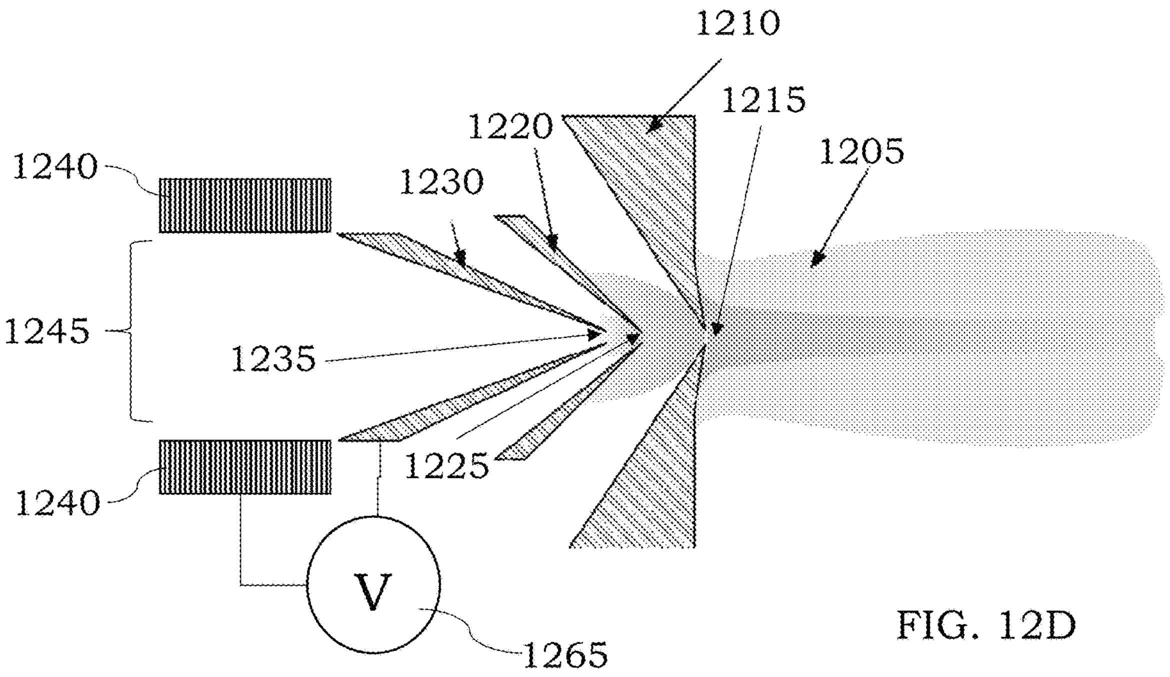

In other configurations, an ion interface may comprise more than two elements or cones in combination with a fourth element such as, for example, a cylindrical lens. Referring to FIG. 12A, an ion interface is shown that comprises a first element or cone 1210 with a first orifice 1215, a second element or cone 1220 with a second orifice 1225, a third element or cone 1230 with a third orifice 1235, and a fourth element 1240 with an aperture 1245. An incoming ion beam 1205 is shown for reference. The incoming ion beam 1205 first encounters the first cone 1210. A portion of the incoming ion beam 1205 passes through the first orifice 1215 and is provided to the downstream second element 1220. The second element or cone 1220 samples the ions received from the first element or cone 1210 and provides a certain amount of the ions to the downstream third element 1230 through the second orifice 1225. The third element or cone 1230 receives the ions through the third orifice 1235 and can be used to focus the ions prior to providing them to a downstream fourth element 1240. The fourth element 1240 can be configured, for example, as a cylindrical lens comprising an aperture 1245. In some examples as shown in FIG. 12B, the third element or cone 1230 can be electrically coupled to a voltage source 1250 that can provide a positive voltage (or a negative voltage) to the third element or cone 1230. For example, the voltage source 1250 can be used to provide a positive voltage to the third element or cone 1230, e.g., a positive voltage of greater than zero Volts up to about +30 Volts. In other configurations, a voltage source 1255 can be electrically coupled to the fourth element 1240 as shown in FIG. 12C. For example, the voltage source 1255 can provide a non-zero voltage to the fourth element 1240, e.g., can provide a negative or positive voltage that may range from about −250 Volts to about +50 Volts. In certain configurations as shown in FIG. 12D, a voltage source 1265 can provide a non-zero voltage to each of the third element 1230 and the fourth element 1240. While not shown, two separate voltage sources could be used instead. In some instances, the voltage source 1265 can provide a non-zero voltage to the third element 1230, e.g., a positive voltage greater than zero and up to about +30 Volts or a negative voltage, and can provide a non-zero voltage to the fourth element 1240, e.g., a negative voltage or positive voltage that can range from about −250 Volts up to about +50 Volts. In some instances where a positive voltage is provided to the fourth element 1240 from the voltage source 1265, the positive voltage provided to the fourth element 1240 may be more positive than the positive voltage provided to the third element 1230.

Figure 12E:
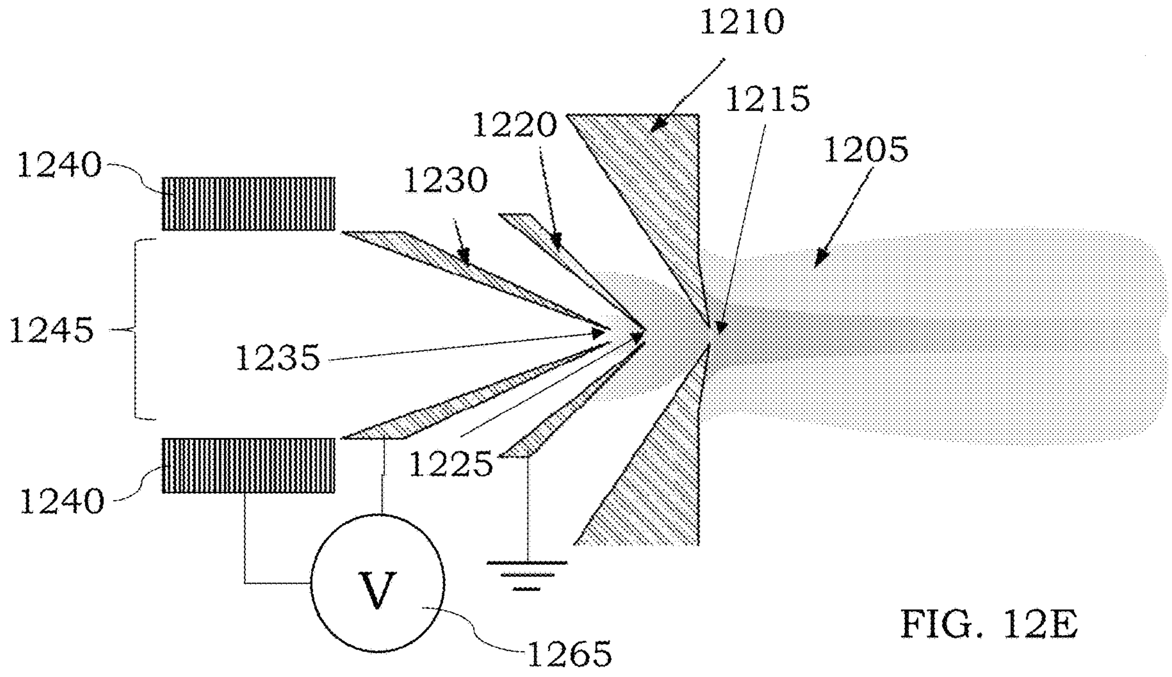
Figure 12F:
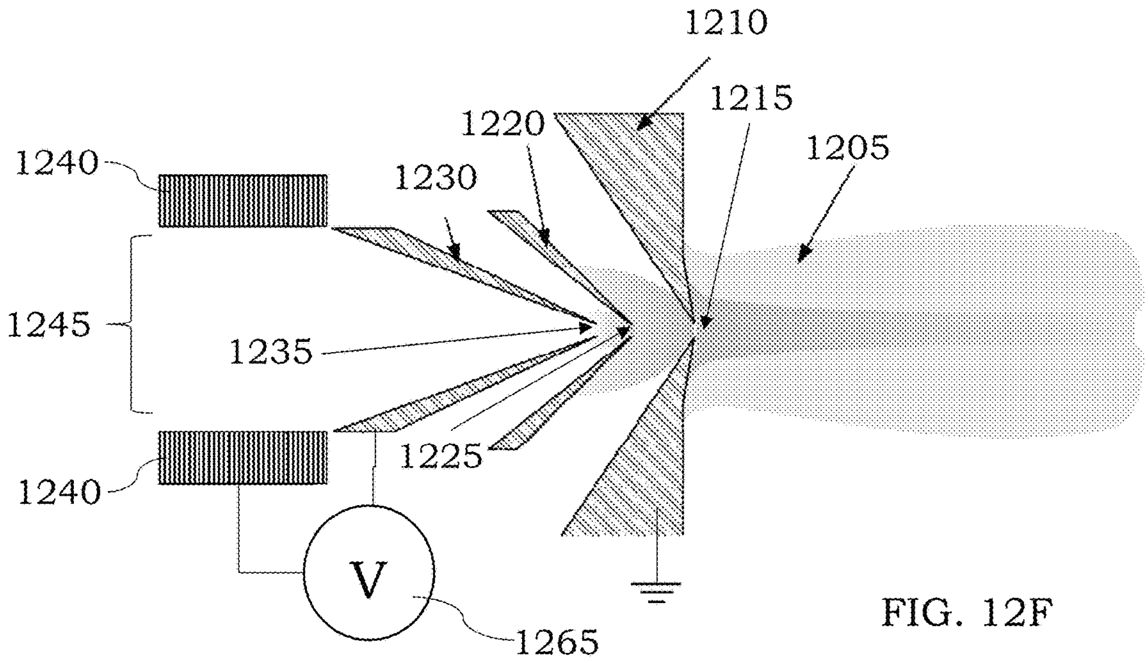
Figure 12G:
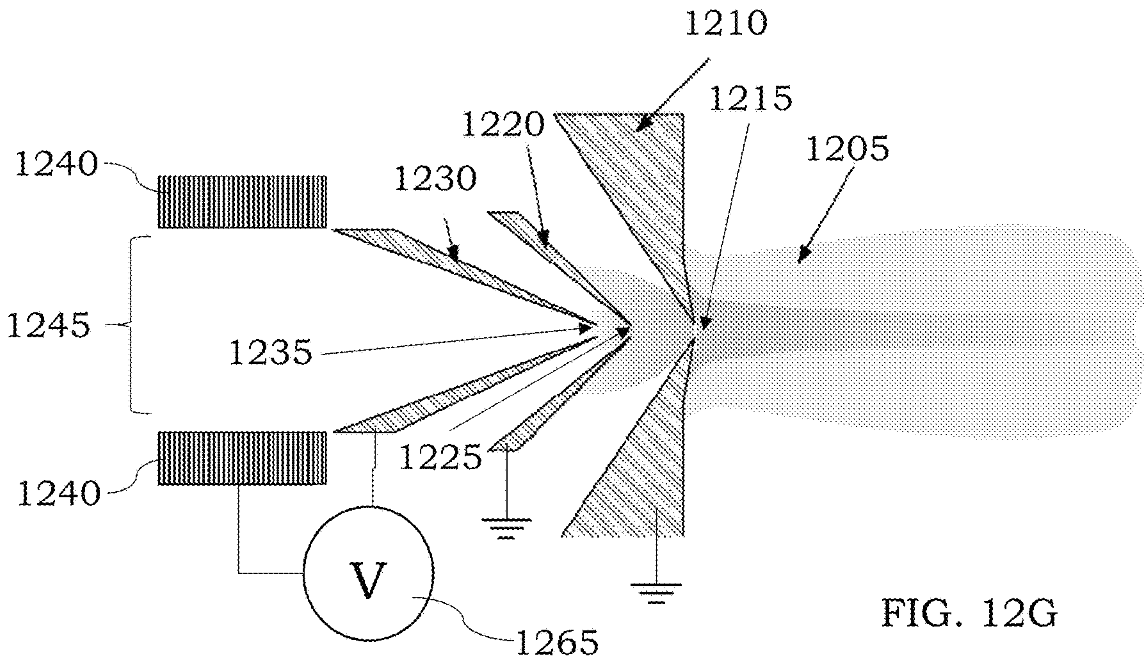

In some configurations, the second element 1220 may be configured to electrically couple to ground as shown in FIG. 12E. In other configurations, the first element may be configured to electrically couple to ground as shown in FIG. 12F. In other embodiments, each of the first element 1210 and the second element 1220 may be configured to electrically couple to ground as shown in FIG. 12G. The cones 1210, 1220, 1230 may comprise the same or different materials, e.g., each of the cones 1210, 1220, 1230 may independently comprise nickel, copper, titanium, platinum, palladium, silver, gold or other metals. In some instances, each of the cones 1210, 1220, 1230 comprises nickel. If desired, the cones 1210 and 1220 each could be produced from a non-conductive material so the cones 1210 and 1220 need not be electrically grounded. The lens 1240 can be produced from any of those materials described in reference to the lens shown in FIGS. 5A and 5B. A front surface of the cone 1210 can be spaced about 5 mm to about 12 mm from a front surface of the cone 1220. A front surface of the cone 1220 can be spaced about 2 mm to about 5 mm from a front surface of the cone 1230. Th front surface of the cone 1230 can be spaced about 15 mm to about 25 mm from a front surface of the lens 1240. The base of the cone 1230 may comprise a diameter of about 12 mm to about 18 mm, and the diameter of the aperture 1245 of the lens 1240 may equal to or greater than the diameter of the base of the cone 1230. The lens 1240 may comprise a length of about 4 mm to about 10 mm.

Figure 13A:
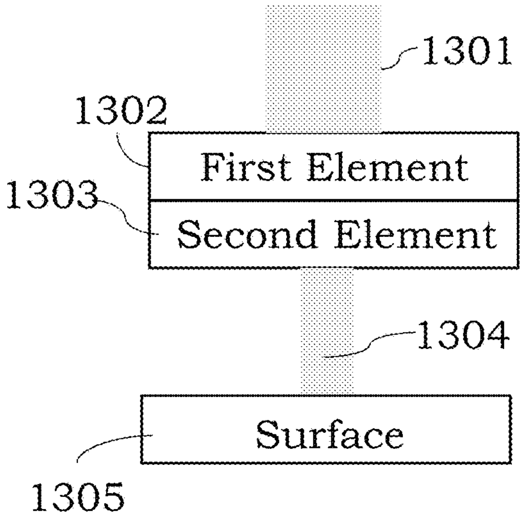
FIGS. 13A, 13B, 13C and 13D are block diagrams of systems comprising two elements that can be used in ion interfaces to provide ions to a downstream surface or component, in accordance with certain embodiments.

In certain configurations, an ion interface comprising two or more individual elements can be used to provide ions to a surface or other components as shown in the block diagrams of FIGS. 13A-13D. Referring to FIG. 13A, the ion interface may comprise a first element 1302 and a second element 1303 that can sample an incoming ion beam 1301 and provide focused ions 1304 to a surface 1305. In some examples, the first element 1302 may be configured to electrically couple to ground. In other examples, the first element 1302 may be configured to receive a non-zero voltage, e.g., a voltage between −50 Volts up to about +30 Volts. The second element 1303 can be configured to receive a non-zero voltage, e.g., a voltage that can vary from −300 Volts up to +50 Volts. In some configurations, the positive voltage provided to the second element 1303 may be more positive than the positive voltage provided to the first element 1302. In certain examples, the first element 1302 is directly coupled to the second element 1303 without any intervening components. If desired, a connector, holder or coupler (not shown) can be used to hold the first element 1302 and the second element 1303 in place. In some instances, the first element 1302 can be configured as a skimmer cone or hyperskimmer cone, and the second element 1303 can be configured as a cylindrical lens, e.g., a ring lens. The first element 1302 and the second element 1303 can provide an ion beam 1304 to the surface 1305 to implant the ions in the surface 1305, to eject ions from the surface 1305, to etch the surface 1305 or for other uses.

Figure 13B:
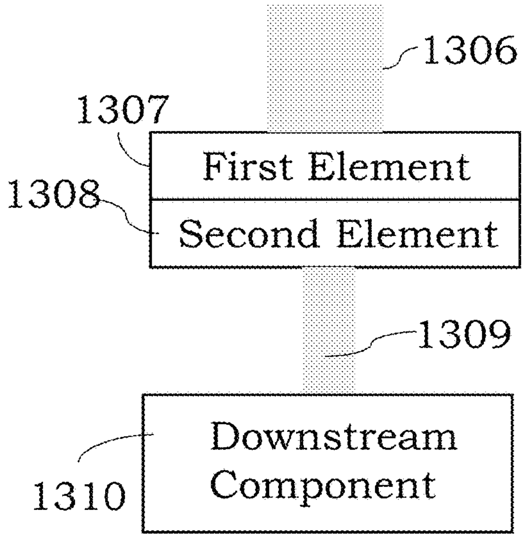

Referring to FIG. 13B, an ion interface may comprise a first element 1307 and a second element 1308 that can sample an incoming ion beam 1306 and provide focused ions 1309 to a downstream component 1310. In certain embodiments, the first element 1307 can be configured to electrically couple to ground. In other examples, the first element 1307 may be configured to receive a non-zero voltage, e.g., a voltage between −50 Volts up to about +30 Volts. In some configurations, the second element 1308 can be configured to receive a non-zero voltage, e.g., a voltage that can vary from −300 Volts up to +50 Volts. In some configurations, the positive voltage provided to the second element 1308 may be more positive than the positive voltage provided to the first element 1307. In certain examples, the first element 1307 is directly coupled to the second element 1308 without any intervening components. If desired, a connector, holder or coupler (not shown) can be used to hold the first element 1307 and the second element 1308 in place. In some examples, the first element 1307 can be configured as a skimmer cone or hyperskimmer cone, and the second element 1308 can be configured as a cylindrical lens, e.g. a ring lens. As noted herein, the lens can be configured to provide an equipotential inflection point if desired.

Figure 13C:
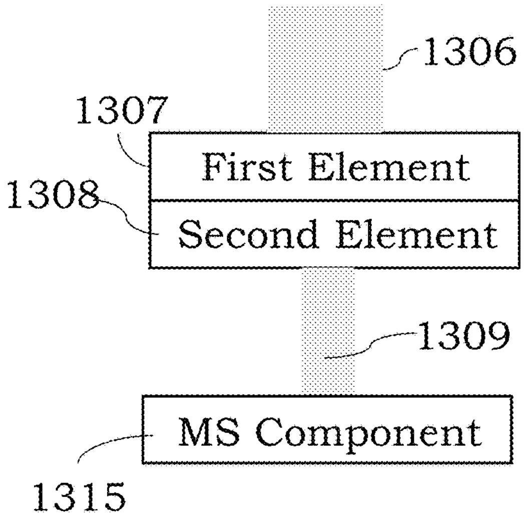
Figure 13D:
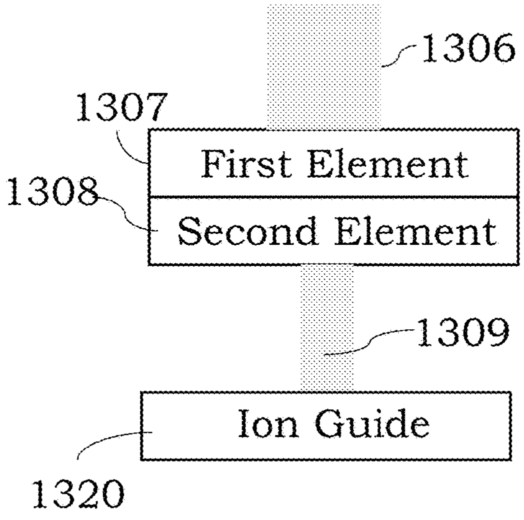

In some examples, the first element 1307 and the second element 1308 can provide an ion beam 1309 to a downstream component 1310 as shown in FIG. 13B. For example, the downstream component 1310 can be an ion gun, an ion trap or other devices. In some configurations, the downstream component 1310 can be a mass spectrometer component 1315 as shown in FIG. 13C and as discussed in more detail below. In other configurations, the downstream component 1310 can be an ion guide 1320 as shown in FIG. 13D. If desired, the downstream component 1310, e.g., the ion guide 1320, can be directly coupled to the second element 1308 such that no components are positioned between the second element 1308 and the downstream component 1310. Alternatively, ion optics may be present between the second element 1308 and the ion guide 1320 to further focus the beam 1309.

Figure 14A:
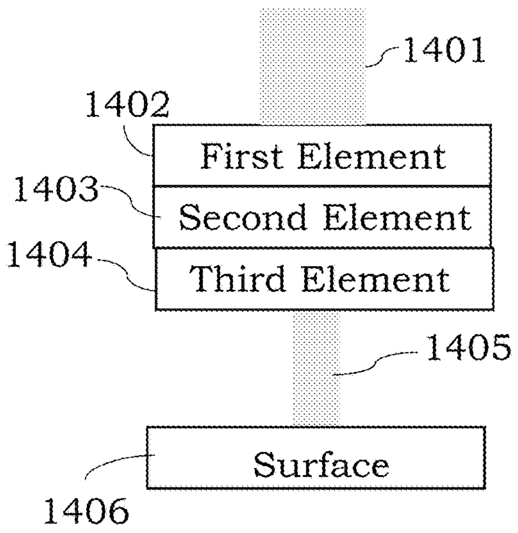
FIGS. 14A, 14B, 14C and 14D are block diagrams of systems comprising three elements that can be used in ion interfaces to provide ions to a downstream surface or component, in accordance with certain embodiments.

In certain configurations, an ion interface comprising three or more individual elements can be used to provide ions to a surface or other components as shown in the block diagrams of FIGS. 14A-14D. Referring to FIG. 14A, the ion interface may comprise a first element 1402, a second element 1403, and a third element 1404 that can sample an incoming ion beam 1401 and provide focused ions 1405 to a surface 1406. In some examples, the first element 1402 can be configured to electrically couple to ground. In certain embodiments, the second element 1403 may be configured to receive a non-zero voltage, e.g., a voltage between −50 Volts up to about +30 Volts. The third element 1404 can be configured to receive a non-zero voltage, e.g., of voltage that can vary from −300 Volts up to +50 Volts. In some configurations, the positive voltage provided to the third element 1404 may be more positive than the positive voltage provided to the second element 1403. In certain examples, the second element 1403 is directly coupled to the third element 1404 without any intervening components. If desired, a connector, holder or coupler (not shown) can be used to hold the second element 1403 and the third element 1404 in place. In some instances, the first element 1402 can be configured as a sampler cone or a skimmer cone, the second element 1403 can be configured as a skimmer cone or hyperskimmer cone, and the third element 1404 can be configured as a cylindrical lens, e.g., a ring lens. The first element 1402, the second element 1403, and the third element 1404 can provide a focused ion beam 1405 to the surface 1406 to implant the ions in the surface 1406, to eject ions from the surface 1406, to etch the surface 1406 or for other uses.

Figure 14B:
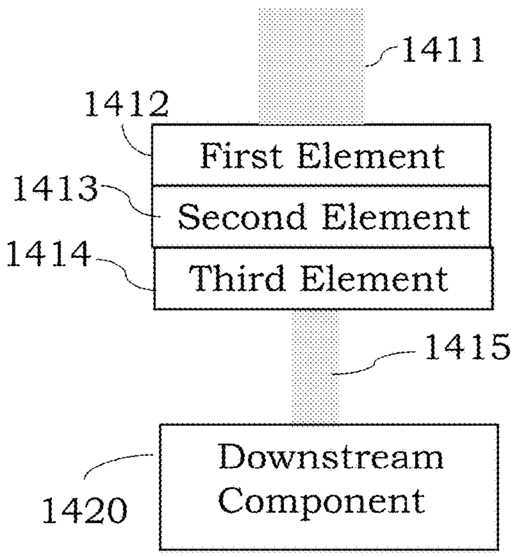

Referring to FIG. 14B, an ion interface may comprise a first element 1412, a second element 1413, and a third element 1414 that can sample an incoming ion beam 1411 and provide focused ions 1415 to a downstream component 1420. In some examples, the first element 1412 can be configured to electrically couple to ground. In other examples, the second element 1413 can be configured to receive a non-zero voltage, e.g., a voltage between −50 Volts up to about +30 Volts. In other embodiments, the third element 1414 can be configured to receive a non-zero voltage, e.g., a voltage that can vary from −300 Volts up to +50 Volts. In some configurations, the positive voltage provided to the third element 1414 may be more positive than the positive voltage provided to the second element 1413. In certain examples, the second element 1413 is directly coupled to the third element 1414 without any intervening components. If desired, a connector, holder or coupler (not shown) can be used to hold the second element 1413 and the third element 1414 in place. In some instances, the first element 1412 can be configured as a sampler cone or a skimmer cone, the second element 1413 can be configured as a skimmer cone or hyperskimmer cone, and the third element 1414 can be configured as a cylindrical lens, e.g., a ring lens. As noted herein, the lens can be configured to provide an equipotential inflection point if desired.

Figure 14C:
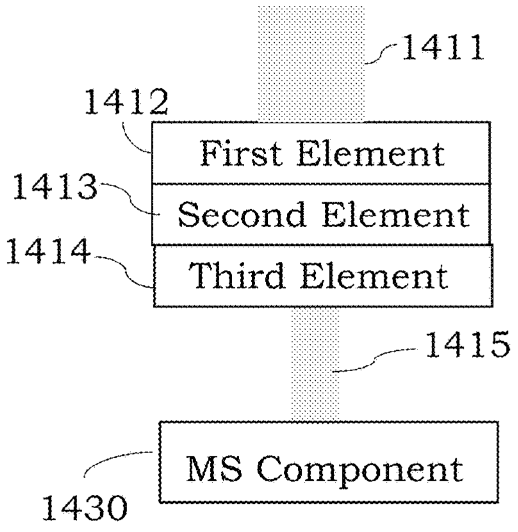
Figure 14D:
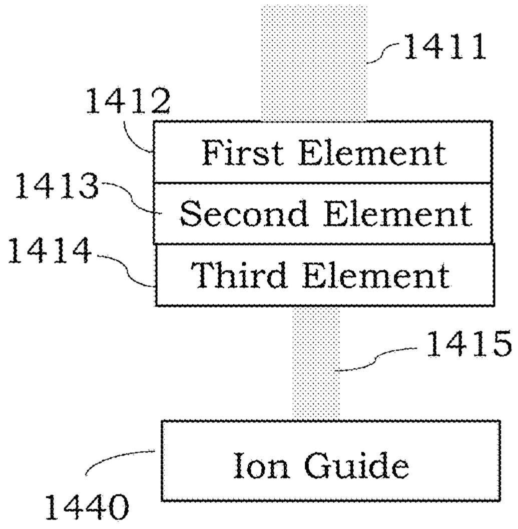

In some configurations, the first element 1412, the second element 1413, and the third element 1414 can provide an ion beam 1415 to the downstream component 1420 as shown in FIG. 14B. For example, the downstream component 1420 can be an ion gun, an ion trap or other devices. In some configurations, the downstream component 1420 is a mass spectrometer component 1430 as shown in FIG. 14C and as discussed in more detail below. In other configurations, the downstream component can be an ion guide 1440 as shown in FIG. 14D. If desired, the downstream component 1420, e.g., the ion guide 1440, can be directly coupled to the third element 1414 such that no components are positioned between the third element 1414 and the downstream component 1420. Alternatively, ion optics can be present between the third element 1414 and the ion guide 1440 to further focus the ion beam 1415.

Figure 15A:
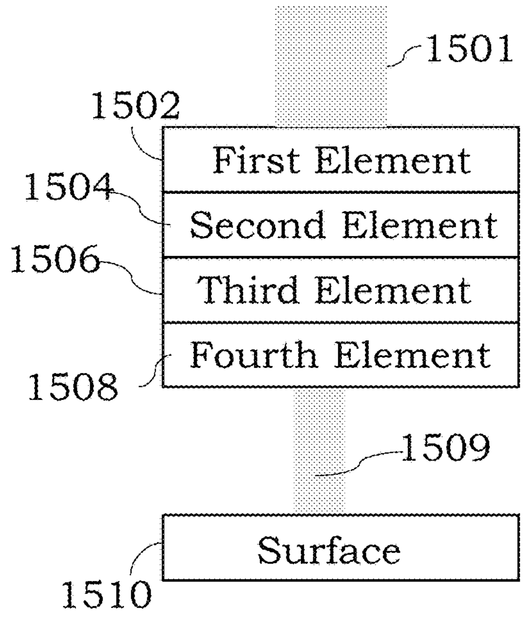
FIGS. 15A, 15B, 15C and 15D are block diagrams of systems comprising four elements that can be used in ion interfaces to provide ions to a downstream surface or component, in accordance with certain embodiments.

In certain configurations, an ion interface comprising four or more individual elements can be used to provide ions to a surface or other components as shown in the block diagrams of FIGS. 15A-15D. Referring to FIG. 15A, the ion interface may comprise a first element 1502, a second element 1504, a third element 1506, and a fourth element 1508 that can sample an incoming ion beam 1501 and provide focused ions 1509 to a surface 1510. In some examples, the first element 1502 can be configured to electrically couple to ground. In other examples, the second element 1504 can be configured to electrically couple to ground. In certain embodiments, the third element 1506 may be configured to receive a non-zero voltage, e.g., a voltage between −50 Volts up to about +30 Volts. In certain examples, the fourth element 1508 can be configured to receive a non-zero voltage, e.g., of voltage that can vary from −300 Volts up to +50 Volts. In some configurations, the positive voltage provided to the fourth element 1508 may be more positive than the positive voltage provided to the third element 1506. In certain examples, the third element 1506 is directly coupled to the fourth element 1508 without any intervening components. If desired, a connector, holder or coupler (not shown) can be used to hold the third element 1506 and the fourth element 1508 in place. In some instances, the first element 1502 and the second element 1504 can each be configured as a sampler cone or a skimmer cone, the third element 1506 can be configured as a skimmer cone or hyperskimmer cone, and the fourth element 1508 can be configured as a cylindrical lens, e.g., a ring lens. The first element 1502, the second element 1504, the third element 1506 and the fourth element 1508 can provide an ion beam 1509 to the surface 1510 to implant the ions in the surface 1510, to eject ions from the surface 1510, to etch the surface 1510 or for other uses.

Figure 15B:
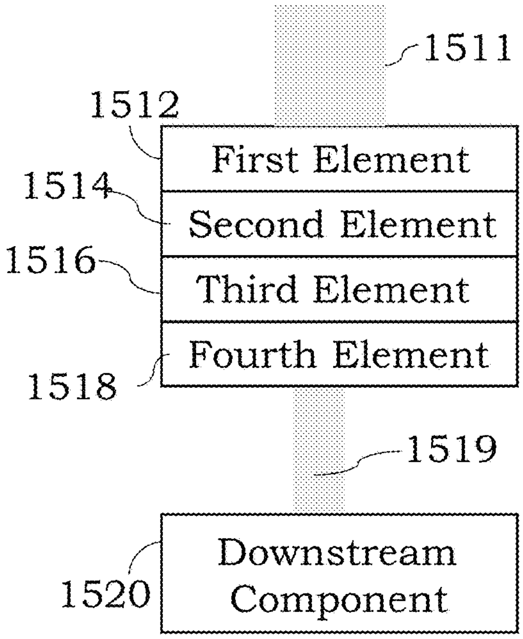

Referring to FIG. 15B, an ion interface may comprise a first element 1512, a second element 1514, a third element 1516 and a fourth element 1518 that can sample an incoming ion beam 1511 and provide focused ions 1519 to a downstream component 1520. In some examples, the first element 1512 can be configured to electrically couple to ground. In other examples, the second element 1514 can be configured to electrically couple to ground. In additional examples, the third element 1516 can be configured to receive a non-zero voltage, e.g., a voltage between −50 Volts up to about +30 Volts. In other embodiments, the fourth element 1518 can be configured to receive a non-zero voltage, e.g., a voltage that can vary from −300 Volts up to +50 Volts. In some configurations, the positive voltage provided to the fourth element 1518 may be more positive than the positive voltage provided to the third element 1516. In certain examples, the third element 1516 is directly coupled to the fourth element 1518 without any intervening components. If desired, a connector, holder or coupler (not shown) can be used to hold the third element 1516 and the fourth element 1518 in place. In some instances, each of the first element 1512 and the second element 1514 can be configured as a sampler cone or a skimmer cone, the third element 1516 can be configured as a skimmer cone or hyperskimmer cone, and the fourth element 1518 can be configured as a cylindrical lens, e.g. a ring lens. As noted herein, the lens can be configured to provide an equipotential inflection point if desired.

Figure 15C:
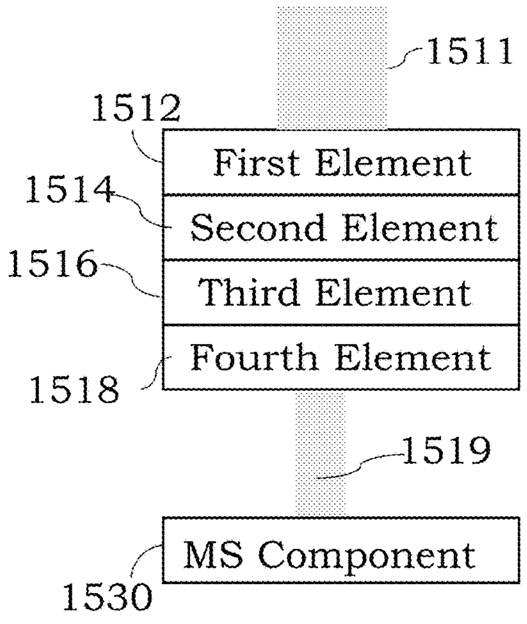
Figure 15D:
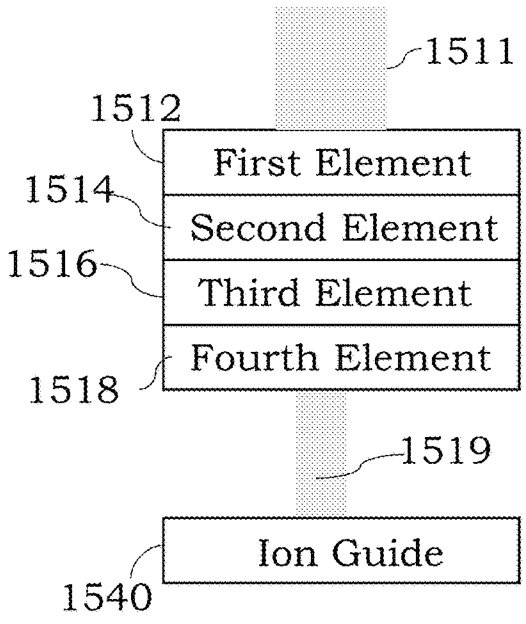

In some configurations, the first element 1512, the second element 1514, the third element 1516 and the fourth element 1518 can provide an ion beam 1519 to a downstream component 1520 as shown in FIG. 15B. For example, the downstream component 1520 can be an ion gun, an ion trap or other devices. In some configurations, the downstream component 1520 is a mass spectrometer component 1530 as shown in FIG. 15C and as discussed in more detail below. In other configurations, the downstream component 1520 can be an ion guide 1540 as shown in FIG. 15D. If desired, the downstream component 1520, e.g., the ion guide 1540, can be directly coupled to the fourth element 1518 such that no components are positioned between the fourth element 1518 and the downstream component 1520. Alternatively, ion optics may be present between the fourth element 1518 and the ion guide 1540 to further focus the beam 1519.

While ion interfaces that comprise two, three or four elements are shown in FIGS. 13A-15D, it will be recognized by the person having ordinary skill in the art, given the benefit of this disclosure, that more than four individual elements may also be present in an ion interface if desired. Further, the exact cone opening angles, materials, sizes and dimensions of the elements and the orifices and apertures may vary as desired.

Figure 16A:
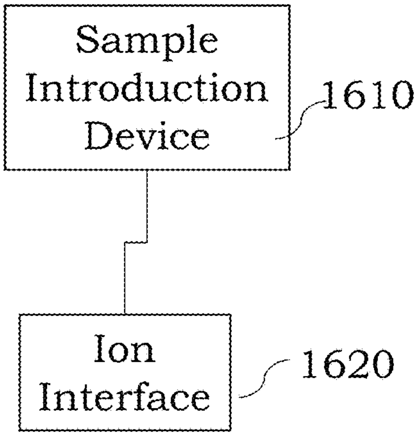
FIGS. 16A, 16B, 16C, 16D, 16E and 16F are block diagrams of systems comprising a sample introduction device, an ion interface and other components, in accordance with certain embodiments.

In certain embodiments, the ion interfaces described herein can be used with a sample introduction device as shown in FIG. 16A. For example, a sample introduction device 1610 can be fluidically coupled to an ion interface 1620 so material can be provided from the sample introduction device 1610 to the ion interface 1620. In some instances, the sample introduction device 1610 may provide ions to the ion interface 1620 (FIG. 16B) for sampling and/or focusing. In other examples, the sample introduction device 1610 may be configured to provide a liquid sample or a gaseous sample. The ion interface 1620 can provide ions to a downstream component 1625 as shown in FIG. 16C. In some instances, the downstream component can be an ion guide 1630 (FIG. 16D), which can be directly positioned adjacent to the ion interface 1620 without any intervening components or structures. In other configurations, the ion interface 1620 can provide ions to a mass analyzer 1640 as shown in FIG. 16E. These components may also be present in a system which comprises a detector 1645 and a processor 1650 (FIG. 16F) that can be used to control the system. For example, the processor 1650 can be used to provide the voltages to the elements of the ion interface and/or alter the applied voltages in real time.

Figure 16B:
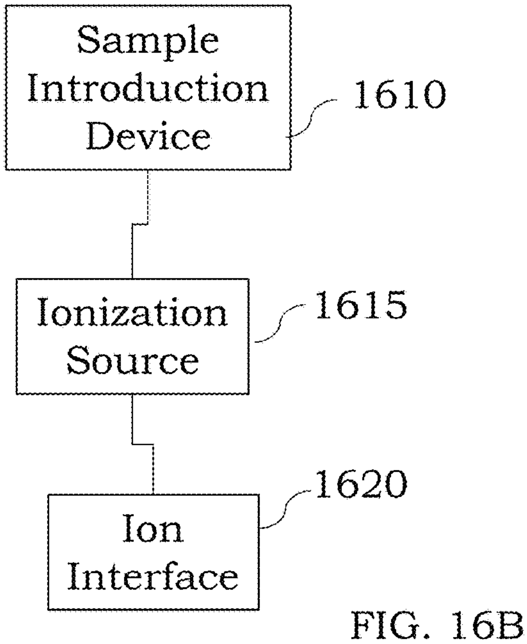
Figure 16C:
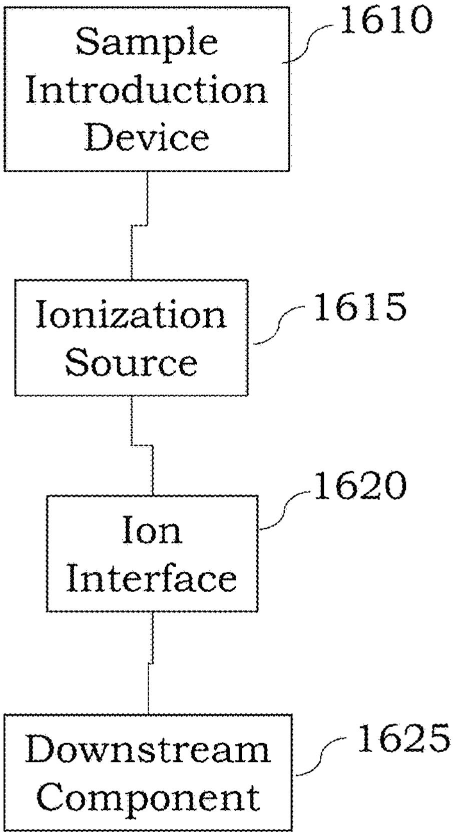
Figure 16D:
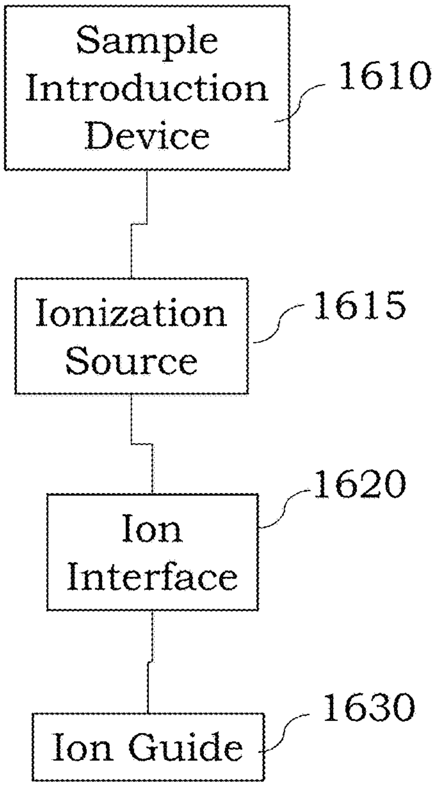
Figure 16E:
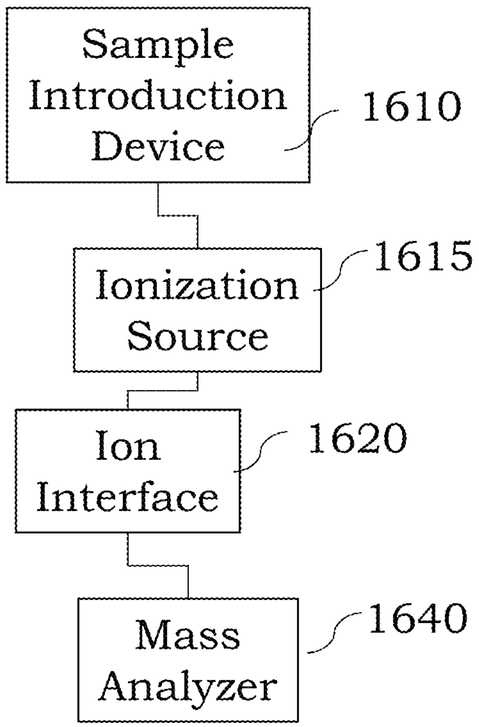

In some embodiments, the sample introduction device 1610 can be fluidically coupled to an ionization source 1615 as shown in FIG. 16B. The sample introduction device 1610 can provide a fluid sample, e.g., a gas, liquid, etc., to the ionization source 1615, which can ionize and/or atomize the fluid sample and provide the ions/atoms to the downstream ion interface 1620.

Figure 17:
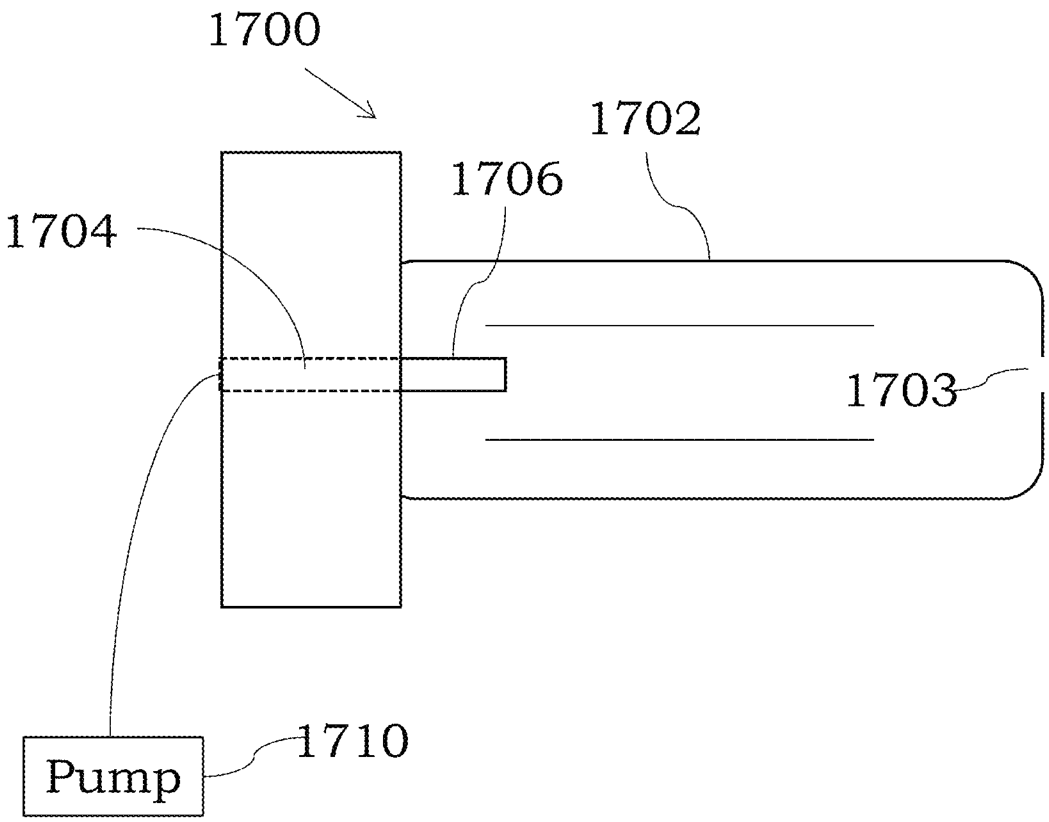
FIG. 17 is an illustration of a nebulizer, in accordance with some examples.

In some embodiments, the sample introduction device can be configured as a nebulizer as shown in FIG. 17. The nebulizer 1700 can be configured as an induction nebulizer, a non-induction nebulizer or a hybrid of the two. For example, concentric, cross flow, entrained, V-groove, parallel path, enhanced parallel path, flow blurring and piezoelectric nebulizers can be used. In a simplified form, the nebulizer 1700 comprises a tube or chamber 1702 in which a sample is introduced through an inlet 1706 or another tube 1704. A gas may be introduced into the chamber 1702 to entrain the introduced sample in the gas flow so the combination of gas and sample can be provided to an ionization source (or an ion interface) through an outlet 1703 of the tube 1702. A pump 1710 may be present and fluidically coupled to the nebulizer 1700 to provide the sample into the chamber 1702 through the inlet 1706. The gas typically is introduced into the nebulizer 1700 at a different port and can mix with the liquid sample before or after (or both) introduction of the liquid sample into the chamber 1702.

Figure 18:
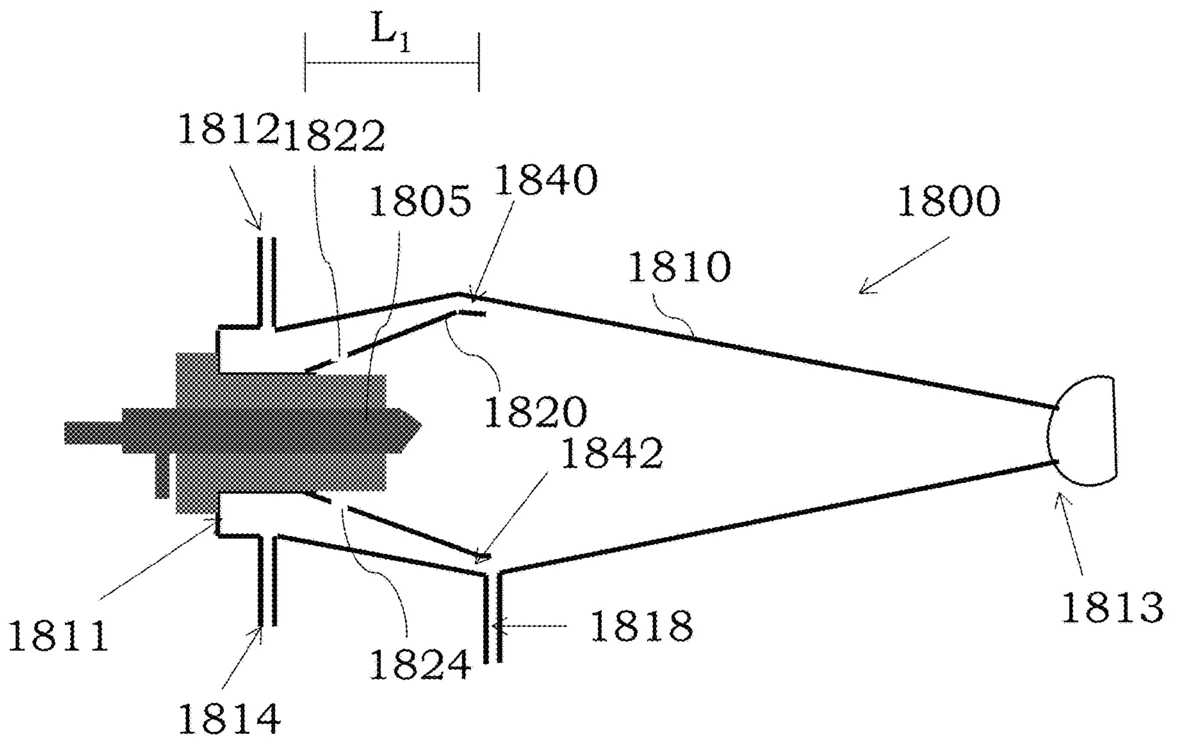
FIG. 18 is an illustration of a spray chamber, in accordance with certain embodiments.

In certain embodiments, the sample introduction device 1610 can be configured as a spray chamber as shown in FIG. 18. The spray chamber 1800 generally comprises an outer chamber or tube 1810 and an inner tube 1820. The outer chamber 1810 comprises dual makeup gas inlets 1812, 1814 and a drain 1818. The makeup gas inlets 1812, 1814 are typically fluidically coupled to a common gas source, though different gases could be used if desired. While not required, the makeup gas inlets 1812, 1814 are shown as being positioned adjacent to an inlet end 1811, though they could instead be positioned centrally or toward an outlet end 1813. The inner tube 1820 is positioned adjacent to a nebulizer tip 1805 and comprises two or more microchannels 1822, 1824 configured to provide a makeup gas flow to reduce or prevent droplets from back flowing and/or depositing on the inner tube 1820. The configuration and positioning of the inner tube 1820 provides laminar flow at areas 1840, 1842 which acts to shield inner surfaces of the outer chamber 1810 from any droplet deposition. The tangential gas flow provided by way of gas introduction into the spray chamber 1800 through the inlets 1812, 1814 acts to select particles (or analyte molecules) of a certain size range. The microchannels 1822, 1824 in the inner tube 1820 also are designed to permit the gas flows from the makeup gas inlets 1812, 1814 to shield the surfaces of the inner tube 1820 from droplet deposition. In certain examples, the microchannels 1822, 1824 can be configured in a similar manner, e.g., have the same size and/or diameter, whereas in other configurations the microchannels 1822, 1824 may be sized or arranged differently. In some instances, at least two, three, four, five or more separate microchannels can be present in the inner tube 1820. The exact size, form and shape of the microchannels may vary and each microchannel need not have the same size, form or shape. In some examples, different diameter microchannels may exist at different radial planes along a longitudinal axis L1 of the inner tube to provide a desired shielding effect. In certain examples, the inner tube 1820 is shown as having a generally increasing internal diameter along the longitudinal axis of the outer chamber 1810, though as noted herein this dimensional change is not required. Some portion of the inner tube 1820 may be "flat" or generally parallel with the longitudinal axis L1 to enhance the laminar flow, or in an alternative configuration, some portion of the inner tube 1820 may generally be parallel to the surface of the outer tube 1810, at least for some length, to enhance laminar flow. The inner diameter of the outer chamber increases from the inlet end 1811 toward the outlet end 1813 up to a point and then decreases toward the outlet end 1813 such that the inner diameter of the outer chamber 1810 is smaller at the outlet end 1813 than at the inlet end 1811. If desired, the inner diameter of the outer chamber 1810 may remain constant from the inlet end 1811 toward the outlet end 1813 or may increase from the inlet end 1811 toward the outlet end 1813.

Figure 19A:
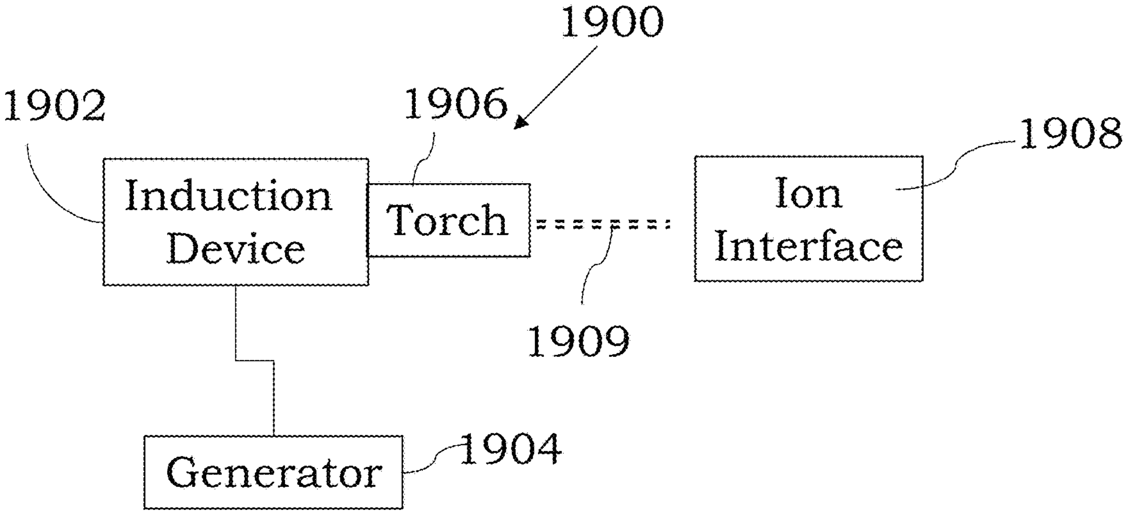
FIG. 19A is an illustration of a system comprising an induction device and a torch that can provide ions to an ion interface, in accordance with some embodiments.

In some examples, the ionization source 1615 may comprise one or more of one or more of an inductively coupled plasma (ICP), a discharge plasma, a capacitively coupled plasma, a microwave induced plasma, a desorption ionization source, a glow discharge ionization source, an electrospray ionization source, an atmospheric pressure ionization source, atmospheric pressure chemical ionization source, a photoionization source, an electron ionization source, and a chemical ionization source. Various illustrations of ICP ion source components are discussed below. A generalized schematic of ICP ion source is shown in FIG. 19A. The ICP ion source 1900 comprises an induction device 1902 (and optionally a capacitive device (not shown)), and a generator 1904 that can be electrically coupled to the induction device 1902. The generator 1904 can provide radio frequencies and/or a radio frequency voltage to the induction device 1902 to provide radio frequency energy into a torch 1906. A plasma gas can be provided into the torch 1906 and ignited in the presence of the provided radio frequency energy from the induction device 1902 to sustain a plasma within the torch 1906. The plasma can ionize the analyte sample and provide the analyte ions in a ion stream or ion beam 1909 to an ion interface 1908. Various types of ionization devices and ionization sources and associated componentry can be found, for example, in commonly assigned U.S. Pat. Nos. 10,096,457, 9,942,974, 9,848,486, 9,810,636, 9,686,849 and other patents currently owned by PerkinElmer Health Sciences, Inc. (Waltham, MA) or PerkinElmer Health Sciences Canada, Inc. (Woodbridge, Canada).

Figure 19B:
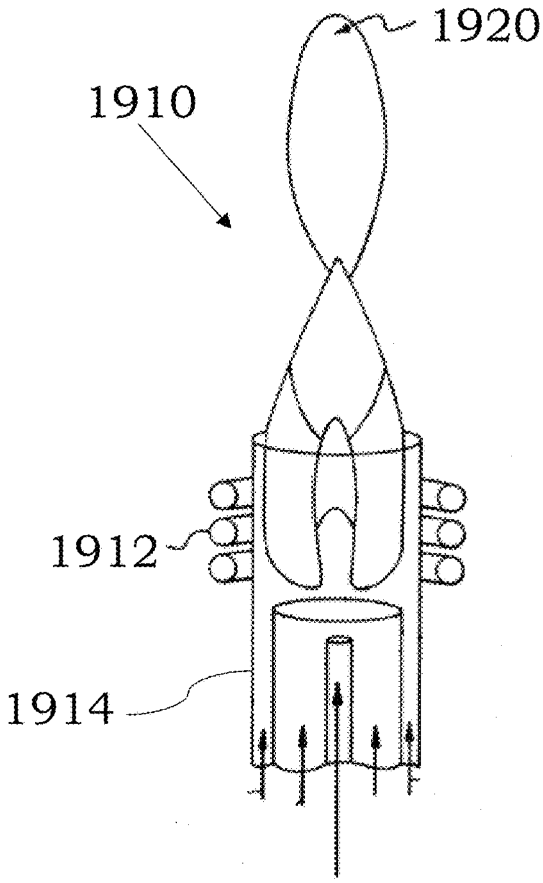
FIG. 19B is an illustration of an induction coil and a torch that can provide ions to an ion interface, in accordance with some embodiments.

Referring to FIG. 19B, in one configuration of an ICP source 1910, an induction device 1912 can be configured as an induction coil. The ICP source 1910 comprises a torch 1914 in combination with an induction coil 1912. The induction coil 1912 is typically electrically coupled to a radio frequency generator (not shown) to provide radio frequency energy into the torch 1914 and sustain an inductively coupled plasma 1920. A sample introduction device as described herein can be used to spray sample into the plasma 1920 to ionize and/or atomize species in the sample. Metal species (or organic species) in the sample can be ionized or atomized and detected using optical techniques or mass spectrometry techniques or other suitable techniques.

Figure 20:
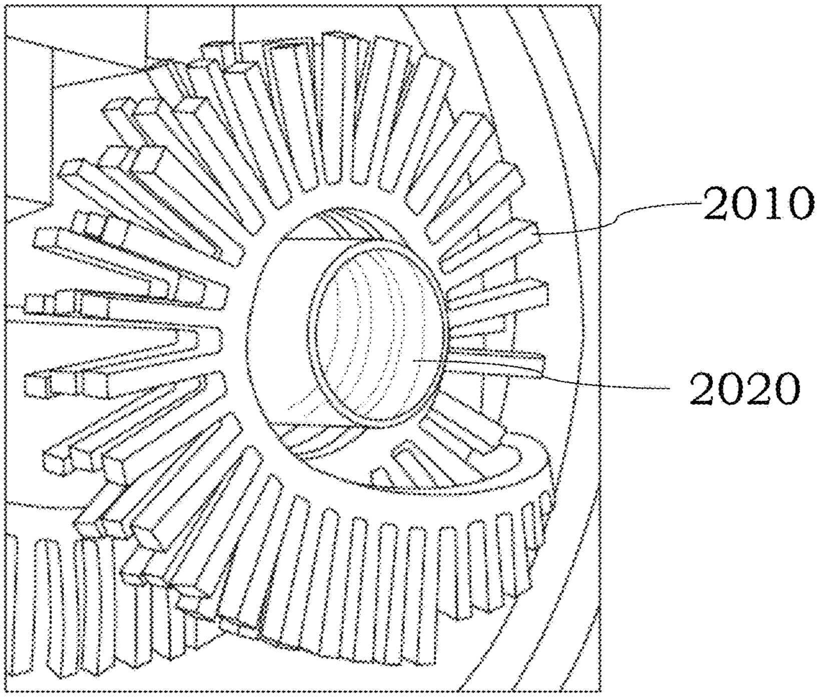
FIG. 20 is an illustration of an induction coil comprising a radial fin and a torch that can provide ions to an ion interface, in accordance with some embodiments.

In certain embodiments, an induction coil used to sustain an ICP may comprise a radial fin. Referring to FIG. 20, an induction coil 2010 is shown that comprises a plurality of radial fins and is positioned adjacent to a torch 2020. Ions from the ICP torch 2020 can be provided to an ion interface as described herein for sampling and focusing prior to being provided to a downstream component. Further, the ion interface can be used to reduce the overall pressure in the system from close to atmospheric pressure of the ICP in the torch 2020 to a lower pressure than atmospheric pressure if desired.

Figure 21:
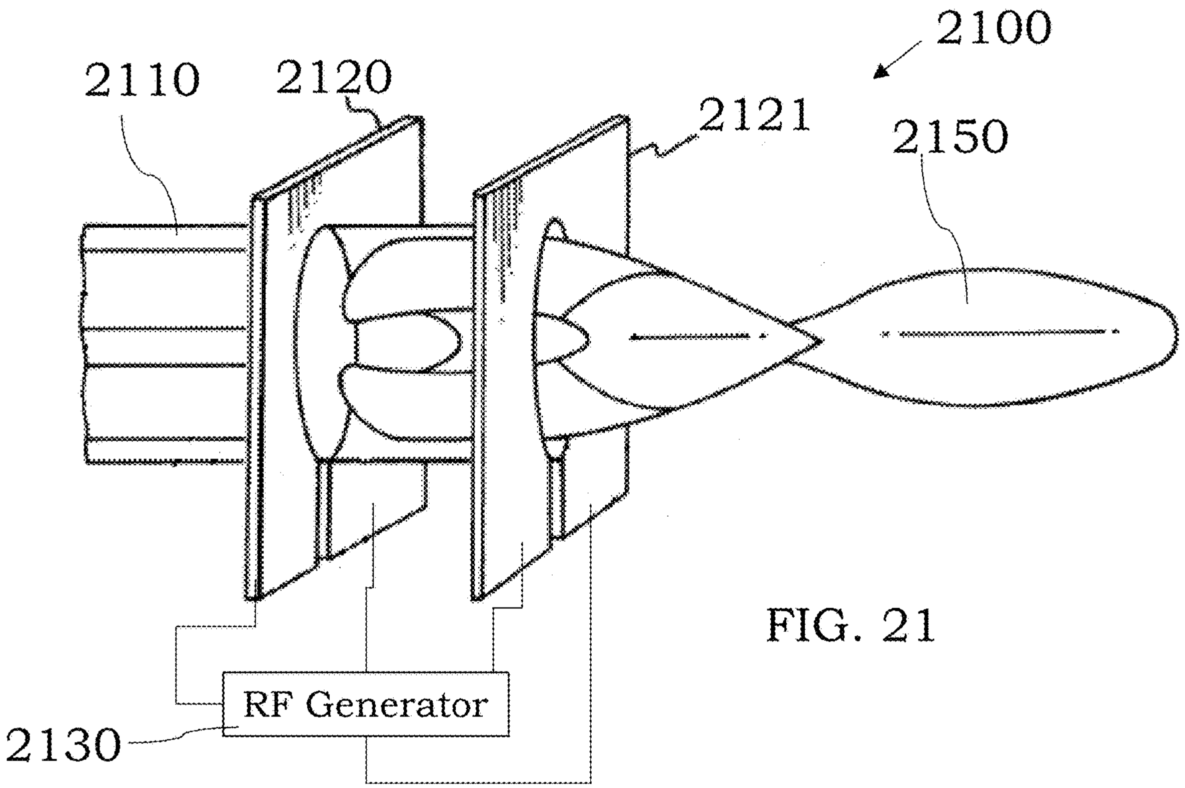
FIG. 21 is an illustration of plate electrodes and a torch that can provide ions to an ion interface, in accordance with some embodiments.

Referring now to FIG. 21, one illustration of an ICP source 2100 is shown that comprises plate electrodes 2120, 2121. A first plate electrode 2120 and a second plate electrode 2121 are shown as comprising an aperture that can receive a torch 2110. For example, the torch 2110 can be placed within some region of an induction device comprising plate electrodes 2120, 2121. A plasma or other ionization/atomization source 2150 such as, for example, an inductively coupled plasma can be sustained using the torch 2110 and inductive energy from the plates 2120, 2121. A radio frequency generator 2130 is shown as electrically coupled to each of the plates 2120, 2121. If desired, only a single plate electrode could be used instead. A sample introduction device can be used to spray sample into the plasma 2150 to ionize and/or atomize species in the sample. Ions and atoms in the ionized sample can be provided to an ion interface as described herein for sampling and focusing prior to being provided to a downstream component. Further, the ion interface can be used to reduce the overall pressure in the system from atmospheric pressure of the ICP 2150 to a lower pressure than atmospheric pressure if desired.

Figure 22:
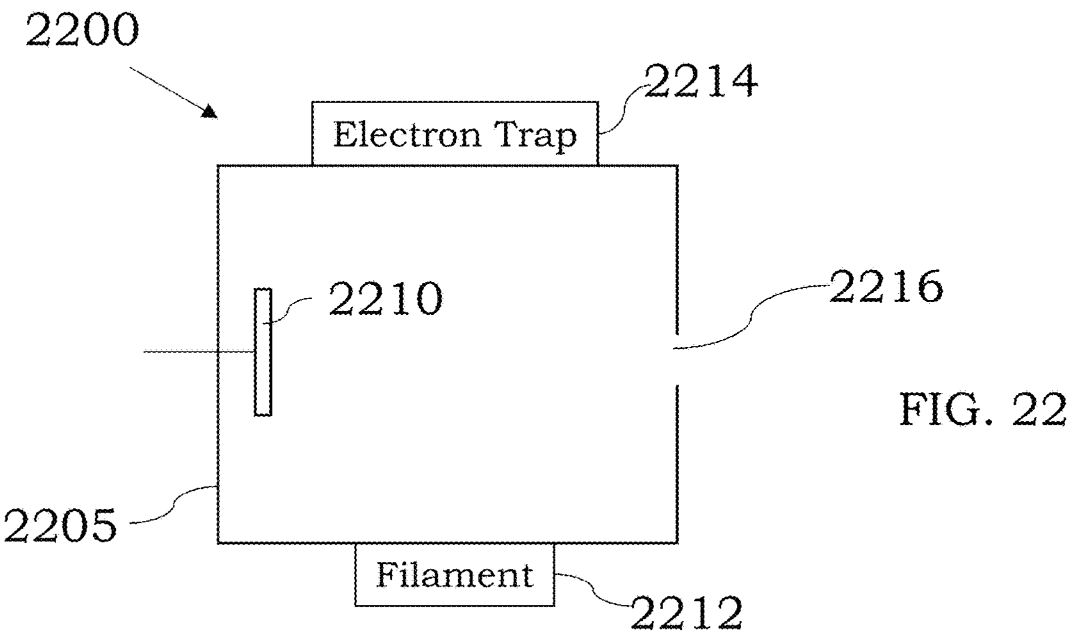
FIG. 22 is an illustration of an ionization source comprising a chamber, in accordance with certain embodiments.

In some examples, ionization sources other than ICP's can be used with the ion interfaces described herein. The ionization source typically includes a chamber that comprises one or more components that can be used to ionize analyte sample introduced into the chamber. Referring to FIG. 22, an illustration of an electron ionization (EI) source 2200 that comprises a source block 2205, an ion repeller 2210, a filament 2212, an electron trap 2214 and an outlet 2216. A potential can be applied between the source block 2205 and the filament 2212 to provide electrons from the filament 2212 into the source block 2205, e.g., electrons can travel toward the electron trap 2214. As sample is introduced into the source block 2205, it can collide with the electrons and become ionized. If desired, a chemical gas can be introduced into the source block 2205 to ionize sample using ions formed from the chemical gas.

In some examples, the mass analyzer 1640 used with the ion interfaces described herein may take numerous forms depending generally on the sample nature, desired resolution, etc. and exemplary mass analyzers may comprise one or more rod assemblies such as, for example, a quadrupole or other rod assembly. In some examples, the ion interface may be integral to the mass analyzer 1640 such that the mass analyzer comprises one or more cones, e.g., a skimmer cone, sampling cones, hyperskimmer cone, lens, etc. The mass analyzer may further comprise one or more ion guides, collision cells, ion optics and other components that can be used to sample and/or filter an entering beam received from the ionization source and/or the ion interface. The various components can be selected to remove interfering species, remove photons and otherwise assist in selecting desired ions from the entering ions. In some examples, the mass analyzer 1640 may be, or may include, a time of flight device. In some instances, the mass analyzer 1640 may comprise its own radio frequency generator. In certain examples, the mass analyzer 1640 can be a scanning mass analyzer, a magnetic sector analyzer (e.g., for use in single and double-focusing MS devices), a quadrupole mass analyzer, an ion trap analyzer (e.g., cyclotrons, quadrupole ions traps), time-of-flight analyzers (e.g., matrix-assisted laser desorbed ionization time of flight analyzers), and other suitable mass analyzers that can separate species with different mass-to-charge ratios. If desired, the mass analyzer 1640 may comprise two or more different devices arranged in series, e.g., tandem MS/MS devices or triple quadrupole devices, to select and/or identify the ions that are received from the ion interface. As noted herein, the mass analyzer can be fluidically coupled to a vacuum pump to provide the vacuum used to select the ions in the various stages of the mass analyzer. The vacuum pump is typically a roughing or foreline pump, a turbomolecular pump or both. Various components that can be present in a mass analyzer are described, for example, in commonly owned U.S. Pat. Nos. 10,032,617, 9,916,969, 9,613,788, 9,589,780, 9,368,334, 9,190,253 and other patents currently owned by PerkinElmer Health Sciences, Inc. (Waltham, MA) or PerkinElmer Health Sciences Canada, Inc. (Woodbridge, Canada).

In some examples, the detector 1645 can be used to detect the ions filtered or selected by the mass analyzer. The detector may be, for example, any suitable detection device that may be used with existing mass spectrometers, e.g., electron multipliers, Faraday cups, coated photographic plates, scintillation detectors, multi-channel plates, etc., and other suitable devices that will be selected by the person of ordinary skill in the art, given the benefit of this disclosure. Illustrative detectors that can be used in a mass spectrometer are described, for example, in commonly owned U.S. Pat. Nos. 9,899,202, 9,384,954, 9,355,832, 9,269,552, and other patents currently owned by PerkinElmer Health Sciences, Inc. (Waltham, MA) or PerkinElmer Health Sciences Canada, Inc. (Woodbridge, Canada).

Figure 16F:
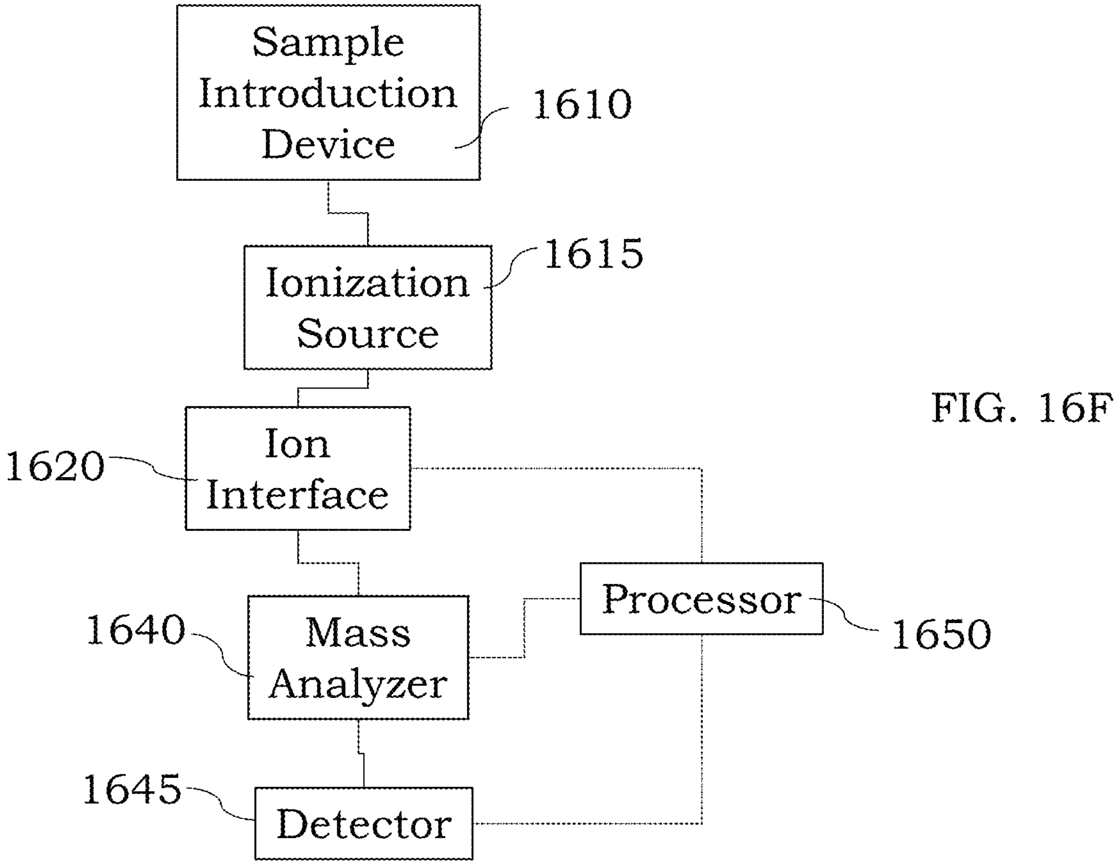

In certain instances, the system may also comprise a processor 1650 (as shown in FIG. 16F), which typically take the forms of a microprocessor and/or computer and suitable software for analysis of samples introduced into the mass spectrometer. While the processor 1650 is shown as being electrically coupled to the ion interface 1620, the mass analyzer 1640 and the detector 1645, it can also be electrically coupled to the other components, e.g., to the sample introduction device 1610 and/or the ionization source 1615, to generally control or operate the different components of the system. In some embodiments, the processor 1650 can be present, e.g., in a controller or as a stand-alone processor, to control and coordinate operation of the system for the various modes of operation using the system. For this purpose, the processor can be electrically coupled to each of the components of the system, e.g., one or more pumps, one or more voltage sources, rods, etc., as well as to one or more of the elements present in the ion interface 1620, e.g., to control the voltages applied to different elements in the ion interface.

In certain configurations, the processor 1650 may be present in one or more computer systems and/or common hardware circuitry including, for example, a microprocessor and/or suitable software for operating the system, e.g., to control the voltages of the ion source, pumps, elements of the ion interface, mass analyzer, detector, etc. In some examples, any one or more components of the system can include its own respective processor, operating system and other features to permit operation of that component. The processor can be integral to the systems or may be present on one or more accessory boards, printed circuit boards or computers electrically coupled to the components of the system. The processor is typically electrically coupled to one or more memory units to receive data from the other components of the system and permit adjustment of the various system parameters as needed or desired. The processor may be part of a general-purpose computer such as those based on Unix, Intel PENTIUM-type processor, Motorola PowerPC, Sun UltraSPARC, Hewlett-Packard PA-RISC processors, or any other type of processor. One or more of any type computer system may be used according to various embodiments of the technology. Further, the system may be connected to a single computer or may be distributed among a plurality of computers attached by a communications network. It should be appreciated that other functions, including network communication, can be performed and the technology is not limited to having any particular function or set of functions. Various aspects may be implemented as specialized software executing in a general-purpose computer system. The computer system may include a processor connected to one or more memory devices, such as a disk drive, memory, or other device for storing data. Memory is typically used for storing programs, calibrations and data during operation of the system in the various modes. Components of the computer system may be coupled by an interconnection device, which may include one or more buses (e.g., between components that are integrated within a same machine) and/or a network (e.g., between components that reside on separate discrete machines). The interconnection device provides for communications (e.g., signals, data, instructions) to be exchanged between components of the system. The computer system typically can receive and/or issue commands within a processing time, e.g., a few milliseconds, a few microseconds or less, to permit rapid control of the ion interface. For example, computer control can be implemented to control the vacuum pressure, to provide voltages to elements of the ion interface, etc. The processor typically is electrically coupled to a power source which can, for example, be a direct current source, an alternating current source, a battery, a fuel cell or other power sources or combinations of power sources. The power source can be shared by the other components of the system. The system may also include one or more input devices, for example, a keyboard, mouse, trackball, microphone, touch screen, manual switch (e.g., override switch) and one or more output devices, for example, a printing device, display screen, speaker. In addition, the system may contain one or more communication interfaces that connect the computer system to a communication network (in addition or as an alternative to the interconnection device). The system may also include suitable circuitry to convert signals received from the various electrical devices present in the systems. Such circuitry can be present on a printed circuit board or may be present on a separate board or device that is electrically coupled to the printed circuit board through a suitable interface, e.g., a serial ATA interface, ISA interface, PCI interface or the like or through one or more wireless interfaces, e.g., Bluetooth, Wi-Fi, Near Field Communication or other wireless protocols and/or interfaces.

In certain embodiments, the storage system used in the systems described herein typically includes a computer readable and writeable non-volatile recording medium in which codes can be stored that can be used by a program to be executed by the processor or information stored on or in the medium to be processed by the program. The medium may, for example, be a hard disk, solid state drive or flash memory. Typically, in operation, the processor causes data to be read from the non-volatile recording medium into another memory that allows for faster access to the information by the processor than does the medium. This memory is typically a volatile, random access memory such as a dynamic random access memory (DRAM) or static memory (SRAM). It may be located in the storage system or in the memory system. The processor generally manipulates the data within the integrated circuit memory and then copies the data to the medium after processing is completed. A variety of mechanisms are known for managing data movement between the medium and the integrated circuit memory element and the technology is not limited thereto. The technology is also not limited to a particular memory system or storage system. In certain embodiments, the system may also include specially-programmed, special-purpose hardware, for example, an application-specific integrated circuit (ASIC) or a field programmable gate array (FPGA). Aspects of the technology may be implemented in software, hardware or firmware, or any combination thereof. Further, such methods, acts, systems, system elements and components thereof may be implemented as part of the systems described above or as an independent component. Although specific systems are described by way of example as one type of system upon which various aspects of the technology may be practiced, it should be appreciated that aspects are not limited to being implemented on the described system. Various aspects may be practiced on one or more systems having a different architecture or components. The system may comprise a general-purpose computer system that is programmable using a high-level computer programming language. The systems may be also implemented using specially programmed, special purpose hardware. In the systems, the processor is typically a commercially available processor such as the well-known Pentium class processors available from the Intel Corporation. Many other processors are also commercially available. Such a processor usually executes an operating system which may be, for example, the Windows 95, Windows 98, Windows NT, Windows 2000 (Windows ME), Windows XP, Windows Vista, Windows 7, Windows 8 or Windows 10 operating systems available from the Microsoft Corporation, MAC OS X, e.g., Snow Leopard, Lion, Mountain Lion or other versions available from Apple, the Solaris operating system available from Sun Microsystems, or UNIX or Linux operating systems available from various sources. Many other operating systems may be used, and in certain embodiments a simple set of commands or instructions may function as the operating system.

In certain examples, the processor and operating system may together define a platform for which application programs in high-level programming languages may be written. It should be understood that the technology is not limited to a particular system platform, processor, operating system, or network. Also, it should be apparent to those skilled in the art, given the benefit of this disclosure, that the present technology is not limited to a specific programming language or computer system. Further, it should be appreciated that other appropriate programming languages and other appropriate systems could also be used. In certain examples, the hardware or software can be configured to implement cognitive architecture, neural networks or other suitable implementations. If desired, one or more portions of the computer system may be distributed across one or more computer systems coupled to a communications network. These computer systems also may be general-purpose computer systems. For example, various aspects may be distributed among one or more computer systems configured to provide a service (e.g., servers) to one or more client computers, or to perform an overall task as part of a distributed system. For example, various aspects may be performed on a client-server or multi-tier system that includes components distributed among one or more server systems that perform various functions according to various embodiments. These components may be executable, intermediate (e.g., IL) or interpreted (e.g., Java) code which communicate over a communication network (e.g., the Internet) using a communication protocol (e.g., TCP/IP). It should also be appreciated that the technology is not limited to executing on any particular system or group of systems. Also, it should be appreciated that the technology is not limited to any particular distributed architecture, network, or communication protocol.

In some instances, various embodiments may be programmed using an object-oriented programming language, such as, for example, SQL, SmallTalk, Basic, Java, Javascript, PHP, C++, Ada, Python, iOS/Swift, Ruby on Rails or C # (C-Sharp). Other object-oriented programming languages may also be used. Alternatively, functional, scripting, and/or logical programming languages may be used. Various configurations may be implemented in a non-programmed environment (e.g., documents created in HTML, XML or other format that, when viewed in a window of a browser program, render aspects of a graphical-user interface (GUI) or perform other functions). Certain configurations may be implemented as programmed or non-programmed elements, or any combination thereof. In some instances, the systems may comprise a remote interface such as those present on a mobile device, tablet, laptop computer or other portable devices which can communicate through a wired or wireless interface and permit operation of the systems remotely as desired.

Figure 23:
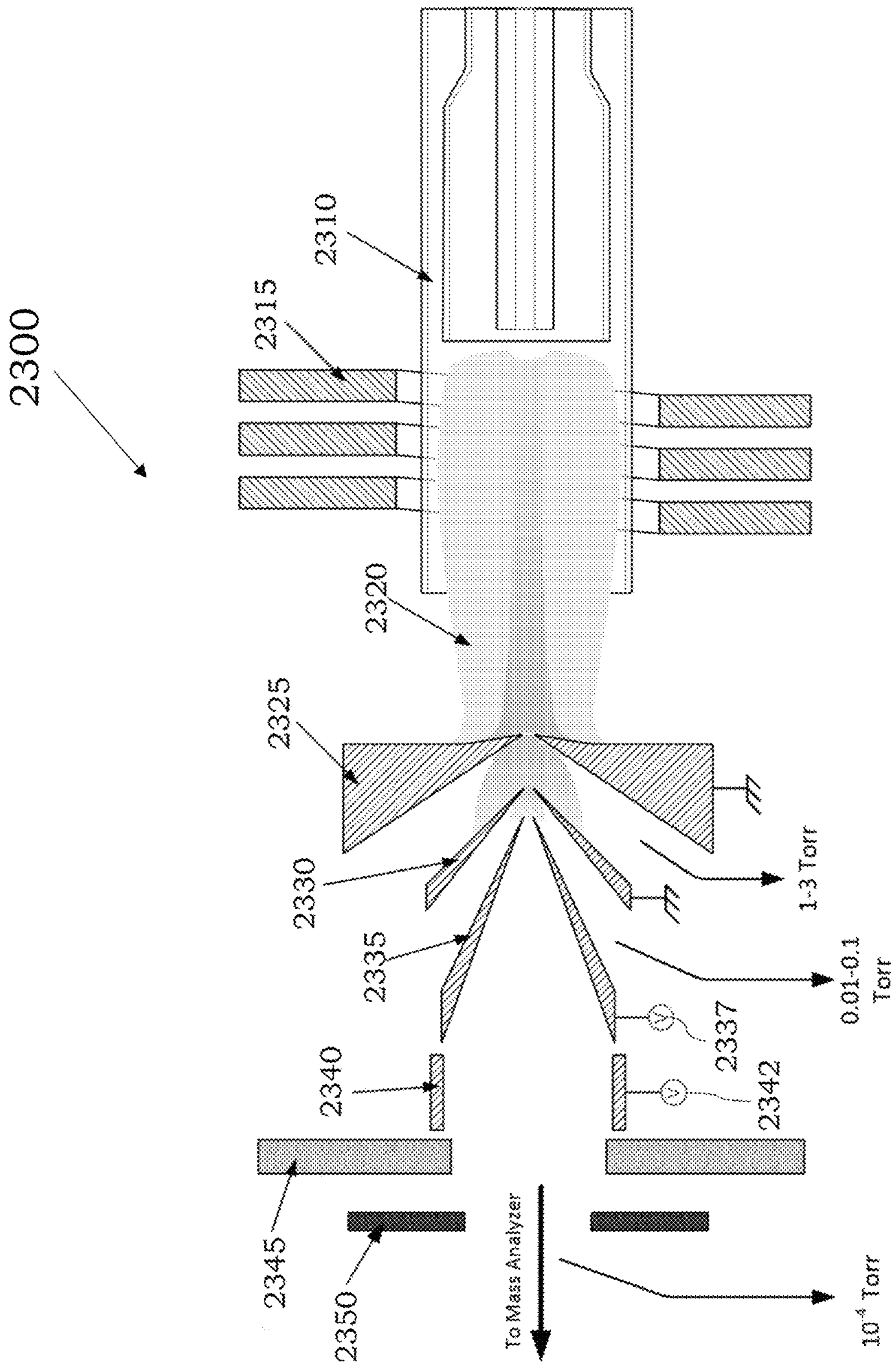
FIG. 23 is an illustration of a system including a torch, an induction coil, an ion interface and other components, in accordance with certain examples.

In certain embodiments, the ion interfaces described herein can be used in a mass spectrometer system comprising an inductively coupled plasma and optionally other components. Referring to FIG. 23, a system 2300 comprises a torch 2310 and an induction coil 2315 that can be used to sustain an inductively coupled plasma 2320. The ion beam exiting the plasma 2320 typically is a mixture of analyte ions, electrons, photons and argon ions. Ions in the inductively coupled plasma are incident on a sampler cone 2325 which can be electrically coupled to ground. The pressure at the front surface of the sampler cone 2325 is close to or greater than atmospheric pressure. Behind the sampler cone 2325, the pressure is typically lower than atmospheric pressure, e.g., 1-3 Torr. The pressure can be reduced by fluidically coupling this region to a vacuum pump such as, for example, a mechanical pump. A skimmer cone 2330 is present downstream from the sampler cone 2325 and can receive ions that pass through a first orifice in the sampler cone 2325. For example, ions entering through the first orifice of the sampler cone 2325 can supersonically expand toward the skimmer cone 2330. The skimmer cone 2330 can also be electrically grounded as shown in FIG. 23. The pressure at a back surface of the skimmer cone 2330 is typically lower than a pressure at a front surface of the skimmer cone 2330, e.g., the pressure at the back surface of the skimmer cone can be about 0.01 to 0.1 Torr. Ions that pass through the second orifice in the skimmer cone 2330 are then provided to a downstream hyperskimmer cone 2335, which comprises a third orifice. As the ion beam enters through the third orifice of the cone 2335, the ion beam is largely positively charged. A first non-zero voltage can be provided to the hyperskimmer 2335, e.g., a positive voltage can be applied to the hyperskimmer 2335, from a voltage source 2337. Depending on the ions, however, a negative voltage could instead be applied to the hyperskimmer 2335. The positive voltage provided to the hyperskimmer 2335 can squeeze the beam that travels through the hyperskimmer 2335 and can focus the ions. This squeezing of the ion beam can reduce space-charge effects that tend to cause the beam to diffuse outward or broaden. The focused ions can be provided to a downstream ring lens 2340, which itself can receive a second non-zero voltage from a voltage source 2342. If desired, only a single voltage source may be present and used to provide the first and second non-zero voltages. In one mode, the ring lens 2340 can receive a negative voltage to extract ions out of the hyperskimmer 2335 and accelerate the ion beam toward the ring lens 2340. In another mode, a positive voltage can be provided to the ring lens 2340. In some examples, the positive voltage provided to the ring lens 2340 may be slightly more positive than a positive voltage provided to the hyperskimmer 2335. The system may also comprise a gate valve 2345 and ion optics 2350 that can be used to provide ions to a downstream component such as a mass analyzer. The pressure in the downstream mass analyzer is typically much lower, e.g., $10^{-4}$ Torr or less, due to the high vacuum used in the various mass analyzer stages, e.g., due to a vacuum provided by a turbomolecular pump. The cones 2325, 2330 and 2335 may be produced from the same or different materials, e.g., nickel or other materials. The lens 2340 may be produced from any of these materials described in reference to FIGS. 5A and 5B.

Figure 24:
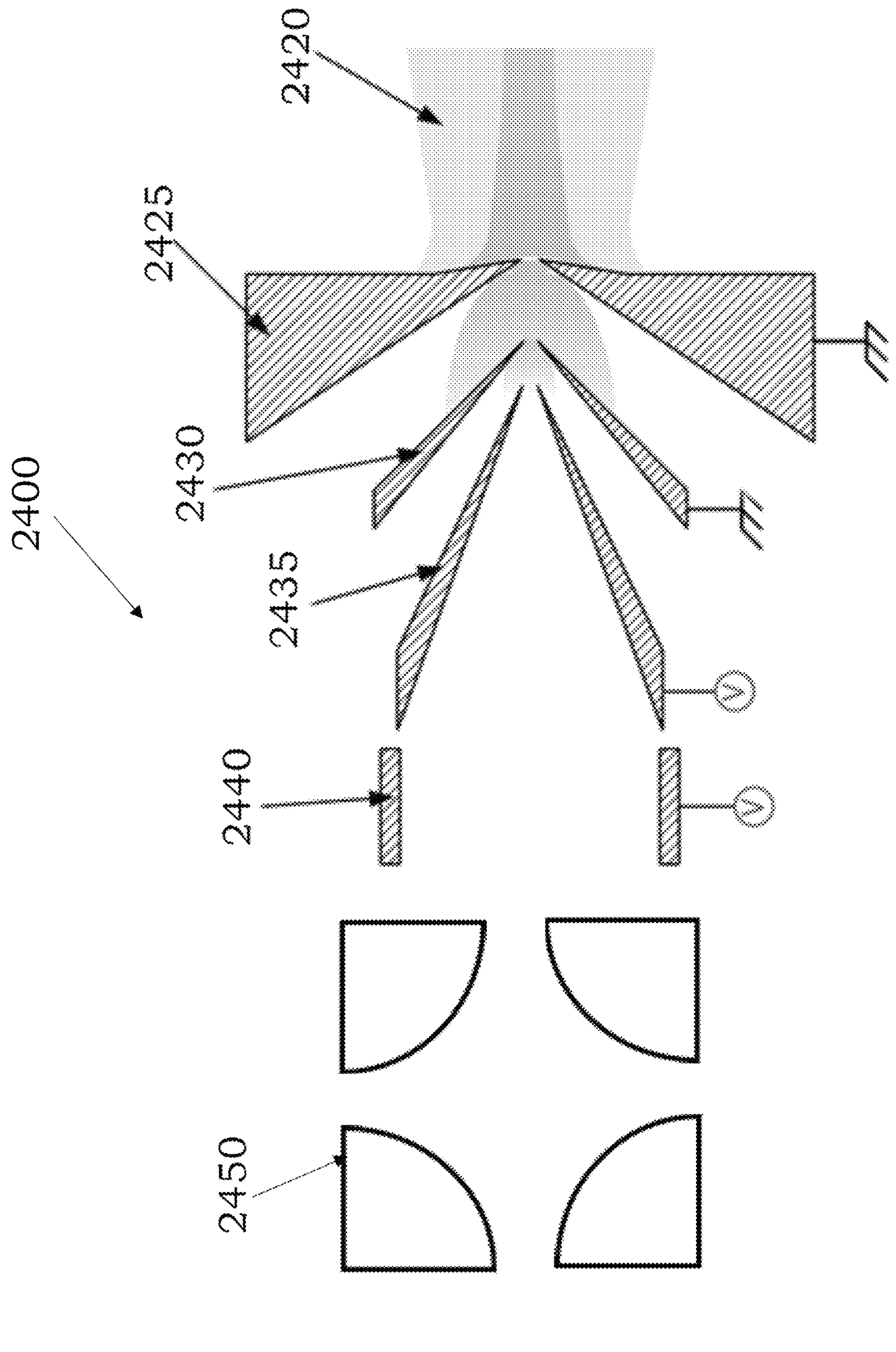
FIG. 24 is an illustration showing an ion interface where a lens is positioned adjacent to an ion guide, in accordance with some embodiments.

In certain embodiments, a system may comprise an ion interface fluidically coupled to an ion guide/deflector. As shown in FIG. 24, a system comprises a first cone 2425, a second cone 2430, a third cone 2435, a cylindrical lens 2440 and an ion guide/deflector 2450. If desired, ion optics (not shown) can be present between the lens 2440 and the deflector 2450. The system 2400 can operate in a similar manner as the system of FIG. 23 with the ions that exit the lens 2440 being provided directly to the ion guide/deflector 2450. Other components may be present downstream of the ion guide/deflector 2450.

Certain specific examples are described to illustrate further some of the novel and inventive aspects of the technology described herein.

Example 1

Figure 25A:
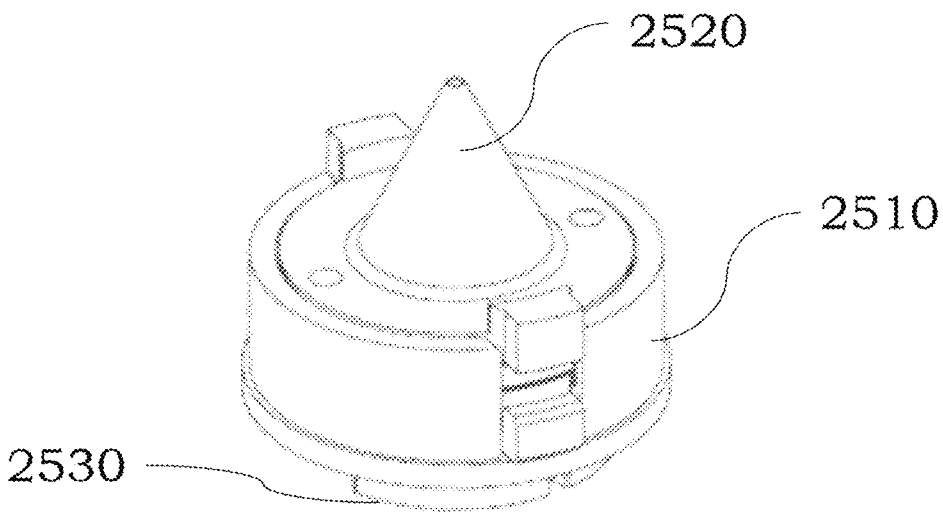
FIGS. 25A and 25B show a hyperskimmer cone and a ring lens placed in a non-conductive holder, in accordance with some embodiments.
Figure 25B:
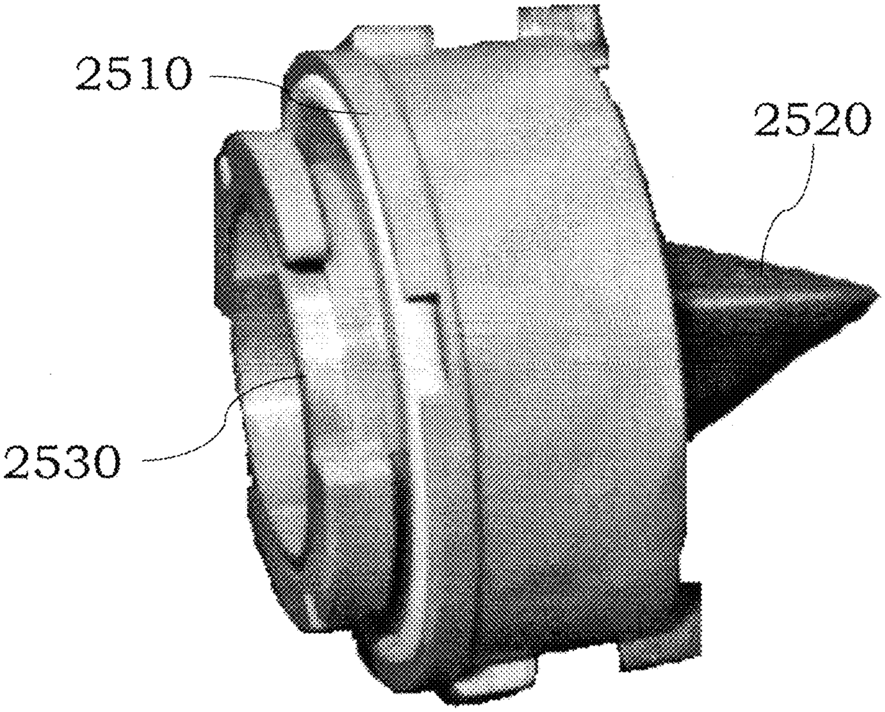

Referring to FIGS. 25A and 25B, a holder 2510 configured to retain a cone 2520 and a cylindrical lens 2530 is shown. The holder 2510 can receive the cone 2520 and the cylindrical lens 2530 by way of a friction fit, threads, spring-loaded retainers, one or more external fasteners or other devices or structures. The holder 2510 can be sized and arranged such that that the lens 2530 is flush with a back surface of the holder 2510 if desired. The holder 2510 can be used to position the cone 2520 immediately adjacent to the lens 2530 so no intervening structures or components are present between the cone 2520 and the lens 2530.

Example 2

Figure 26A:
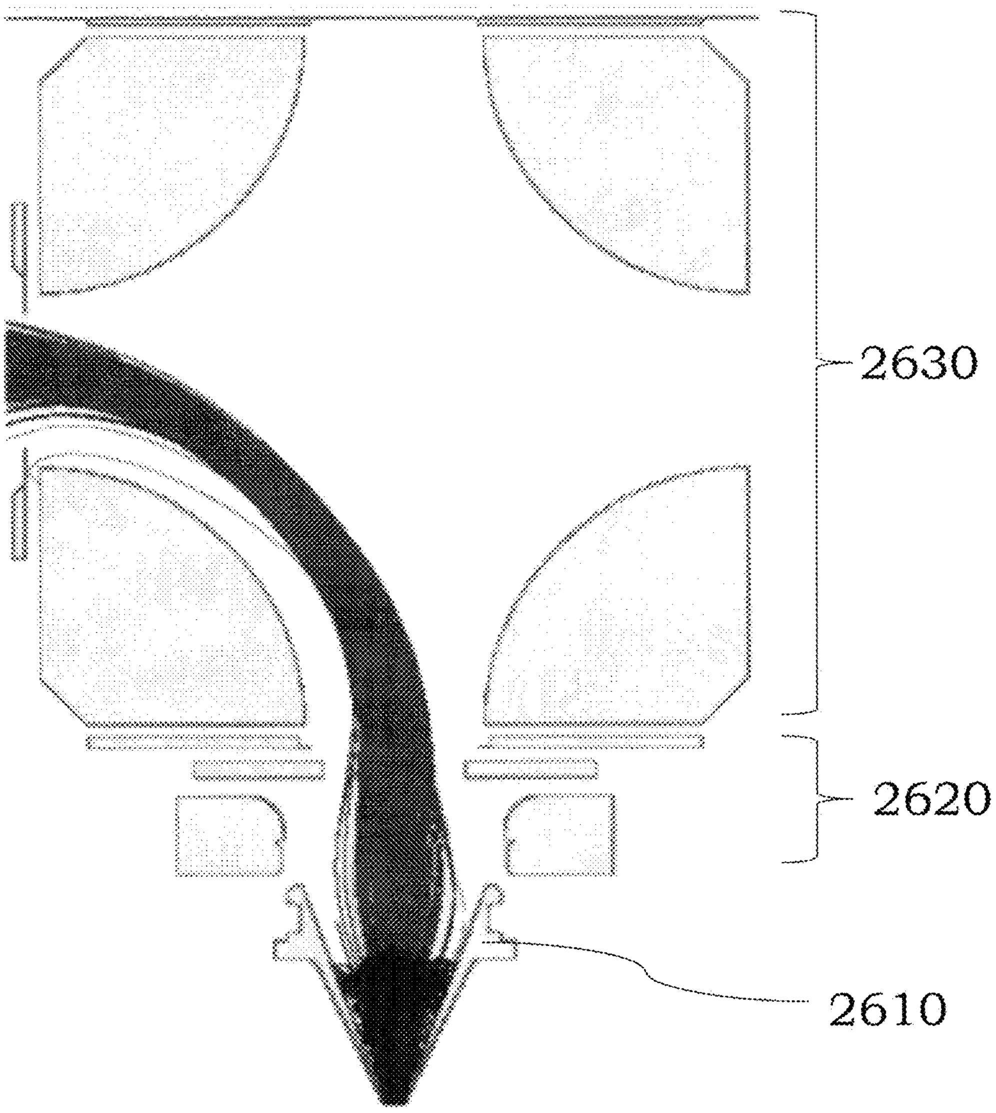
FIGS. 26A and 26B show ion simulations for different systems, in accordance with certain examples.

Referring to FIG. 26A, a simulation was performed to show the trajectories of argons ions, electrons and lithium ions using a conventional setup. One simulated system included a hyperskimmer cone 2610 electrically coupled to ground, ion optics 2620 and an ion guide/deflector 2630. As the ions enter into the hyperskimmer cone 2610, they immediately begin to expand and diffuse outward due to space-charge effects. This expansion results in a broad ion beam that enters into the ion optics 2620 and the guide 2630. The broad ion beam can reduce ion sensitivities and may make it difficult to remove any electrons and/or neutral species using the ion guide/deflector 2630.

Figure 26B:
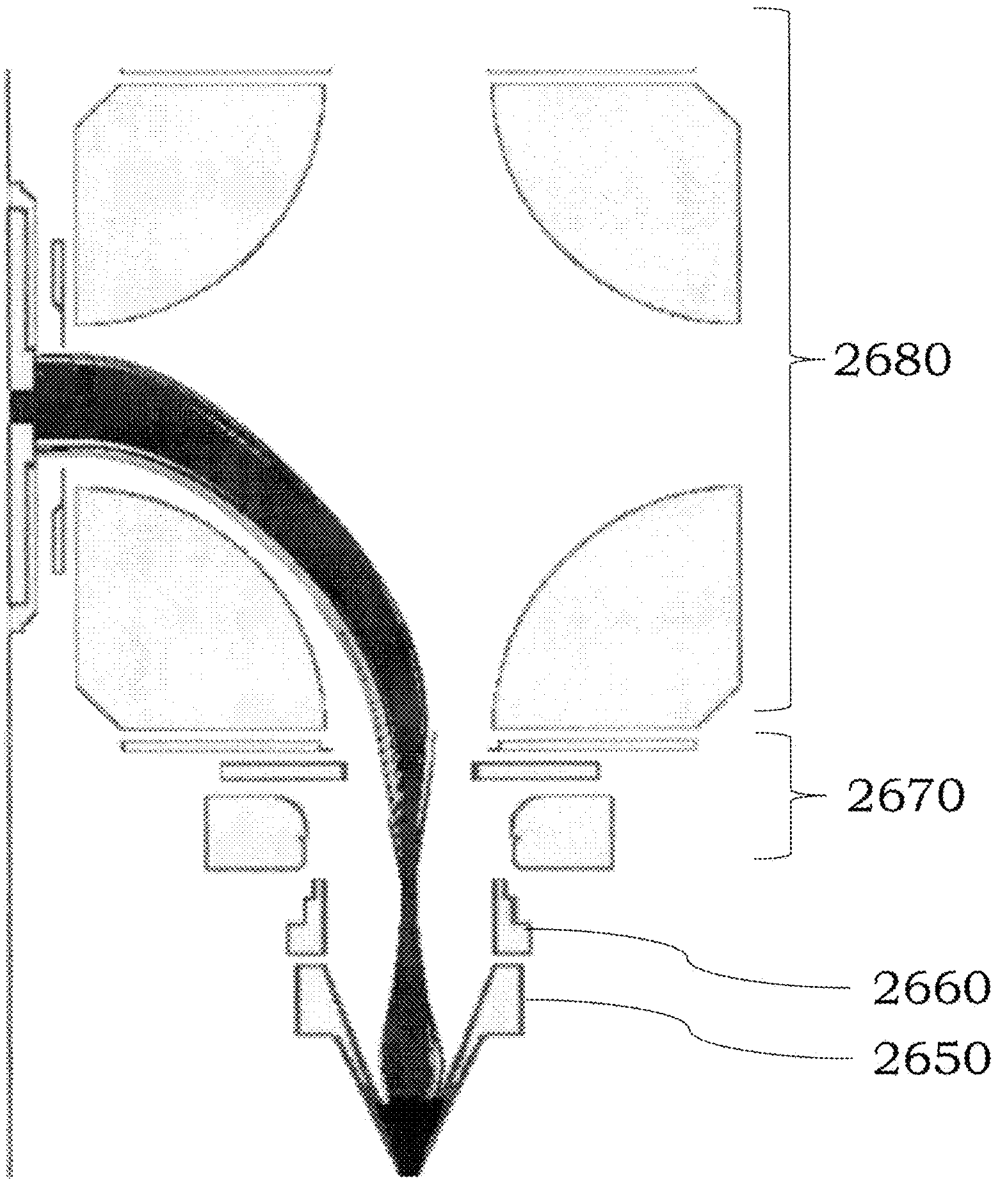

Referring to FIG. 26B, another simulation was performed where a second simulated system included a hyperskimmer cone 2650 with a slightly positive applied potential (+15 Volts), a ring lens 2660 with an applied negative potential (−200 Volts), ion optics 2670 and an ion guide/deflector 2680. The ion beam that enters into the cone 2650 remains more focused than the beam that entered into the cone 2610. In addition, the ion beam entering the hyperskimmer cone 2650 generally behaves as a positively charged beam and is focused as it exits the cone 2650 toward the ring lens 2660 with the negative potential. The ring lens 2660 squeezes the beam further to focus it prior to the focused beam being provided to the ion optics 2670 and the ion guide/deflector 2680.

In comparing the simulations in FIGS. 26A and 26B, the presence of the ring lens 2660 and the voltages applied to the cone 2650 and the ring lens 2660 can improve ion throughput without significantly increasing background noise.

Example 3

Simulations were performed to generate equipotential curves using the systems shown in FIGS. 26A and 26B. The equipotential curves for the FIG. 26A system are shown in FIG. 27A, and the equipotential curves for the FIG. 26B system are shown in FIG. 27B.

Figure 27A:
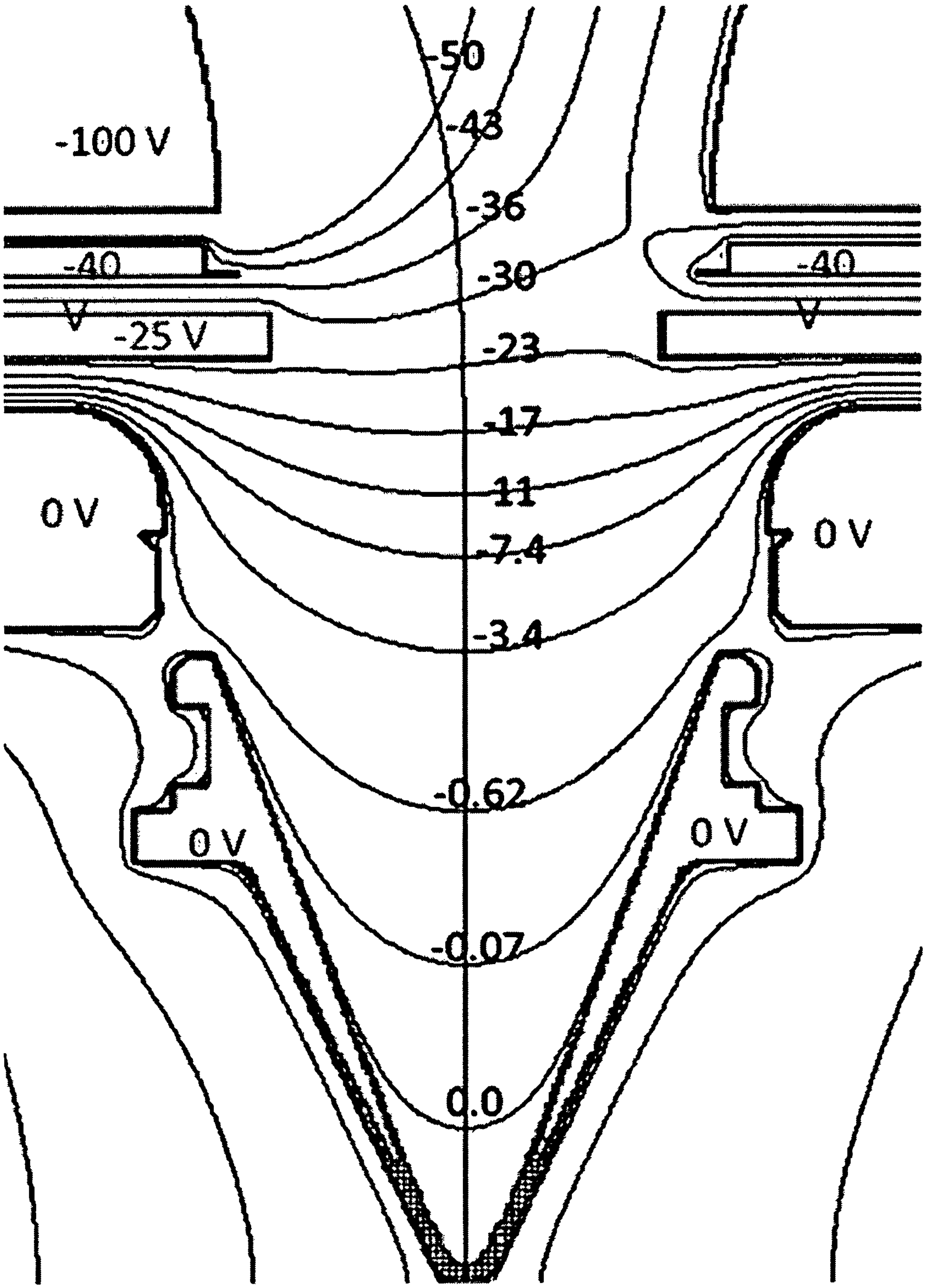
FIGS. 27A and 27B show equipotential curves for different systems, in accordance with some configurations.
Figure 27B:
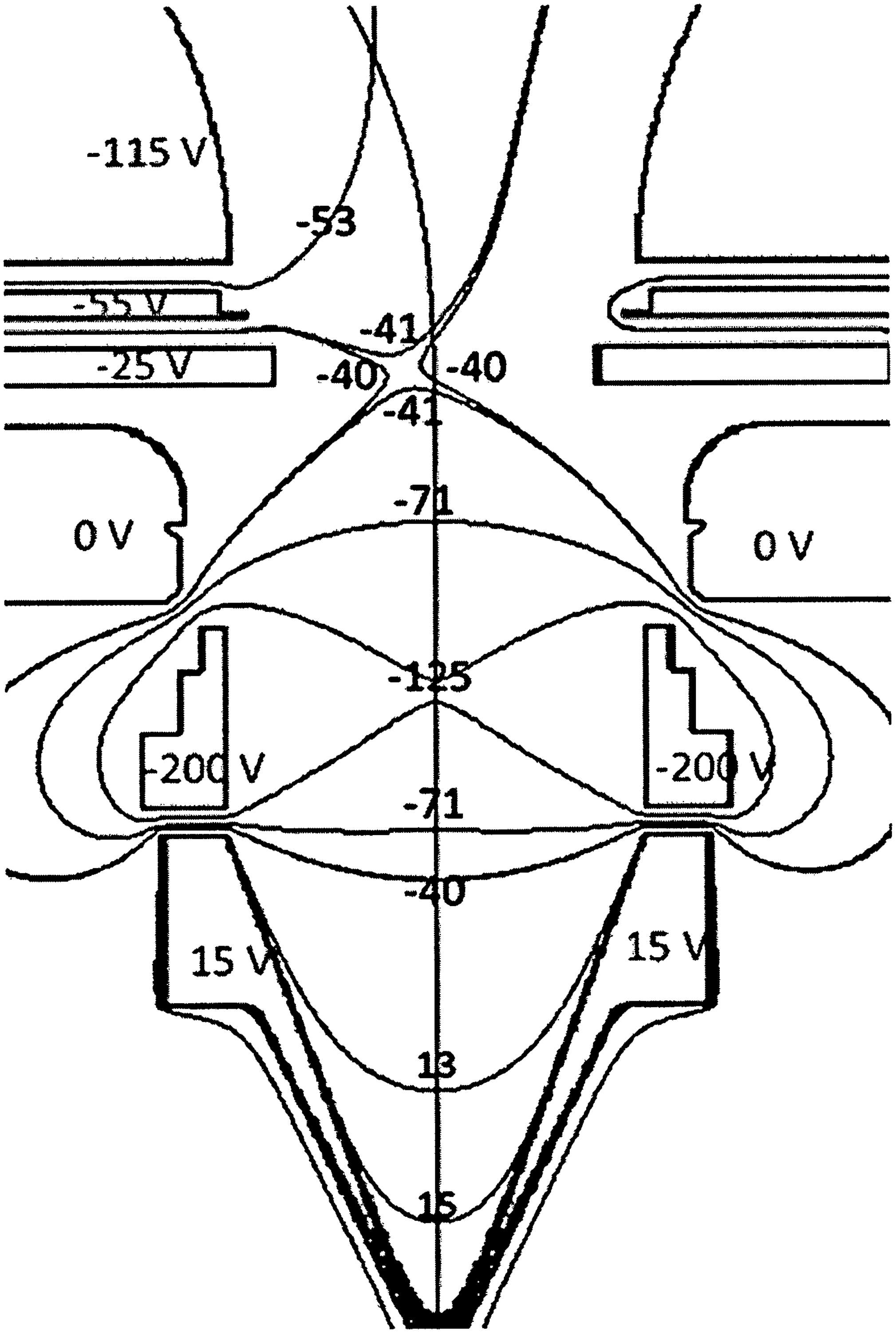

Referring to FIG. 27A, the equipotential curves show a monotonically decreasing potential starting from zero Volts at the cone 2610 and decreasing toward the ion optics 2620. Referring to FIG. 27B, the equipotential curves show the potential is positive at the cone 2650, decreases to a minimum negative potential within the ring lens 2660, and then increases to a lower magnitude negative potential toward the ion optics 2670. The presence of this minimum negative potential within the lens 2660 can be used to squeeze the beam and focus it prior to providing the ion beam to a downstream component.

Example 4

Figure 28:
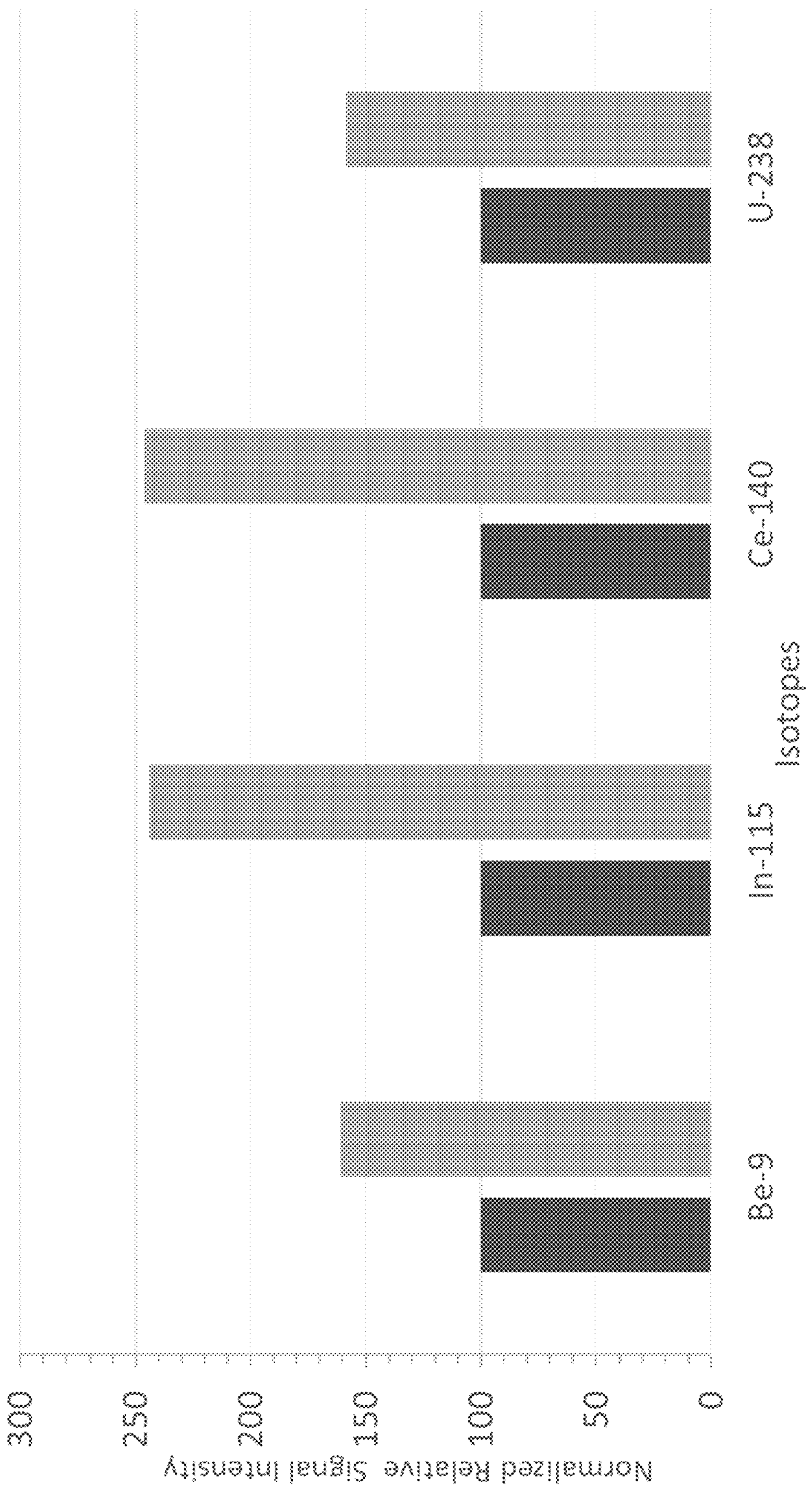
FIG. 28 shows a comparison of signal intensities using different systems, in accordance with certain embodiments.

Comparisons were made using an existing system (as shown in FIG. 26A) and a system comprising a cone and ring lens (as shown in FIG. 26B) for different ions including beryllium-9, indium-115, cerium-140 and uranium-238. The results are shown in FIG. 28 with the sensitivity using the existing system shown on the left of each grouping and the sensitivity using the hyperskimmer cone and ring lens system shown on the right of each grouping. The signal intensity was higher for all ions using the hyperskimmer and ring lens system. In some cases, 2-3× higher sensitivities can be obtained using the combination of the hyperskimmer cone and ring lens.

Example 5

Figure 29:
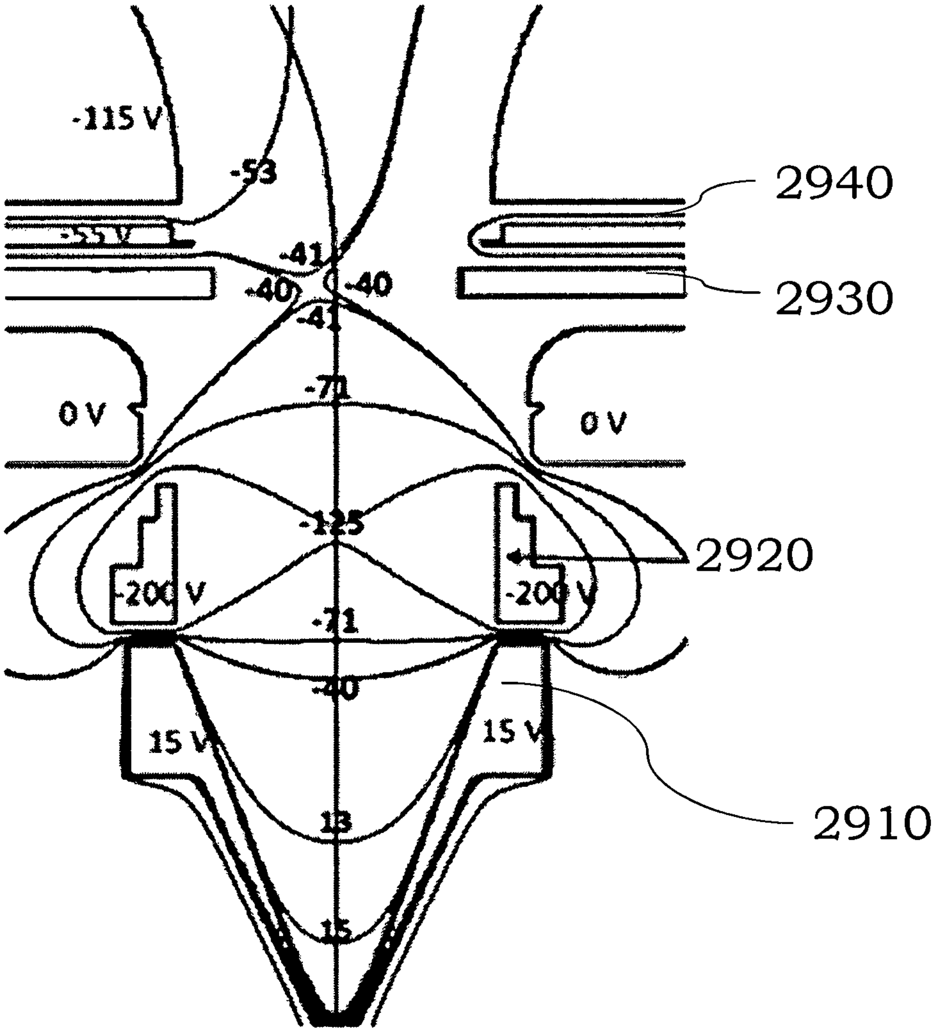
FIG. 29 shows a system including a hyperskimmer and a ring lens, in accordance with certain embodiments.

Referring to FIG. 29, a ring lens 2920 can be placed immediately after a hyperskimmer cone 2910 that is configured to receive a non-zero voltage. The ring lens 2920 and the hyperskimmer cone 2910 can be separated about 1-5 mm. An inner diameter of the ring lens 2920 can be selected to be equal to or greater than abase of the cone 2910. This configuration can result in less contamination from sputter and higher throughput.

In selecting the overall size of the ring lens 2920, a ring lens can be defined by its ratio of aperture to lens length. The ring lens 2920 generally has a lower aperture-to-length ratio, whereas a flat lens has a high aperture-to-length ratio due to the small length of the flat lens. Table 1 compares the diameter (D)-to-length L) ratio of a ring lens 2920 to an entrance lens 2930 and an opening of an ion guide/deflector 2940 for an illustrative ring lens.

TABLE 1

| | Internal Diameter (mm) | Length (mm) | D/L ratio |
|---|---|---|---|
| Ring Lens | 15.55 | 7 | 2.22 |
| Entrance Lens | 12 | 1.518 | 7.91 |
| Opening of Ion Guide | 14 | 0.2 | 70.00 |

In comparison, a D/L ratio for a flat lens is typically more than 6 or more than 2.5.

Example 6

Figure 30:
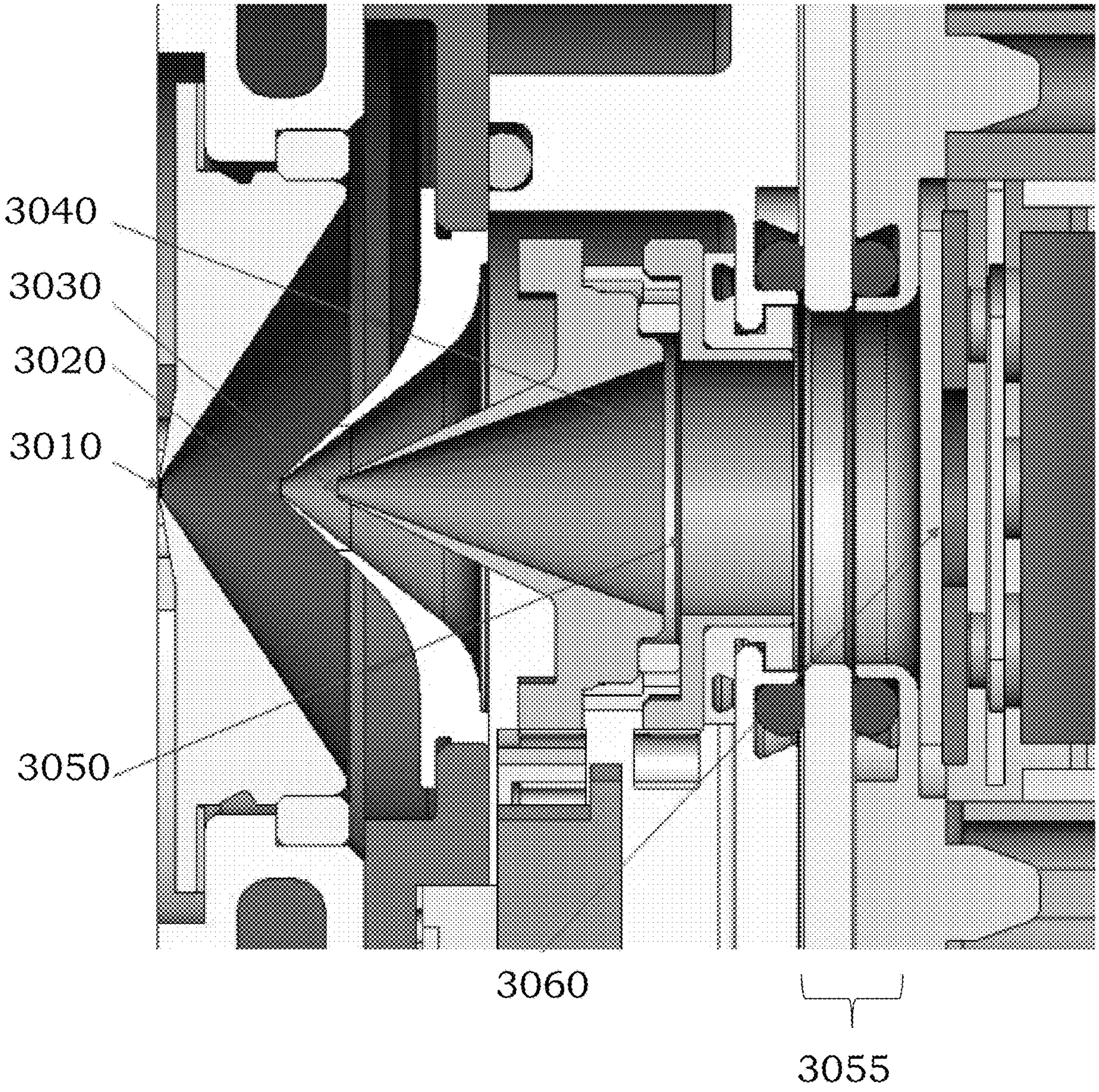
FIG. 30 is a cross-section of an ion interface, in accordance with certain configurations.

A cross-section of certain components of an ion interface is shown in FIG. 30. The interface comprises a sampler cone 3010, a skimmer cone 3020, a hyperskimmer cone 3030, a holder 3040 that holds the hyperskimmer cone 3030 and a ring lens 3050 together, ion optics 3055 and an entrance lens 3050 of an ion guide. A distance from the front edge of the orifice of the sampler cone 3010 to a front edge of the orifice of the skimmer cone 3020 is about 7.5 mm. A distance from the front edge of the orifice of the skimmer cone 3020 to a front edge of the orifice of the hyperskimmer cone 3030 is about 3.5 mm. The distance from the front edge of the hyperskimmer cone 3030 to the base of the hyperskimmer cone 3030 is about 20 mm. The ring lens 3050 can be spaced about 1.05 mm from the base of the hyperskimmer cone 3030. The ring lens 3050 can have a length of about 7.05 mm. A back edge of the ring lens 3050 is positioned about 9.1 mm away from a front edge of the entrance lens 3060. The thickness of the entrance lens 3060 can be about 1.52 mm. A diameter of the orifice in the sampler cone 3010 can be about 1.12 mm. A diameter of the orifice in the skimmer cone 3020 can be about 0.88 mm. A diameter of the orifice in the hyperskimmer cone 3030 (at the entrance side) can eb about 1.00 mm. The base of the hyperskimmer cone 3030 can be about 15.55 mm wide. The ring lens 3050 may comprise an inner diameter equal to or greater than the base width of the hyperskimmer cone, e.g., the aperture of the ring lens may comprise a diameter greater than or equal to 15.55 mm. The aperture of the entrance lens 3060 can be about 12.00 mm. The orifices and apertures are typically circular though other shapes could be used instead.

When introducing elements of the examples disclosed herein, the articles “a,” “an,” “the” and “said” are intended to mean that there are one or more of the elements. The terms “comprising,” “including” and “having” are intended to be open-ended and mean that there may be additional elements other than the listed elements. It will be recognized by the person of ordinary skill in the art, given the benefit of this disclosure, that various components of the examples can be interchanged or substituted with various components in other examples.

Although certain aspects, examples and embodiments have been described above, it will be recognized by the person of ordinary skill in the art, given the benefit of this disclosure, that additions, substitutions, modifications, and alterations of the disclosed illustrative aspects, examples and embodiments are possible.

What is claimed is:

1. An ion interface comprising:

a first cone comprising: a first orifice configured to receive ions from an ionization source and provide the received ions to a first region downstream of the first orifice;

a second cone comprising a second orifice configured to receive the ions in the first region and provide the received ions to a second region downstream of the second orifice;

a third cone comprising a third orifice configured to receive the ions in the second region and provide the received ions to a third region downstream of the third orifice, wherein the third cone is configured to receive a first non-zero voltage to focus the ions provided to the third region downstream of the third orifice and a base comprising an exit orifice;

a cylindrical lens comprising a first aperture configured to receive the focused ions in the third region and further focus the received ions prior to providing the focused, received ions to an entrance lens located immediately downstream of the cylindrical lens and adjacent to an opening of the ion guide, wherein the cylindrical lens is configured to receive a second non-zero voltage; and a non-conductive holder comprising an opening passing between a first side of the non-conductive holder and a second side of the non-conductive holder, is configured to receive and retain the cylindrical lens on a surface surrounding the opening at the second side of the non-conductive holder and is configured to receive and retain the third cone on an opposing surface surrounding the opening at the first side of the non-conductive holder to position the base and the exit orifice of the third cone within the opening of the non-conductive holder adjacent to a front edge of the cylindrical lens without any intervening component between the base of the third cone within the opening of the non-conductive holder and the front edge of the cylindrical lens and to electrically isolate the cylindrical lens from the third cone so the second non-zero voltage received by the cylindrical lens is not provided to the third cone;

wherein an inner diameter of the first aperture of the cylindrical lens is equal to or greater than an outer diameter of the exit orifice of the third cone; and wherein a distance between the base of the third cone and the front edge of the cylindrical lens is less than a distance between a back edge of the cylindrical lens and a front edge of the entrance lens.

2. The ion interface of claim 1, wherein the non-conductive holder is sized and arranged so the cylindrical lens is flush with a back surface of the non-conductive holder.

3. The ion interface of claim 1, wherein the cylindrical lens is configured as a ring lens.

4. The ion interface of claim 1, wherein the first non-zero voltage is a positive voltage and the second non-zero voltage is a negative voltage.

5. The ion interface of claim 1, wherein: the first non-zero voltage is less than zero;

the second non-zero voltage is less than zero; and the second non-zero voltage is less than the first non-zero voltage.

6. The ion interface of claim 1, wherein:

the first non-zero voltage is greater than zero;

the second non-zero voltage greater than zero; and the first non-zero voltage is less than the second non-zero voltage.

7. The ion interface of claim 1, wherein the third cone and the cylindrical lens are each independently controllable to alter the first non-zero voltage and the second non-zero voltage during operation of a system comprising the ion interface.

8. The ion interface of claim 1, wherein a cone opening angle of the third cone is less than a cone opening angle of the second cone.

9. The ion interface of claim 1, wherein at least one of the first cone and the second cone is configured to electrically couple to ground.

10. A mass spectrometer comprising:

an ionization source;

the ion interface of claim 1 fluidically coupled to the ionization source; and a mass analyzer fluidically coupled to the ion interface.

11. The ion interface of claim 1, wherein the non-conductive holder is sized and arranged so the cylindrical lens is flush with a back surface of the non-conductive holder, and wherein the non-conductive holder is configured to hold the cylindrical lens and the third cone through a friction fit or threads.

12. An ion interface comprising:

a first cone comprising a first orifice configured to receive ions from an ionization source and provide the received ions to a first region downstream of the first orifice;

a second cone comprising a second orifice configured to receive the ions in the first region and provide the received ions to a second region downstream of the second orifice;

a third cone comprising a third orifice configured to receive the ions in the second region and provide the received ions to a third region downstream of the third orifice, wherein the third cone is configured to receive a first non-zero voltage to focus the ions provided to the third region downstream of the third orifice and a base comprising an exit orifice;

a ring lens comprising a first aperture configured to receive the focused ions in the third region and further focus the received ions prior to providing the focused, received ions to an entrance lens located immediately downstream of the ring lens and adjacent to an opening of the ion guide, wherein the ring lens is configured to receive a second non-zero voltage; and a non-conductive holder comprising an opening Passing between a first side of the non-conductive holder and a second side of the non-conductive holder, is configured to receive and retain the ring lens on a surface surrounding the opening at the second side of the non-conductive holder and is configured to receive and retain the third cone on an opposing surface surrounding the opening at the first side of the non-conductive holder to position the base and the exit orifice of the received and retained third cone within the opening of the nonconductive holder adjacent to a front edge of the received and retained ring lens without any intervening component between the base of the third cone within the opening of the non-conductive holder and the front edge of the ring lens and to electrically isolate the ring lens from the third cone so the second non-zero voltage received by the ring lens is not provided to the third cone; and wherein an inner diameter of the first aperture of the ring lens is equal to or greater than an outer diameter of the exit orifice of the third cone; and wherein a distance between the base of the third cone and the front edge of the ring lens is less than a distance between a back edge of the ring lens and a front edge of the entrance lens.

13. The ion interface of claim 12, wherein the non-conductive holder is configured to hold the ring lens and the third cone through a friction fit.

* * * * *